United States Patent [19]

Thanos et al.

[11] Patent Number: 5,005,089
[45] Date of Patent: Apr. 2, 1991

[54] HIGH PERFORMANCE, HIGH CAPACITY MICRO-WINCHESTER DISK DRIVE

[75] Inventors: William N. Thanos; Bruce R. Peterson, both of San Jose; William G. Moon, Sunnyvale; Joshua Lindsay, Cupertino; Thomas R. Stone, Pleasanton, all of Calif.

[73] Assignee: Quantum Corp., Milpitas, Calif.

[21] Appl. No.: 192,353

[22] Filed: May 10, 1988

[51] Int. Cl.$^5$ ............................................. G11B 5/596
[52] U.S. Cl. .............................. 360/77.08; 360/77.03; 360/77.04; 360/77.05; 360/78.04
[58] Field of Search .................... 360/69, 77.02–77.11, 360/78.04–78.14, 75, 40, 51, 97.01, 98.01, 98.02; 364/200

[56] References Cited

U.S. PATENT DOCUMENTS

| | | | |
|---|---|---|---|
| 3,753,254 | 8/1973 | Ruble et al. | 360/77.02 |
| 4,207,601 | 6/1980 | Desai et al. | 360/78.05 |
| 4,396,959 | 8/1983 | Harrison et al. | 360/77.08 |
| 4,516,177 | 5/1985 | Moon et al. | 360/77.07 |
| 4,639,863 | 1/1987 | Harrison et al. | 364/200 |
| 4,669,004 | 5/1987 | Moon et al. | 360/77.08 |
| 4,882,671 | 11/1989 | Graham et al. | 360/77.04 |

OTHER PUBLICATIONS

Q200 Series Programmer's Manual, Appendix B, Quantum Corp., ©1986, 1987.

Primary Examiner—Aristotelis M. Psitos
Assistant Examiner—Steven R. Garland
Attorney, Agent, or Firm—David B. Harrison

[57] ABSTRACT

A micro-Winchester disk drive subsystem includes a data block sequencer, cache memory and interface for a host computing machine. The drive includes a base and a plurality of non-removable directly rotated disks forming data storage surfaces. A balanced rotary head transducer actuator is mounted to the base for a plurality of data transducer heads among a multiplicity of concentric data tracks formed on each data storage surface of each of the disks. The track following servo system includes a position encoder coupled between the actuator structure and the base, prerecorded data track centerline information at a radially outermost region and at a radially innermost region of each data surface, and a temperature sensor for sensing temperature of the base at the vicinity of the position encoder. An actuator driver circuit is connected to supply electrical driving current to the actuator structure; and, a single, time divided multi-tasked digital including an analog to digital converter is connected to receive the position information from the position encoder, centerline information from the disk surfaces read by the data transducer and temperature sensed by the temperature sensor during a calibration operation in one phase of its operational cycle, and other phase being devoted to supervision data block handling functions of disk' drive data block sequencer cache memory and interface. During track following operations, centerline information is derived from information obtained in the calibrate operation. The temperature sensor is periodically checked and recalibration is carried out when drive temperature changes.

22 Claims, 10 Drawing Sheets

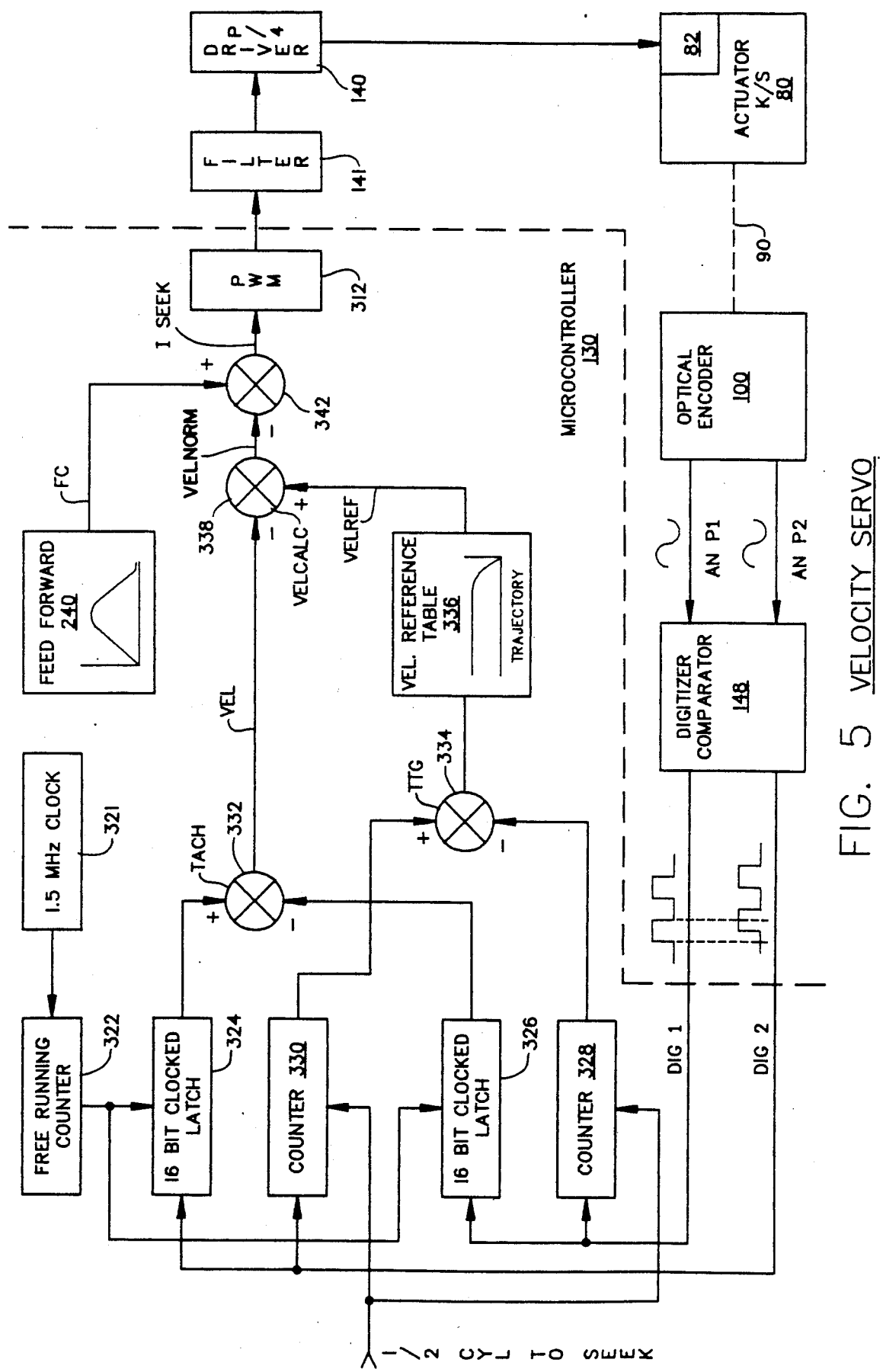
FIG. 5  VELOCITY SERVO

TRACK FOLLOWING SERVO
BLOCK DIAGRAM

FIG. 11 WRITE/READ CONTROL PROCESS FLOWCHART

HIGH PERFORMANCE, HIGH CAPACITY MICRO-WINCHESTER DISK DRIVE

Field of the Invention

The present invention relates to data mass storage devices for attachment to computing systems for storage and random access retrieval of vast quantities of data. More particularly, the present invention relates to a low cost, high performance, high capacity micro-Winchester disk drive which combines a number of features to provide greater areal data storage density and shorter average access time in a very small form factor.

BACKGROUND OF THE INVENTION

The trend toward miniaturization of electronic circuitry and equipment is well documented in the art. In the field of non-removable media rotating disk data storage devices, usually called "disk drives", this trend has been followed, with a definite correlation between the size of floppy disk drives and fixed disk drives. Thus, eight inch diameter floppy disk drives were followed by eight inch diameter Winchester disk drives, see for example the present assignee's U.S. Pat. No. RE 32,075, as an example of a higher capacity, lower cost fixed disk drive. Five and one quarter inch diameter "mini-floppy" disk drives were followed by five and one quarter inch Winchester disk drives, see for example, the assignee's U.S. Pat. No. 4,639,798 which depicts a five and one quarter inch diameter Winchester disk drive as the preferred embodiment (but teaches applicability of the principles disclosed therein to "systems employing either larger or smaller storage disks").

With the introduction of three and one half inch diameter "micro-floppy" disk drives by Sony Corporation, the well developed design trend to follow the floppy disk drive exterior form factor with a corresponding form factor for a Winchester disk drive occurred as an obvious development, see for example, the Rodime PLC U.S. Pat. No. 4,568,988, for a description of a 10 Megabyte micro-Winchester disk drive employing a stepping motor driven head positioner.

As was true about floppy disk drives before them, most early "floppy" form factor Winchester disk drives employed step motor driven head positioning actuators. Such motors intrinsically provided magnetic detents which were used to define the boundaries of each concentric data track followed by the data transducer slider which flew upon an air bearing very close to the data surface. The foregoing referenced disk drive disclosures of the prior art therefore followed a low level computer interface convention as had been first employed with floppy disk drives, where a disk drive controller of the host computer commanded track seek operations at the drive by delivering a stream of stepping pulses to the disk drive, and simultaneously by indicating to the disk drive the direction of stepping, whether toward or away from the periphery of the data storage disks. In the case of eight inch disk Winchester disk drives, the de facto interface standard quickly became the Shugart Associates' SA 1000 interface. In the case of the five and one quarter (and later the three and one half) inch diameter Winchester disk drives, the interface convention became known as the Seagate Technology ST-506 interface (later called the ST-412 interface).

One recognized drawback of open-loop stepping motor positioners has been the relative slowness of such motors and the limited precision thereof. Average track access times of e.g. 65 milliseconds has been typical of recent microWinchester disk drives employing stepping motor actuators; and, open-loop, step motor precision has been limited to about 600 tracks per inch.

Quasi-closed-loop optical encoder based positioning systems have also been proposed in the prior art. Those systems typically employed voice coil actuators, either linear or rotary, to which a moving scale was attached. The scale moved between a fixed light source and a fixed photodetector array in a manner that generated quadrature position signals. The optical encoder provided track position information. Centerline information was read from a single sector servo area on the servo surface which was hidden or data masked from the controller by lying between an internal index marking signal and a delayed interface index signal. This approach enabled track densities greater than were achieved with the open loop stepper motor positioner approaches while remaining a low cost alternative and without loss of compatibility with the open loop step motor based SA1000 (8 inch) and ST 412 (5 1/4 inch) industry standard interfaces. Examples of such approaches are to be found in the assignee's U.S. Pat. No. 32,075, U.S. Pat. No. 4,419,701 and 4,639,798.

Large system disk drives having a higher level interface, considerably greater data storage capacity and much faster average access times were also known in the prior art. Such interfaces were typically either ESDI, PC-AT or SCSI, and enabled disk drives to be connected directly to computer buses from which command and status words were received and sent, together with blocks of data to be stored or retrieved. High performance has usually required closed loop positioning systems employing voice coil actuators and at least one disk surface devoted entirely to servo information. This information is typically written on servo tracks which are followed by a read-only servo transducer. The overhead cost of the servo surface itself and of the servo writer required to write the servo surface, together with the costs of the readonly servo transducer and related servo channel electronics has rendered the servo surface approach more costly than the step motor detent, or quasi-closed-loop optical encoder based positioning schemes.

One example of a higher capacity disk drive employing a separate servo surface for use with a track following servo loop and an optical encoder with digitized outputs in quadrature for track seeking and for microstepping during track settling is set forth in the present assignee's U.S. Pat. No. 4,516,177.

One example of a PC-AT interface, fully integrated fixed disk expansion board employing a quasi-closed-loop, optical encoder positioned, three and one half inch diameter head and disk assembly and fully integrated controller electronics interfacing directly with a personal computer, such as the IBM Personal Computer (tm), is exemplified by the disclosure set forth in the assignee's subsidiary's U.S. Pat. No. 4,639,863.

Recently, the small computer system interface (SCSI) has obtained prominence within the "floppy disk sized" Winchester disk drive marketplace. One further example of a five and one quarter inch diameter, half height, 80 megabyte, SCSI interface Winchester disk drive with on-board high level command processing capability is disclosed in the assignee's U.S. Pat. No. 4,669,004. While this prior architecture worked well, it manifested a number of drawbacks. First, the embedded servo sector arrangement adversely affected average access time as the rotary actuator had to be slowed in order not to exceed processing time capacity for handling each servo sector during seeking operations. Second, the somewhat cumbersome software organization of this prior architecture, as well as the use of an eight bit microprocessor controller unduly taxed the controller and extended the response time to SCSI interface requests, thereby limiting data throughput rates.

In summary, while all of the assignee's foregoing disk drive patents described technology marking considerable advances in providing low cost, higher capacity Winchester disk drives, certain drawbacks have remained heretofore unsolved. Primarily, these problems have related to limitations of: (a) areal data densities, (b) track densities limited by thermal drift characteristics, (c) average access times, (d) data block throughput, (e) power supply requirements, (f) noise emissions, and (g) prime costs of manufacture.

SUMMARY OF THE INVENTION WITH OBJECTS

Therefore, a primary object of the present invention is to overcome the limitations and drawbacks in prior ar Winchester disk drives by increasing areal data storage densities, track densities and data block throughput while reducing average access times, power consumption requirements and noise emission of Winchester disk drives without dramatically increasing either the size or the manufacturing costs associated therewith.

A specific object of the present invention is to provide an improved servo/SCSI command data handling method and controller employing a single microprocessor controller structured and programmed in a unique way in order to speed up data throughput rates and access times.

Another specific object of the present invention is to include hardware counters within memory controller and interface controller state machines so that they may be updated by the microprocessor controller to move blocks of data during intervals when the microprocessor is performing head position servo functions.

Yet another specific object of the present invention is to provide a single microprocessor controller for controlling an intelligent interface Winchester disk drive, which microprocessor includes internal read only memory and random access memory, and which also includes external read only memory and random access memory, and wherein the control program is structured so that time-critical program steps and values are stored internally within the microprocessor itself to reduce processing time, thereby improving overall performance of the disk drive, including program update and revision flexibility.

Yet a further specific object of the present invention is to provide a unique track following servo arrangement for initially calibrating and periodically recalibrating the optical position encoder and other elements subject to mechanical/electrical drift or change with temperature upon directly detecting thermal shifts within the disk drive during its operation.

One more specific object of the present invention is to provide a Winchester disk drive within a three and one half inch diameter industry standard "micro-Winchester" form factor which provides a formatted storage capacity of up to eighty megabytes of data storage, an improved SCSI interface command handling capability, an average track access time of less than twenty milliseconds, an expected mean time between failures in excess of fifty thousand hours, and a power consumption requirement of about eight watts, without any substantial increase in prime cost over larger sized prior art disk drives.

In accordance with the principles of the present invention, a disk drive subsystem of the present invention comprises a mounting frame, and a head and disk assembly.

The head and disk assembly includes a base which is shock mounted to the frame, at least one data storage disk fixedly journalled to the base and rotated by a direct drive spindle motor, at least one data transducer flyable in close proximity to a data surface of the disk upon an air bearing, and a head select switch and preamplifier. An electromechanical actuator moves the head among data block locations of the data surface. A position transducer and a temperature sensor are also provided.

An electronic circuit board is mounted to the base within the frame and carries circuitry including a host interface circuit for transferring command and status information and data blocks between the subsystem and a host computer to which the subsystem is attached. The circuit board also includes a cache buffer memory connected to the host interface circuit for storing data blocks to be transferred. A direct memory access controller is connected to control addressing of the cache buffer memory. A data sequencer is connected to the cache buffer memory for serializing and deserializing data blocks transferred to and from the disk surface and the cache buffer memory. A data channel circuit is connected between the data sequencer and the head select and preamplifier circuit.

The electronics board also includes a bi-phase task divided single programmed digital microcontroller which, during a first task phase, obtains and executes commands from the host and returns status information to the host, and supervises transfers of blocks of data between the host interface circuit and the data surface, and controls gain compensation of the data channel electronics; and, during a second task phase, controls the electromechanical actuator during track seeking and track following operations from information provided from the position transducer as corrected by prestored calibration information, the digital microcontroller being programmed to obtain the calibration information when power is initially applied to the subsystem and to update the calibration information whenever a thermal shift is sensed by the temperature sensor. The calibration information includes track centerline servo information read from an outermost and an innermost track region of the data surface.

In the present invention, data throughput is increased by providing data block loop counters within the data sequencer and host interface circuit which may be updated by the microcontroller to enable block transfers to continue during second task phase intervals when the microcontroller is supervising servo control of the actuator structure.

Another aspect of the present invention is that the data sequencer and the host interface circuit operate as state machines asynchronously with respect to each other and coordinate their activities by communicating through commonly accessible microcontroller registers denominated "hot sectors" and "sectors allocated".

A further aspect of the present invention is that the calibration routine takes into account the inward seek-outward seek hysteresis characteristic of the actuator structure.

Also, the actuator coil is designed to counterbalance the in-line rotary actuator structure in order to reduce the counterweight heretofore used and to thereby reduce mass and decrease average access time of the actuator. The actuator coil is preferably integrally molded to the rotary actuator hub with a brass counterweight integrally molded into the center space surrounded by the coil so that the coil assembly counterbalances the mass of the heads and optical encoder scale, while presenting a minimum rotary inertia.

Another aspect of the present invention is the provision of an aerodynamically released shipping latch which is so designed to enable independent assembly and disassembly of the disk stack and rotary actuator structure.

The foregoing and other objects, aspects, advantages and features of the present invention will be more fully understood and appreciated by considering the following detailed description of a preferred embodiment, presented in conjunction with the accompanying drawings.

BRIEF DESCRIPTION OF THE DRAWINGS

In the Drawings:

FIG. 5 is an architectural model block diagram of the FIG. 3 subsystem operating from velocity information in the track seeking mode during servo time.

Detailed Description of a Preferred Embodiment

Figure 1:
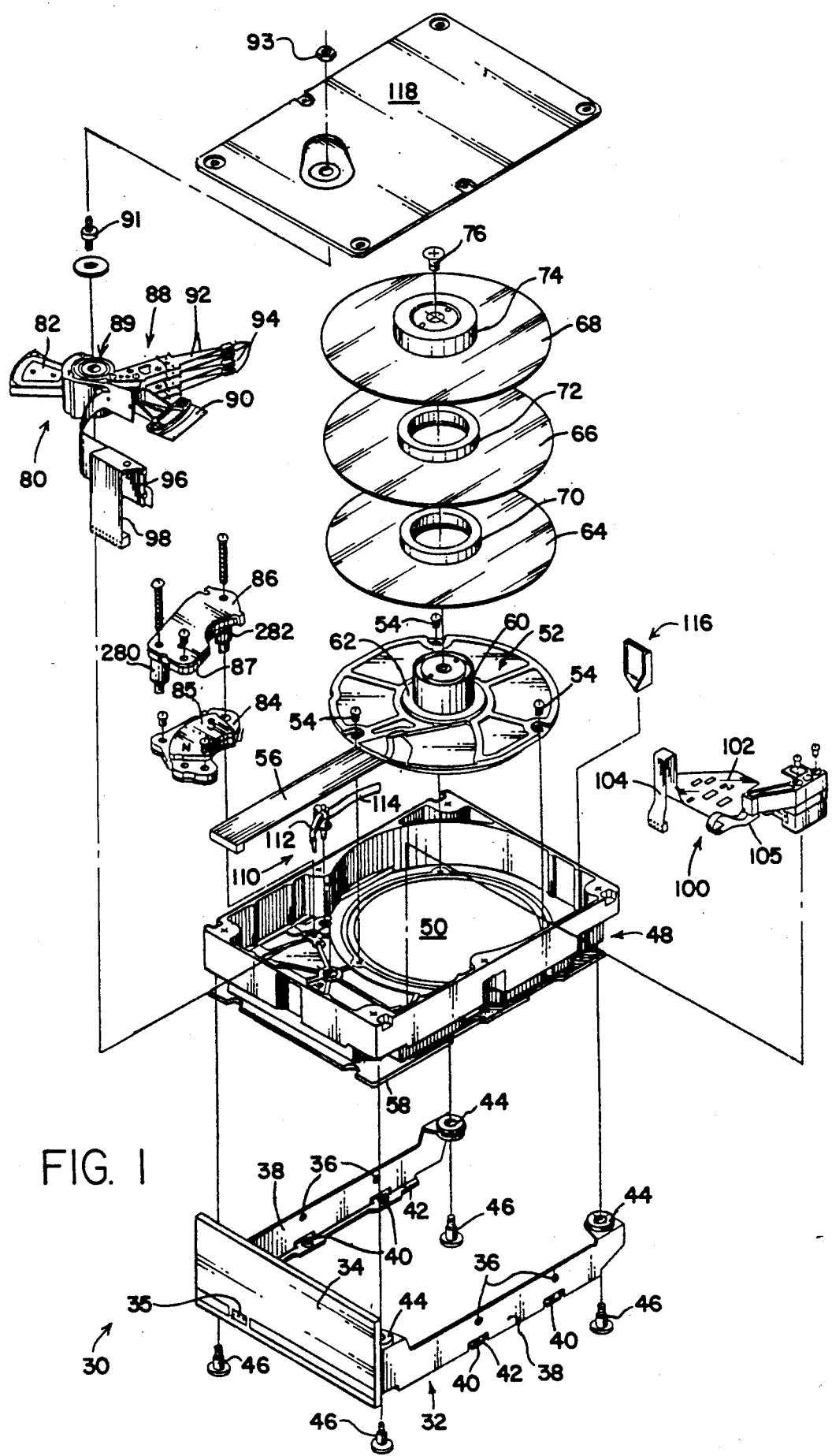
FIG. 1 is an exploded isometric view of a head and disk assembly of a micro-Winchester disk drive subsystem incorporating the principles of the present invention.
Figure 2:
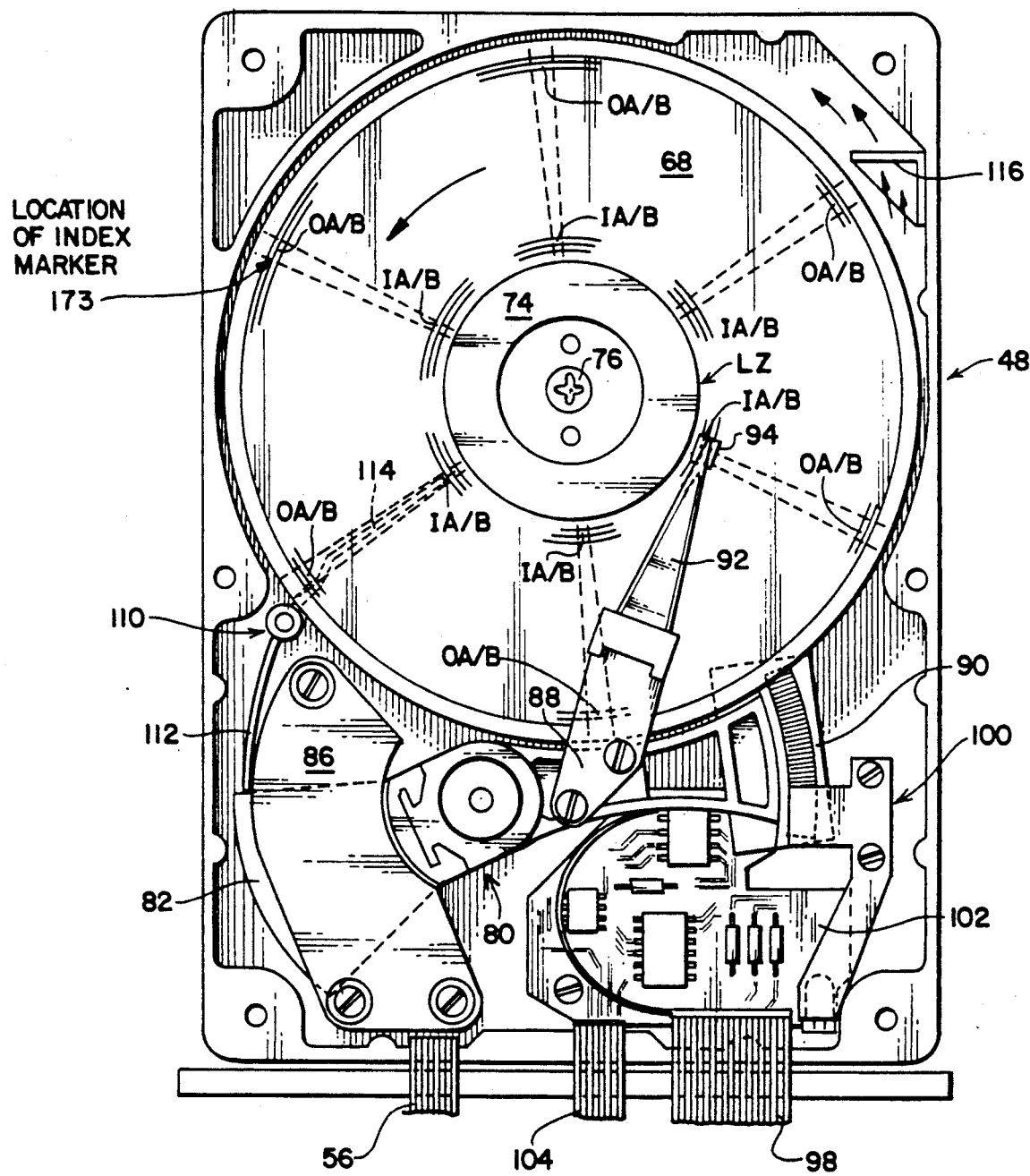
FIG. 2 is an approximately life size top plan diagrammatic view of an assembled head and disk assembly of the type depicted in exploded view in FIG. 1.

Head-Disk Assembly 30, FIGS. 1 & 2

A head and disk assembly 30 of a micro-Winchester disk drive subsystem 10 incorporating principles of the present invention is shown in FIG. 1 and 2. The assembly 30 is similar to the assembly described in U.S. Pat. No. 4,712,146, incorporated by reference, although the present assembly 30, having three disks and an overlying printed circuit board, has a thickness (one and five eighths inch) which is slightly greater than the thickness dimension originally achieved in the two disk head and disk assembly described in the referenced '146 patent.

The assembly 30 includes a metal frame 32 and faceplate 34. A translucent lens 35 attached to the faceplate 34 enables light from an LED activity lamp 158 mounted on a main printed circuit board 58 to be visible at the faceplate 34 when the disk subsystem 10 is active. The frame 32 includes threaded openings 36 on opposite sides 38 and threaded openings 40 extending through bottom flanges 42 of the opposed sides 38. The threaded openings 36 and 40 are conventionally located and sized to enable the subsystem 10 to be mounted within standard micro-floppy/micro-Winchester mounting configurations of a host computing system (not shown) with which the subsystem 10 is to be connected and used. Shock absorbers 44 and bolts 46 are used to secure a formed base 48 to the frame 32 while providing isolation of the base from externally induced shock forces.

The base 48 may be cast or otherwise formed of any suitable formable material, such as aluminum alloy, and it includes a rib-reinforced bottom wall and contoured sidewalls as shown in FIG. 1. A thin aluminum plate cover 118 is attached through a gasket (not shown) to the machined top surfaces of the contoured sidewalls in order to enclose and seal the interior space. Portions of the flex circuit cables pass between the machined top surface and the gasket in order to facilitate connection with the electrical elements within the interior space.

An annular opening 50 is defined in the bottom wall of the base 48. A DC brushless three phase spindle motor 52, rotating at a constant angular velocity, e.g. 3662 RPM, is mounted through a gasket (not shown) in the opening 50 by three screws 54. A thin film conductor cable 56 enables the three stationary windings, the three Hall effect commutation sensors, and a once per revolution index marker Hall effect sensor, of the motor 52 to be plug-in connected to electronic driving circuitry carried on a single printed circuit board 58. The motor 52 includes a spindle hub 60 which includes preloaded spindle bearings and a ferrofluidic seal to prevent ambient air from entering the enclosed interior space via the spindle. The spindle hub 60 includes an integrally formed lower flange 62.

Preferably, three data storage disks 64, 66 and 68 are mounted to the spindle hub 60. The disks 64, 66 and 68 are typically formed of aluminum alloy material sputter coated with a thin magnetic metal film data storage media. The film media is coated with a carbon overcoat which prevents head and media wear within an inner landing zone LZ where the head touches down on each data surface whenever the spindle motor 52 has stopped rotation. The metal film coating provides a suitable data storage media for storage of data in a multiplicity of concentric data tracks formed on each major surface of each disk.

A track density of 1000 tracks per inch is presently achieved in the subsystem 10, although significantly higher track densities, such as 1300 tracks per inch are clearly feasible With six heads and 834 data cylinder locations per actuator position or "cylinder" location, each cylinder having six data tracks, and with a 2,7 run length limited recording density of 22,055 bits per inch, an overall data storage capacity of 80,886,080 bytes formatted is achieved by the subsystem 10. In a reduced storage capacity subsystem including two disks (three data surfaces) and three heads, a data storage capacity of 40 megabytes formatted is achieved. The one unused data surface may be one determined to contain excessive media defects during the manufacturing process. In this way the other, useful surface is used, thereby achieving further economies in manufacturing. Average power consumption of the subsystem 10 including the spindle motor 52 is 8 watts.

The hub flange 62, spacers 70 and 72, and a top securing disk 74, space apart the disks 64, 66 and 68 about the rotating spindle hub 60. A screw 76 clamps the disks 64, 66 and 68 to the hub 60.

The circuit board 58 is mounted by screws to the underside of the base 48. An insulating shield (not shown) consisting of a layer of plastic film laminated to a layer of copper foil is sandwiched between the underside of the circuit board 58 and the outer surface of the metal base 48, with the copper side facing the base 48. The plastic film layer prevents the electrical circuit paths on the board 58 from shorting to or through the base 48. The copper layer serves to shield the data transducer heads 94 from radiated electromagnetic noise generated on the board 58.

A rotary actuator structure 80 is journalled to the base 48 and to the cover plate 118 for mechanical rigidity. The structure 80 includes a moveable single phase coil 82 rotatably disposed in a magnetic field gap formed between two ferromagnetic flux return magnet plates, a bottom plate 84 and a top plate 86. The plates 84 and 86 may each be constructed of several thin plates which are sufficiently thin to be stamped out during the manufacturing process, yet thick enough when stacked together to handle and contain the magnetic return flux. Two high flux density neodymium alloy permanent magnets 85 and 87 define adjacent, alternating north-/south poles on the opposed faces thereof and are bonded to their respective flux return plates 84 and 86. The magnets 85 and 87 provide the flux in the gap between the two plates 84 and 86. Two rubber cylinder crash stops 280 and 282 are mounted by posts and screws which mount the two plates 84 and 86 together in a spaced apart relationship defining a magnetic gap in which a moving coil 82 is able to move along a locus of limited angular displacement, the limit thereof being established by the thickness of the coil 82 and the distance between the crash stops 280 and 282.

A hub and disk spindle assembly 89 includes preloaded bearings having ferrofluidic seals. The bearings are journalled to a fixed shaft pressed into the base. A screw 91 and nut 93 secure the hub to the top cover 118.

A transducer arm assembly 88 includes a moving glass scale 90 and six in-line Whitney flexures 92 which secure six mini-composite data transducer head structures 94 which fly in very close proximity (seven microinches, for example) to the data surfaces via an air bearing effect. A thin metallic foil sheet is bonded to each of the flexures 92 with a viscoelastic damping adhesive in order to dampen mechanical resonances.

The arm assembly 88 is designed such that its mass center is at the center of the hub 89, by virtue of the presence of an integrally molded brass counterweight in the central space surrounded by the windings of the coil 82.

The range of angular displacement of the actuator structure is sufficient to define 834 cylinder locations. With the six heads 94 and 834 cylinder locations, 5004 data tracks are defined on the data surfaces. Fourteen extra cylinders are provided in a radially outermost region, and extra room is provided in a radially innermost region inside of track number 839 comprising a landing zone LZ, as graphed in the track budget aspect of FIG. 12.

A flexible printed circuit substrate 96 carries a head selector/read-write preamplifier integrated circuit, such as type SSI 501. Power and data connections are made to the main printed circuit substrate 96 via an extension portion 98 which plugs into a read channel circuit 128 carried on the main printed circuit substrate 58.

An optical encoder assembly 100 is of the type described in U.S. Pat. No. 4,703,176, incorporated by reference; and, it cooperates with the moving scale 90 to provide two phase position signals P1 and P2 in quadrature relation (90 degree phase shift between signals i.e. sine and cosine signals). There are four data track locations defined by a complete optical cycle of the moving scale 90 relative to the photodetector array of the assembly 100. The moving scale 90 and the reticle of the photodetector array of the assembly 100 are configured to have a resolution of 1000 tracks per inch.

The circuitry of the optical encoder assembly 100 is carried on a thin polyimide film substrate 102 which includes a connecting cable portion 104 which plugs into the printed circuit board 58. Lead-lag phase trim and symmetry adjustments are made at the factory in accordance with the techniques taught in the assignee's U.S. Pat. Nos. 4,647,769 and 4,661,696, incorporated by reference. Preferably the scale 90 and disks 64, 66, and 68 are formed of materials having linear coefficients of thermal expansion.

A temperature sensing thermistor 105 is also carried on the thin polyimide film substrate 102; the thermistor 105 makes direct thermal contact with the interior bottom wall of the base 48 at the vicinity of the optical encoder assembly 100 in order to sense temperature thereat. The thermistor 105 is periodically scanned by a microcontroller 130 which determines whether any change in temperature at the base 48 has occurred. When a thermal shift is noted, the microcontroller 130 causes the optical encoder assembly 100 and other thermally sensitive elements to become electronically recalibrated by reference to servo information read from the surfaces of the disks 64, 66 and 68 and read channel gain recalibration in a manner explained in greater detail hereinafter.

A spring-loaded aerodynamic actuator latch release mechanism 110 similar to one described in U.S. Pat. No. 4,647,997, incorporated by reference, is also journalled to the base 48. In this particular embodiment of air vane latching mechanism, a latch portion 112 directly engages a side of the moving coil 82 as best seen in FIG.

2. A vane portion 114 is disposed between the disks 64 and 66 as shown in broken line view in FIG. 2. With the particular embodiment of air vane mechanism 110 as depicted in FIGS. 1 and 2, it is possible to remove the disk stack when the vane portion 114 is moved to a position against the adjacent sidewall of the base casting 48; and it is also possible to remove the rotary actuator structure 80 from its journal when the latch portion 112 is moved to a position against the same adjacent sidewall.

When properly commutated DC power phases are applied to the three phase brushless spindle motor 52 and the disks 64, 66 and 68 are rotating at operational speed, airflow generated by disk rotation overcomes the bias force of the loading spring and deflects the vane portion 114. The latch portion 112 then moves free of the moving coil 82 and frees the actuator structure 80 so that it may rotate throughout its limited range of angular displacement.

Whenever DC power is removed from the spindle motor 52 and it begins to spin down, an electronic return spring circuit 143 senses this power-down condition and converts the spindle motor 52 into a generator, so that rotational energy stored in the rotating disk stack is converted to electricity and applied to cause the rotor coil 82 to move the actuator assembly to place the heads 94 over the landing zone LZ. When the disks slow down sufficiently, airflow is insufficient to deflect the vane portion 114, and the latch portion reengages the coil 82, thereby locking the actuator structure 80 as the heads 94 land at the landing zone LZ. The actuator structure 80 thereafter remains locked until the disks once again begin to spin up to operating angular velocity and the force of the bias spring is overcome.

A 0.3 micron micropore dust filter structure 116 is mounted in one corner of the base 48 in the path of airflow (shown by arrows in FIG. 2) generated by counterclockwise disk rotation as viewed from the top of the assembly 30 with the cover 118 removed. Any dust or particulate matter otherwise present or becoming loose within the enclosed interior space of the head and disk assembly 30 becomes trapped in the filter 116. A 0.3 micron breather filter (not shown) is provided through the thin aluminum plate cover 118 just above the disk spindle hub 74 where internal air pressure is at its lowest. As is well understood by those skilled in the art, the head and disk assembly 30 is actually assembled in a clean room or clean tunnel environment providing a Class 100 purified air environment in order to minimize particulate contamination of the interior of the assembly, so that the heads 94 do not strike particles as they fly so very close to the magnetic data storage surfaces.

Servo Information, FIG. 2

Figure 12:
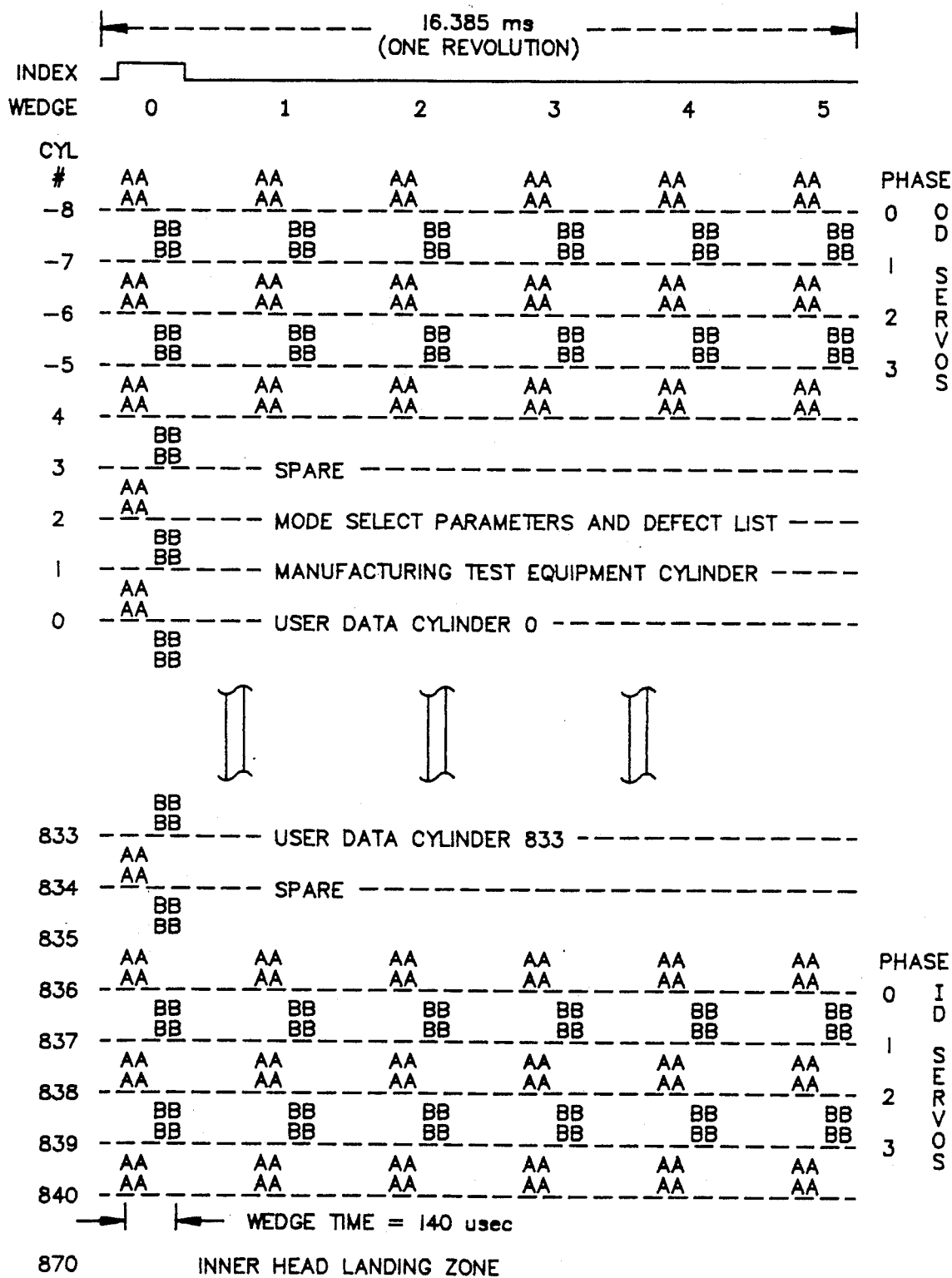
FIG. 12 is a servo information budget plan which graphs the placement of A/B servo bursts within each of the inner and outer servo tracks.

Servo information, preferably in the form of radially offset, time-sequential A/B servo bursts in servo sectors within inner and outer tracks in a manner described in the referenced U.S. Pat. No. RE 32,075, is prerecorded on each data storage surface. A servo information budget plan is depicted in FIG. 12 which graphs the placement of A/B servo bursts within each of the inner and outer servo tracks. The A/B bursts are recorded at the factory by the data transducer heads of the disk drive subsystem 10, based upon optimal track spacing information derived from an optical position encoder 100, discussed hereinafter.

In the subsystem 10, servo information labelled OA/B is recorded at the factory in a single sector on each surface in four outer cylinder locations -8, -7, -6 and -5 (it being understood that cylinder zero, the first data track directly available to the host system is e.g. the fourteenth physical track from an outer crash stop). Servo information labelled IA/B is also recorded in a single sector on each surface in four innermost cylinder locations, cylinders 836, 837, 838 and 839. Such servo information OA/B and IA/B is available to be read by the transducers 94 during optical encoder servo calibrate operations, to be explained in greater detail hereinafter. The use of servo information in outermost and innermost data tracks with linear spread of difference during an initialization calibration process is disclosed in the referenced U.S. Pat. No. No. RE 32,075.

As shown in FIG. 2, there are six circumferentially staggered sectors, one of which is associated with each data surface. The sectors begin with a spindle index marker 173 and are circumferentially offset for each data surface, so that servo information may be read from every data surface within a particular data cylinder during a single revolution of the disk stack, merely by switching transducer heads after each servo sector has passed by and the servo information therein peak-sampled, converted to digital information and then held digitally in microcontroller register locations.

Figure 3:
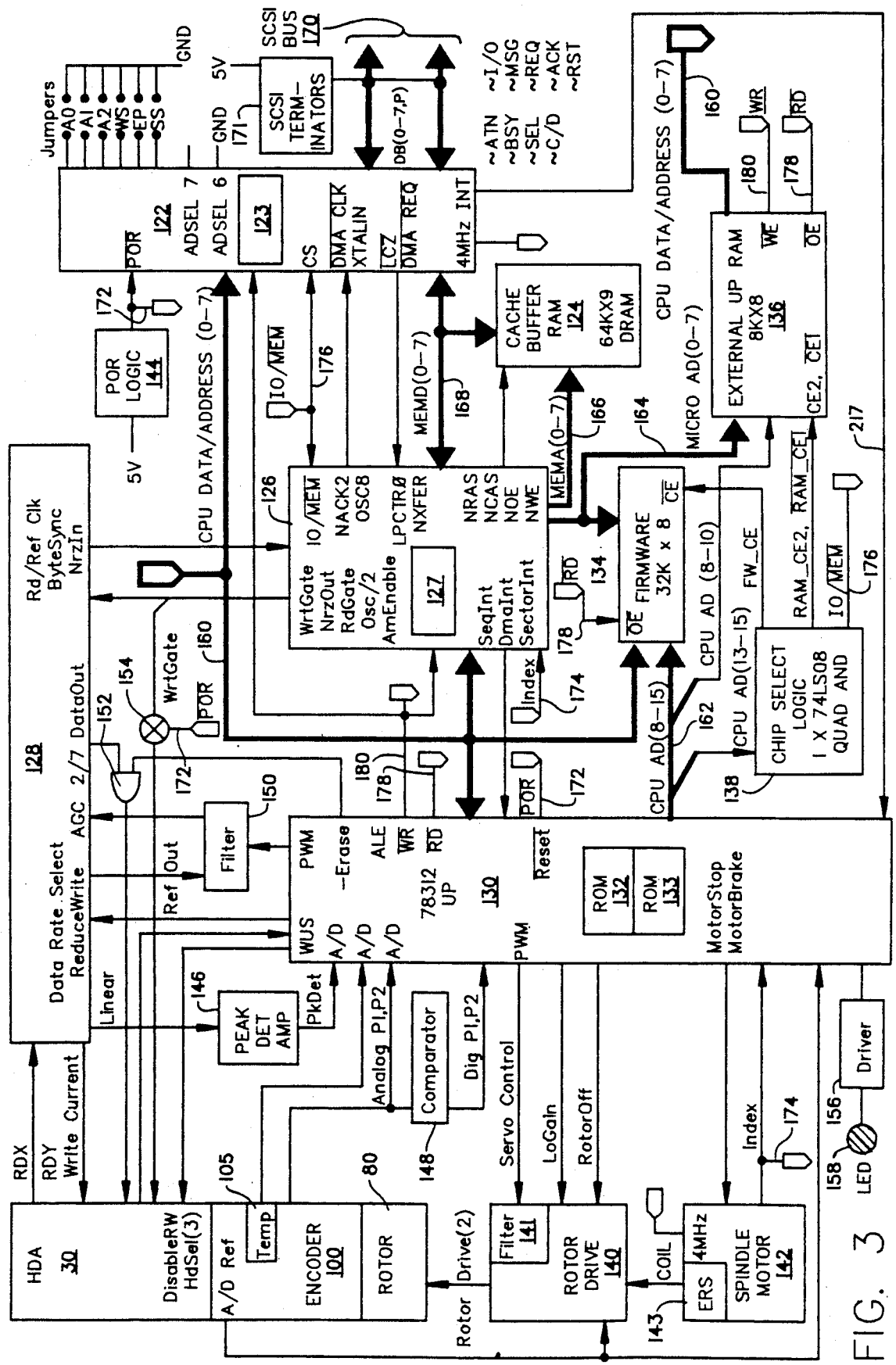
FIG. 3 is an overall electrical system block diagram of the circuitry included within the FIG. 1 micro-Winchester disk drive subsystem.

Control Electronics 120, FIG. 3

Circuit elements comprising subsystem control electronics 120 are principally assembled and interconnected on the main printed circuit board 58. As illustrated in the block diagram of FIG. 3, in the subsystem 10 there are six main subparts of the control electronics 120: a host (e.g. SCSI) bus interface circuit 122 having an internal input output data block loop counter 123; a 64 KByte cache buffer dynamic random access memory array 124; a combined data sequencer/DMA controller circuit 126 having an internal disk data block loop counter 127; a data synchronizer/encoder-decoder data channel circuit 128; a single supervisory microcontroller 130 having internal read only memory 132 and random access memory 133, external read only memory 134, external random access memory 136, chip select logic 138, and analog rotor driver circuitry 140 having an internal pulse width modulation to analog converter and filter 141; and, a spindle motor commutation controller and driver circuit 142 including the electronic return spring circuit 143.

The external read only memory 134 and external random access memory 136 are provided respectively to hold major portions of the control program and live time variables. The internal read only memory 132 includes time critical interrupt service routines such as servo interrupt service, seek interrupt service, Cache buffer service, and those of the command overhead service routines which must be executed very quickly. Access time to internal memory is one half of the access time to external memory. The internal random access memory 133 receives blocks of variables that are specifically selected by a particular task. For example, calibration values appropriate to a particular seek destination would be transferred as a block from the external RAM 136 to the internal RAM 133. These values would be calibration values corresponding to a particular head and phase of the optical encoder, such as head gain co-efficient and slope, optical phase offset and slope, etc.

Other circuits of the subsystem 10 include: a power on reset logic circuit 144, a peak detector amplifier circuit 146, an analog to digital comparator circuit 148, an external pulse width modulation to analog converter and filter circuit 150, an AND erase gate 152, a summing junction 154, an activity lamp driver circuit 156 and LED activity lamp 158.

A CPU eight bit cycle-multiplexed data/address bus 160 interconnects the microcontroller 130 with the SCSI bus interface circuit 122, the data sequencer/DMA controller circuit 126; the external firmware ROM 134 and the external controller RAM 136. The bus 160 carries eight bits of data during read and write cycles of the microcontroller 130 and carries the low order eight bits of address information (A0-A7) during address latch enable cycles thereof. A CPU high order address bus 162 carries the high order eight bits of address information (A8-A15) during read and write cycles of the microcontroller 130; this bus 162 extends to the firmware ROM 134, external RAM 136 and the chip select logic 138. A microchannel address bus 164 carries eight bits of address information from the data sequencer/DMA controller circuit 126 to the external firmware ROM 134 and to the external RAM 136. A DMA address bus 166 extends from the data sequencer/DMA controller circuit 126 to the cache buffer RAM 124. A DMA data bus 168 extends between the SCSI bus interface circuit 122, cache buffer RAM 124, and data sequencer/DMA controller circuit 126. A SCSI bus 170 connects the SCSI bus interface circuit 122 to a host computer (not shown) having a conventional SCSI port. A SCSI termination resistor network 171 sets the lines of the SCSI bus 170 to a logic high level in absence of logical activity at the circuit 122. The internal counters 123 and 127 of the SCSI interface circuit 122 and of the data sequencer/DMA controller circuit 127 are directly addressable by the microcontroller 130.

A power on reset signal line 172 distributes a power on reset signal generated by the power on reset logic 144 to the SCSI bus interface circuit 122, HDA circuitry 96 via the junction 154, and microcontroller 130 so as to initiate poweron initialization of the subsystem 10. A disk once-perrevolution index marker signal 173 (FIG. 2) generated internally within the spindle motor 52 is processed and shaped by the spindle motor processor circuit 142 and distributed on an index line 174 to the data sequencer/DMA controller circuit 126 and to the microcontroller 130. An input output/memory control signal generated by the chip select logic 138 is distributed via a line 176 to the SCSI interface circuit 122 and to the data sequencer/DMA controller circuit 126. A read cycle signal generated by the microcontroller 130 is distributed via a line 178 to the firmware ROM 134 and to the external RAM 136. A write cycle signal also generated by the microcontroller 130 is distributed via a line 180 to the SCSI interface circuit 122, the data sequencer/DMA controller circuit 126 and to the external RAM 136. Various other control lines as shown in FIG. 3 extend to provide control signal path between the elements of the control electronics 120.

The host interface circuit 122, which is preferably an enhancement of the features found in the OMTI type 5080 SCSI interface integrated circuit made by Scientific Micro Systems, Inc., of 339 N. Bernardo Avenue, Mountain View, Calif., interfaces the subsystem 10 to the host computing system via a conventional 50 pin SCSI connector. The SCSI interface circuit 122 is configured as a state machine which cycles through its processing states autonomously in accordance with the value set in the loop counter 123 while remaining under the supervisory control of the microcontroller 130. When the microcontroller 130 has provided the SCSI interface circuit 122 with information including the number of blocks to transfer count set into the loop counter 123 and the direction of data block flow, and when the microcontroller 130 has commanded commencement of a block transfer, the SCSI circuit 122 will transfer that number of blocks from the cache buffer 124 as addressed by the DMA controller 126 to or from the SCSI bus in accordance with the SCSI communications handshake protocol with the host computing system.

The SCSI circuit 122 includes an internal buffer for latching and holding SCSI command values received from the host or "initiator" and can assert a BUSY state in accordance with the SCSI protocol. When the microcontroller 130 becomes available for I/O supervision, the SCSI circuit 122 calls for service over the interrupt line 217, and thereupon the microcontroller 130 may direct the SCSI circuit to obtain and forward the SCSI command in order to begin command decoding and processing. In order to obtain such information, an address value from the microcontroller 130 is strobed into the SCSI interface circuit 122 on the falling edge of the address latch enable signal; then, data is strobed from or to the bus 160 by the read or write signals on the lines 178 and 180, providing that the SCSI interface circuit 122 is being addressed by the microcontroller 130.

The microcontroller 130 may also command the SCSI interface circuit 122 to perform direct memory access (DMA) operations between the SCSI bus 170 and the cache memory 124 in either synchronous or asynchronous mode. The interface transfer block loop counter 123 within the SCSI interface circuit 122 may be directly set and incremented by the microcontroller 130 so that block counts may be updated and modified to enable block transfer operations to continue uninterrupted during the microcontroller's second phase or "servo time" when the microcontroller 130 is performing its servo control supervision operations and is therefore unavailable to supervise input/output activity. This feature enhances the rate of overall data throughput.

The SCSI interface circuit 122 reads or writes data from/to the cache buffer 124 over the nine line DMA bus 168 (eight data bits and one parity bit). The transfer is controlled directly by the data sequencer/DMA controller 126 which handles addressing of the cache buffer via the cache buffer address bus 166. When the data sequencer/DMA controller 126 is operating in a page mode, data transfer between the cache buffer 124 and the SCSI interface circuit 122 can occur at up to 6.5 megabytes per second. This high DMA transfer rate enables the SCSI interface circuit 122 to communicate over the SCSI bus at a synchronous data rate of 4.0 megabytes per second, while the data sequencer/DMA controller circuit 126 simultaneously controls disk to cache buffer data transfers and cache buffer RAM refresh operations.

The data sequencer/DMA controller 126 combines in a single integrated circuit chip the structures and functions of the data sequencer circuit 413 and DMA memory controller circuit 417 as described in U.S. Pat. No. 4,639,863, incorporated by reference. In addition, the disk transfer block loop counter 127 within the data sequencer portion of the circuit 126 may be directly set and incremented by the microcontroller 130, so that transfers of blocks of data between disk data surfaces and the cache buffer 124 may be carried out without interruption as the data sequencer loops through its states in accordance with the loop count held in the counter 127, while the microcontroller 130 is performing its servo control operations.

The data format placed in each data track may be generally in accordance with the 512 user data bytes per sector format as set forth in the present assignee's subsidiary's U.S. patent application Ser. No. 07/098,913 filed on Sept. 21, 1987, now U.S. Pat. No. 4,914,530 incorporated by reference Logical data block sizes which are integral multiples of the 512 byte sector size are easily provided by concantenating physical sectors together as single logical units. Thus, block sizes of 1024 and 2048 bytes are easily provided within the subsystem 10. A one to one interleave ratio is presently preferred in the actual format of data sectors in each data track.

The read channel integrated circuit 128 is similar to the circuits 409 and 411 of the referenced U.S. Pat. No. 4,639,863. In addition, the circuitry 128 supports two data transfer rates: a first, faster rate for outside region of data tracks, and a second, slower rate for an inside region of data tracks, as more particularly explained in U.S. patent application Ser. No. 07/052,709, filed on May 20, 1987, now U.S. Pat. No. 4,825,321 entitled "modular unitary disk file subsystem having increased data storage capacity", incorporated by reference.

Bi-Phase Operation of Microcontroller 130

As was the case of the single microcontroller supervisor of the disk drive subsystems described in U.S. Pat. Nos. 4,639,863 and 4,669,004, incorporated by reference, the microcontroller 130 divides its time between two time divided, repeating phases: a first phase for supervision of data block read/write transfer operations carried out by the SCSI interface circuit 122, cache buffer memory 124, data separator/DMA controller circuit 126 and read channel 128; and, a second phase for servo control of head position of the actuator structure 80 and However, in the subsystem 10, time division between, and overall organization of, these tasks has been tailored in such a manner that performance of the microcontroller 130 has become more optimized. This optimization has further contributed to reduced average access time and enhanced overall data throughput performance of the subsystem 10.

Figure 4:
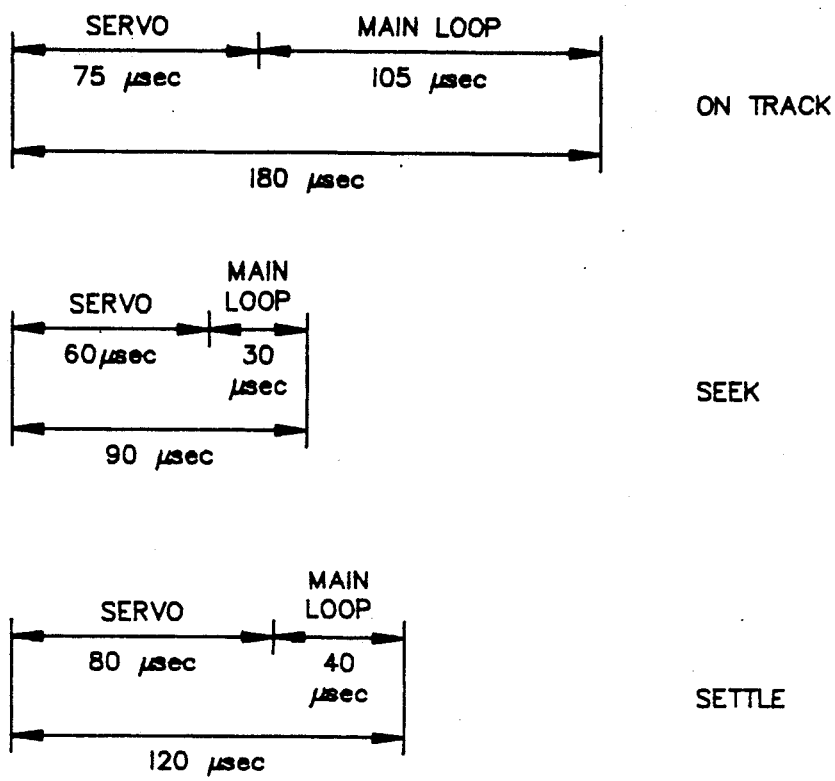
FIG. 4 is a diagram illustrating division of processing time between servo and controller supervision tasks of the single microprocessor controller of the FIG. 3 subsystem.
Figure 9:
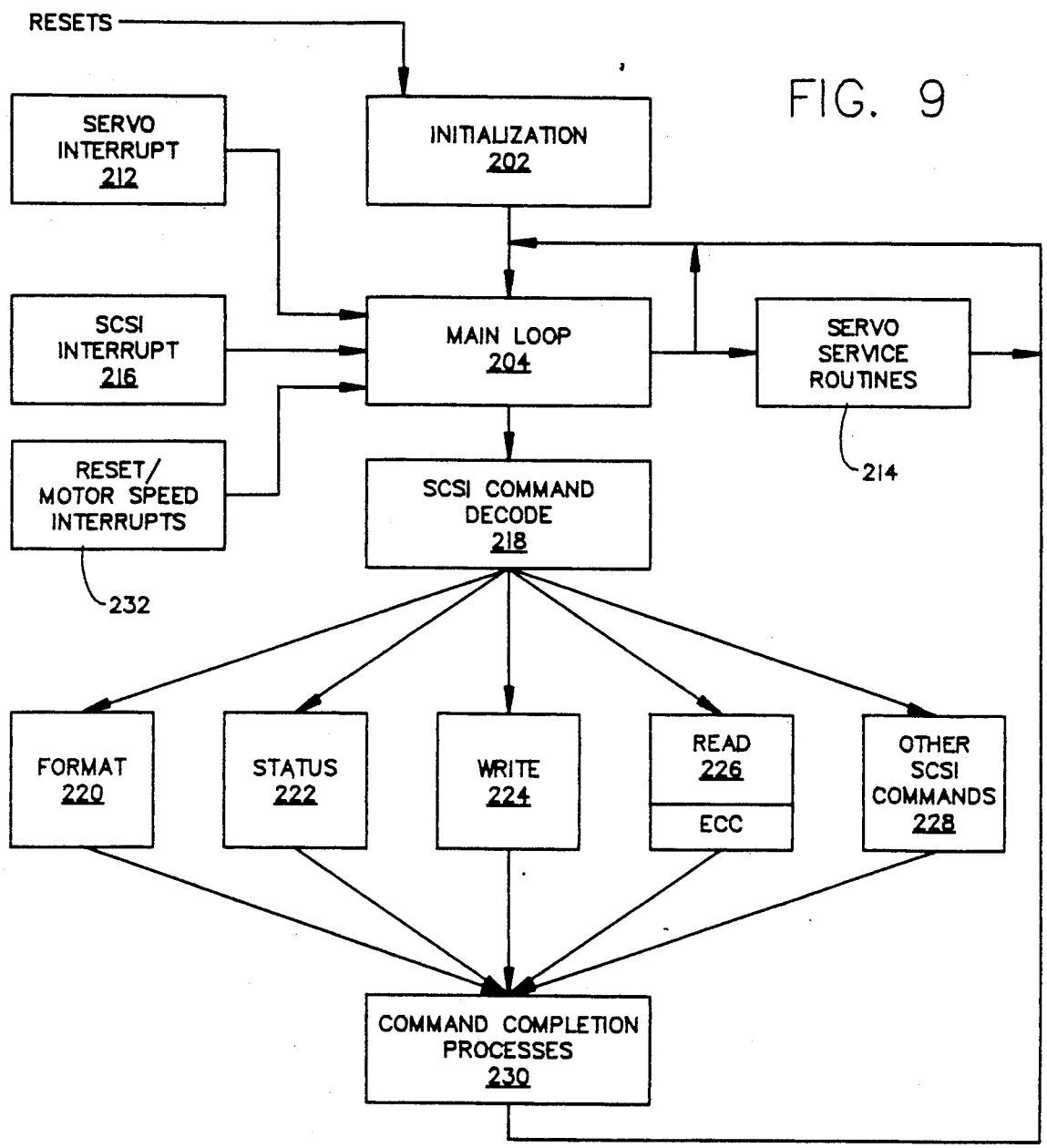
FIG. 9 is an overview flow diagram of the control programs executed by the single microprocessor controller of the FIG. 3 subsystem.
Figure 10:
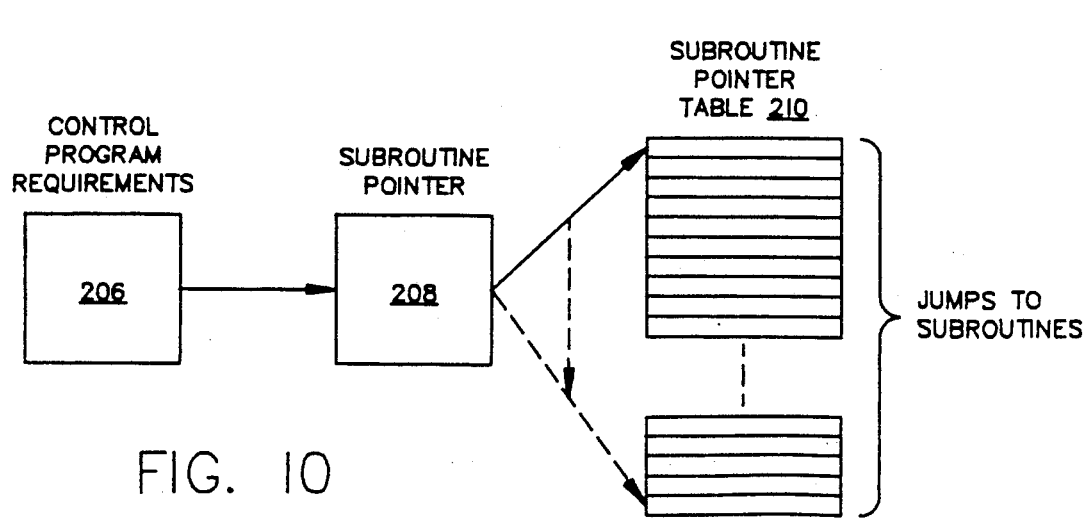
FIG. 10 is a diagram showing how service routines are pointed to during main loop time of the FIG. 8 flow diagram.

As shown in FIG. 4 when the subsystem 10 is in a track following or "on track" operational mode, a processing cycle of the microcontroller 130 takes about 180 microseconds and is divided between a 75 microsecond servo phase and a 105 microsecond main loop phase. (The main loop is discussed hereinafter in conjunction with FIGS. 9 and 10).

During track seek operations, when track crossing information from the optical encoder assembly 100 is coming in much more rapidly, the bi-phase processing cycle is reduced in overall length to 90 microseconds, in which 60 microseconds are devoted to servo phase processing and 30 seconds are given to main loop phase.

During a track settle operational mode carried out at the completion of track seek but before the actuator assembly is stably following the destination track cylinder location, the overall processing cycle is 120 microseconds long, in which 80 microseconds are for servo processes and 40 microseconds are for main loop tasks.

With this particular time division arrangement tailored to operational tasks, the microcontroller 130 is never off line from the main loop for more than about 90 microseconds. Thus, any SCSI command received from the host computing system, may be recognized by the microcontroller 130 within a 100 microsecond window Also, if a SCSI initiator device such as the host computer begins arbitration of the SCSI bus while the microcontroller 130 is executing servo time routines and unavailable, the SCSI interface circuit 122 automatically asserts a BUSY. The 100 microsecond window margin is important for smooth throughput of data in accordance with the ANSI standard SCSI communications convention. At the same time, faster track accesses and settles are carried out during servo time, since the microcontroller 130 is given more processing time during these servo-intensive, relatively less frequent, operational modes.

Preferably, the microcontroller is implemented with a 16 bit NEC type UPD 78312 microprocessor. This particular device includes multiplexed analog input and pulse width modulation output ports in addition to the digital data and address buses, control lines, on-board program memory 132 and random access memory 133, shown in FIG. 3.

In the subsystem 10 the on-board program memory 132 and random access memory 133 are used for storing program steps and live time values which are execution time critical, such as servo values. Since these memories are fully integrated with the microcontroller 130, access times to values stored therein are effectively twice as fast as compared to access times using the external program memory 134 and random access memory 136. By judiciously dividing control program subroutines and storage of live time values between the internal memories 132 and 133 and external memories 134 and 136, considerable improvement is realized in processing speed and efficiency of the microcontroller 130 over the referenced prior, single processor designs Overall main loop phase program execution followed by the microcontroller 130 is outlined in FIG. 9. Therein, any of the reset signals, such as the power-on-reset signal from the circuit 144 causes the microcontroller 130 to begin executing an initialization process 202. Once that process is completed, the microcontroller 130 enters a main loop 204. The main loop 204 follows a subroutine pointer table arrangement as set forth in FIG. 10. That is to say, during main loop time, the microcontroller 130 follows the path of the main loop 204 in executing routines and subroutines. As such routines are incrementally carried out, increments 206 are recorded in memory. These increments are used to control a subroutine pointer 208 which addresses a subroutine pointer table 210. This table 210 sets forth jump addresses for jumps to subroutines stored either in the on board program memory 132 or external program memory 134.

Three classes of interrupts enter the main loop 204: a servo interrupt 212 which occurs when an internal clock within the microcontroller 130 has determined that servo time has arrived (i.e. completion of an analog to digital conversion scan cycle of P1 and P2 encoder values). When a servo interrupt is received, main loop execution is halted at a particular program increment 206. The subroutine pointer 208 is then set to point to the next sequential step or subroutine in the table 210 to be carried out during the next main loop phase, and then servo service routines 214 are executed during the servo phase. These servo routines 214 will be explained in greater detail hereinafter.

After completion of the particular servo service routine phase, whether the servo routine be on-track, seek, microstep or settle, a return is made to the main loop 204. At any time during execution of the main loop phase a SCSI command received at the SCSI interface circuit 122 will cause that circuit to send a SCSI interrupt signal 216 via a line 217 to the microcontroller 130. When a SCSI command interrupt 216 is received during a main loop phase, a SCSI command decode routine 218 is entered, and the command is therein decoded.

Once a particular command is decoded, an appropriate service routine is pointed to and execution of the routine begins. There are virtually an unlimited number of commands that may be decoded and carried out. Several of the most frequently executed commands are given in FIG. 9. These commands include FORMAT 220, STATUS 222, WRITE 224, READ 226 (the other commands supported being lumped in the block 228). Execution of each SCSI command may require use of the same subroutines For example, the WRITE and READ commands 224 and 226 each require the microcontroller to seek (or microstep) and settle at a particular track location where data blocks are to be written or read. As part of these commands, seek and settle subroutines are executed.

Once a SCSI command has been completed, a command completion processes block 230 is entered, and housekeeping appropriate to complete the particular command execution process is carried out, i.e. values are saved, counters and memory locations are cleared, etc. At the end of the completion processes block, control program execution returns to the main loop 204.

Other interrupts, such as a motor speed interrupt, enter the main loop 204 at a block 232. The spindle motor controller circuit 142 includes a tachometer circuit which monitors disk angular velocity and signals the processor 130 if the spindle motor 52 and disks 64, 66 and 68 are not up to speed. In this event, the microcontroller 130 generates an appropriate status byte and sends it through the SCSI interface circuit 122 to the host computing equipment.

Servo Architecture

The servo architecture of the subsystem 10 employs both velocity and position servo loops, velocity mode for track seeking operations and position mode for settling, microstepping (short seeks) and for on-track centerline following operations.

Servo Fast Seek Mode FIG. 5

A model of the velocity information based servo architecture of the microcontroller 130 as configured during track seek operations is depicted in FIG. 5. This servo mode is employed with all seek operations in which the destination cylinder location is in excess of 24 cylinders away from the departure cylinder location. In this mode, the servo service routine interrupt occurs every 90 microseconds.

When current is applied to the rotor coil 82, the actuator structure 80 moves radially inward or radially outward, depending upon the polarity of the driving current. As the actuator structure 80 moves one way or the other, the microlines of the glass scale 90 interrupt the light paths of the encoder 100 and result in the two sinusoidal-like analog phase signals P1 and P2, with the signal P1 leading or lagging the P2 signal by 90 degrees, depending upon the direction of movement. When the analog P1 and P2 signals are applied to the comparator 148, two digital signals DIG P1 and DIG P2 result. The period of each signal DIG P1 and DIG P2 marks two cylinder boundaries.

These digital signals DIG 1 and DIG 2 are respectively applied to decrement two track downcounters 328 and 330 within the microcontroller 130 which have been preloaded with a value corresponding to one half of the number of cylinders to seek during the particular seeking operation. This number is based on the fact that the actuator structure 80 has previously been calibrated, and that the position of each data head is known with respect to a departure cylinder location, since the track ID corresponding to that location has been read and provided via the data sequencer/DMA controller circuit 126. Thus, if the departure cylinder location is 622 and the seek is to be radially outward to track 400, for example, a value of 111 (half of the total seek of 222 tracks) is loaded into each track counter. Once actuator motion begins in the proper direction, the down counters 328 and 330 will decrement on rising and falling edges of the DIG 1 and DIG 2 signals.

A 1.5 megahertz clock 321 provides a sampling rate to a free running counter 322. Two 16 bit clocked latches 324 and 326 capture the real time count of the free running counter a a predetermined sampling rate. On a first track crossing clock edge a count reached by the free running counter 322 is latched in the latch 324. On the next occurring edge, the count reached by the free running counter 322 is latched in the latch 326. The counts are differenced by a TACH summing junction 332. The difference between the values held in the latches 324 and 326 is a measure of the time elapsed between the last two track crossings and provides a real time velocity feedback signal VEL.

At the same time, outputs from the track counters 328 and 330 are combined in a tracks-to-go summing junction 334 to provide a total of the tracks remaining to be crossed and the resultant value is applied to address an appropriate trajectory value stored in a trajectory profile look-up table 336 in the external read only memory 134. A ratio value, VELNORM, of actual velocity VEL to reference velocity VELREF is calculated in a VELCALC junction 338 in order to normalize the difference between actual velocity VEL and reference velocity VELREF irrespective of magnitude thereof. In calculating the normalized error signal VELNORM (which is performed to reduce bandwidth of, and thereby stabilize the seek loop based on velocity information) the velocity reference VELREF is multiplied by 128 and then divided by real time velocity VEL. If actual velocity corresponds to profile velocity, then the VELNORM value put out from the junction VELCALC is 128. In any event, VELNORM lies in a range between zero and 256.

A feed forward current value FC is calculated by the microcontroller 130 at a process 340 to provide a base current value, depending upon the nature of the seek. The feed forward value FC is an a priori prediction of current expected to be required to carry out the seek. It is based on information which quantify the operating characteristics, some of which are developed during initialization calibration routines, discussed hereinafter. The feed forward value FC allows more accurate adherence to the desired seek trajectory for a given velocity servo loop bandwidth.

Figure 6A:
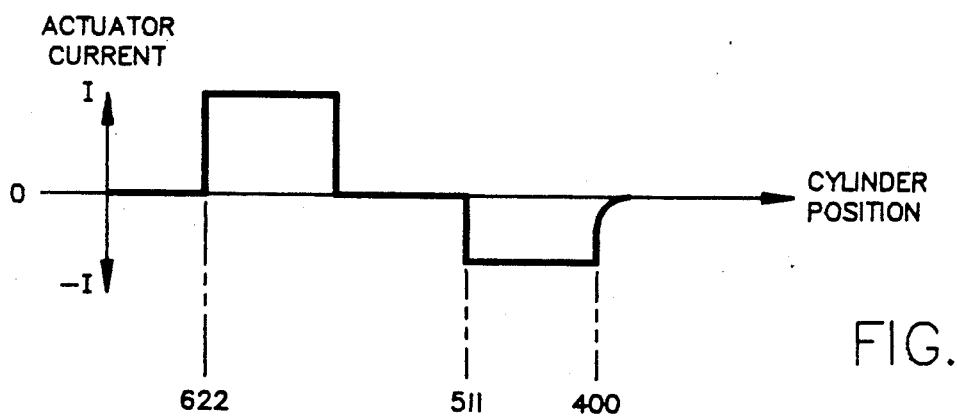
FIG. 6A is a graph of a seek mode feed forward prediction waveform generated within the velocity servo loop depicted in FIG. 5.

Basically, a nominal current waveform is preestablished for each seek length. The feed forward waveform value FC corresponds to the actuator current needed to keep the actuator on the idealized trajectory. The normalized, signed velocity signal VELNORM is added to the feed forward value FC to correct for any deviations from the reference trajectory due to friction, torque constant variation, etc. An example of a feed forward waveform value FC is set forth as FIG. 6A and illustrates an initial positive full current increment for causing maximum acceleration, a zero current increment for a coast interval and then a negative 80 % current increment for deceleration. Resultant velocity is graphed as FIG. 6B.

For example, in the 222 track seek example set forth above, the feed forward current value FC may be current full on in order to command maximum torque until either e.g. 43 inches per second of limit velocity (FIG. 6B) is reached at which point a zero current value coast increment is followed or the decelerate switch point, e.g. 111 tracks or some lesser or greater number is reached, depending upon the initialization information. During coasting mode, a substantially constant velocity of e.g. 43 inches per second is maintained. The switch point detection process compensates for the inductance of the actuator by switching to deceleration current mode approximately one millisecond in advance of convergence of measured velocity VEL and the switchpoint of the reference velocity trajectory FC. This look-ahead approach minimizes overshoot of the actuator trajectory. The switch point velocity is recalculated from the command velocity FC for each servo phase in the accelerate mode.

Figure 6B:
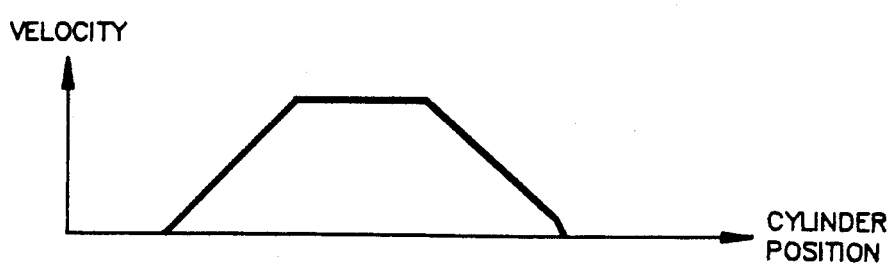
FIG. 6B is a graph of resultant velocity from the FIG. 6A prediction waveform as normalized by combination with a VELNORM value derived from actual velocity.

Continuing with the example of a 222 track seek (FIG. 6A), after the first 111 tracks have been crossed, the feed forward current waveform value FC may switch to a reverse current which is e.g. 80 percent of the full current, and this reverse current is applied until the actuator reaches the vicinity of the destination track and its velocity has slowed to almost zero (FIG. 6B). During accelerate, coast and decelerate modes the velocity servo loop is closed and feedback corrects the trajectory.

The normalized error signal VELNORM is added to the a priori feed forward value FC at a process 342 which yields an actuator coil current value I which is pulse width modulated by a pulse width modulator 312 within the microcontroller 130. The pulse width modulated I value is converted into an analog driving signal in the filter and PWM to analog converter 141. The pulse width modulator repetition frequency is 23.8 KHz and the filter 141 functions as a 3rd order Chebyshev filter for minimal passband phase loss (4.5 degrees) with a cutoff of 8 KHz.

The converted analog driving value is then amplified into a suitably signed driving current in the rotor power amplifier driver circuit 140 which preferably includes SGS L2722 dual power operational amplifiers to deliver up to one-half Ampere maximum current Separately controllable gain modes for the operational amplifiers are provided for track seeking and track following operations. High gain is commanded during track seeking operations. Snubber networks are provided to eliminate high frequency switching spikes.

The driving current put out by the driver circuit 140 is then applied to the rotor coil 82 in order to control its torque in order to cause the actuator structure 80 to approach and remain in correlation with the reference trajectory throughout the seek operation.

Figure 14:
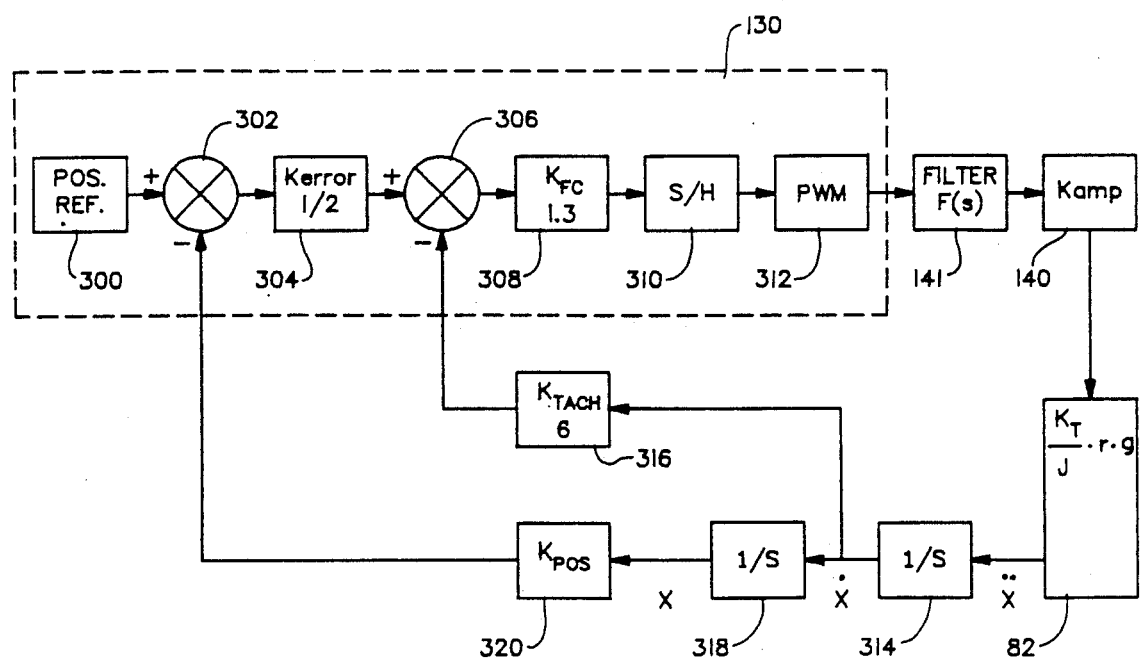
FIG. 14 is a functional block diagram of the FIG. 3 subsystem operating from position information in the angle servo seek mode during servo time.

Servo Angle Seek Mode, FIG. 14

A settle servo loop employing an arctangent look up table approach is described in commonly assigned Assignee' U.S. Pat. No. 4,516,177, particularly in conjunction with FIG. 7 thereof, the disclosure of which is hereby incorporated by reference.

Figure 7:
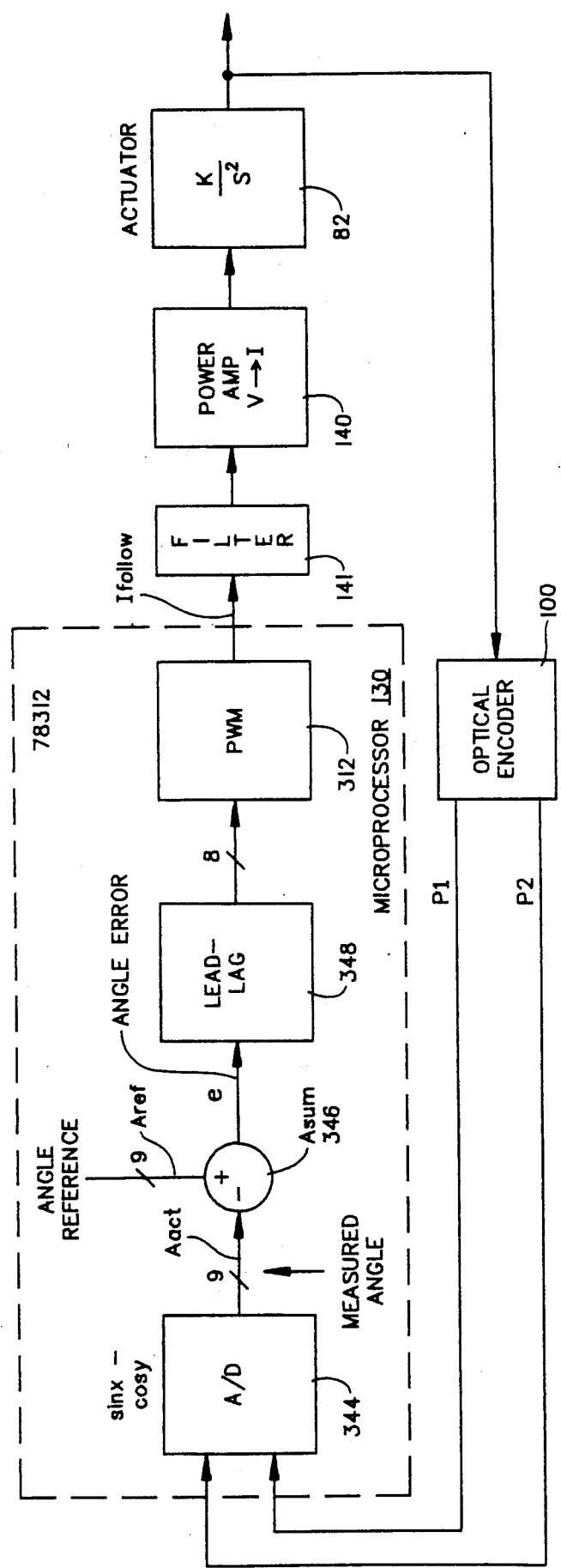
FIG. 7 is an architectural model block diagram of the FIG. 3 subsystem operating from position information in the track following mode during servo time.

In the disk drive of the present invention, while the angle seek mode is a velocity servo used for controlling short seeks and for controlling arrival and settle portions of long seeks, it has aspects of the architecture of the track following servo, FIG. 7 herein. (With one track resolution the fast seek mode position feedback is too coarse be used for the arrival and settling portion of a seek.) Also, there is excessive time delay in the velocity feedback servo loop fast seek mode at low angular velocities of the actuator structure 80. In this mode the microprocessor servo service routine interrupt occurs every 120 microseconds. A model of the servo angle seek mode is graphed by the block diagram of FIG. 14.

The angle seek mode divides each cylinder into 128 angular increments in order to overcome these problems at the lower angular velocities. With a track density of 1000 tracks per inch, positioning resolution is 7.8125 microinches per degree of encoder phase rotation, there being 360 degrees provided for four adjacent cylinders.

At about four cylinders short of the destination cylinder location, the velocity information servo depicted in FIG. 5 begins sensing angular position information in the fashion provided by the track following position information servo structure depicted in FIG. 7; and, it operates in an angle seek mode in which angular information samples are provided at a higher rate than during normal track following operations.

The analog outputs P1 and P2 of the optical encoder assembly 100 are received at two multiplexed channels of the analog to digital converter of the microcontroller 130. These signals are used to compute a corresponding angle in a range between zero and 511, indicating a position on an x-y lissajous circle, FIG. 8. The analog to digital process has a conversion time of 30 microseconds per channel. In the angle seek mode the P1 and P2 values are scanned and converted to digital values by internal firmware programming of the microcontroller 130. Once the two digital values are ready, the angle seek interrupt service routine is entered. The first step is to compute the measured angle for this interrupt. This angle is differenced with the angle from a previous sample. This difference results in a signed number of degrees travelled between interrupts, i.e. an ANGLE VELOCITY value.

The ANGLE VELOCITY or signed number of degrees per interrupt is summed in a 16 bit position error register to provide an ANGLE ERROR value. The ANGLE ERROR value indicates the number of degrees to go to the desired target angle on the four cylinder lissajous circle, FIG. 8. The signed 16 bit ANGLE ERROR value is sufficiently large to accomodate up to plus or minus 255 cylinder locations.

The ANGLE VELOCITY value is multiplied by a gain factor (Ktach=6). The product is used as the velocity feedback value Vel to be compared with a commanded value Fc. The ANGLE ERROR value is multiplied by a gain factor (Kpos = ½) in order to generate a position dependent command velocity Fc. The maximum command velocity in the angle seek mode is limited to plus or minus e.g. six inches per second. The command velocity profile Fc is linear with degrees to go. As the angle error nears zero, the command velocity Fc becomes zero. The difference between the command and measured velocity is multiplied by a gain factor Kfs. The error is added to a seek no torque value SEEK NULLI and put out to the pulse width modulator of the microcontroller 130 and thence through the converter/filter 141 and amplifier 140 to the coil 82 of the actuator. Upon transition from the fast seek mode to the angle seek mode, a calculation is performed within the microcontroller 130 to load the ANGLE ERROR register with the correct number of degrees to yield an ANGLE ERROR zero value at the final target angle (destination cylinder location).

Thus, in the angle seek mode the actuator structure 80 is commanded to move linearly to the destination track location by feeding precise angle reference values into the FIG. 7 servo loop until the final destination angle (position within the destination track corresponding to predicted centerline thereof) is reached. The advantage of this particular implementation of fine or angle seek mode is that it provides wide bandwidth with adequate phase margin for good settling characteristics.

With reference to the FIG. 14 functional model, within the microprocessor 130, a position reference block 300 supplies a digital reference angle value to a summing junction 302 in which the one half gain weighted actual angular position is subtracted. The difference comprises the ANGLE ERROR value which is multiplied by a gain factor of one half at a block 304. Weighted velocity (having a gain factor of six times) is subtracted from weighted ANGLE ERROR at a summing junction 306 to produce the position dependent command velocity Fc, and this value is weighted by a factor of 1.3 in a block 308 and then sampled and held digitally in a register 310 and is then put out from the microprocessor 130 via a pulse width modulator 312 to the filter 141 having a predetermined transfer function F(s). The filter 141 is a third transfer function having a cutoff at approximately 7 KHz. The filtered command velocity signal Fc is then amplified by the amplifier 140 and sent to the actuator 82 which is modelled as a double integrator. A first differentiator 314 (implicitly including the optical encoder structure 100) yields a velocity feedback signal which is six times weighted at a block 316, and a second differentiator 318 (also implicitly including the optical encoder structure 100) provides a position feedback signal which is one half times gain weighted at a block 320.

Settle Mode

At about five degrees from the predicted destination angle, a settle mode is entered. In this mode, the microprocessor servo service routine interrupt occurs every 120 microseconds. The servo bandwidth is 300 Hz and has 40 degrees phase margin. Lead/lag compensation is included in the servo loop. In the settle mode servo loop an integrator is also implemented within the microcontroller 130 in order t eliminate any DC error, such as that due to friction in the actuator spindle. At this point the integrator starts adjusting the NULLI values so as to drive the DC error to zero.

The settle mode difference equation is: Not self settled (integrator disabled):

$$Uk = 12*[Xk - .915(Xk-10] + NULLI(0)$$

Once self settled (integrator enabled):

$$NULLI = NULLI(0) + \frac{Sigma^k Xk}{60}$$

where:
Uk = Settle mode output,
Xk = ANGLE ERROR,
Xk−1 = Previous ANGLE ERROR, and
NULLI(0) = Predicted NULLI.

Once actual position is within e.g. plus or minus three degrees of nominal angular position for e.g. seven successive P1/P2 servo samples, the actuator is deemed to be settled and the servo mode switches to the on-track position . information servo structure depicted in FIG. 7.

Servo Track Following Mode, FIG. 7

A model of the position information based servo architecture of the microcontroller 130 configured during track following operations is depicted in FIG. 7. The microcontroller service bi-phase duration in this mode is 180 microseconds, as shown in FIG. 4. The servo interrupt service routines require about 75 microseconds, thereby enabling the SCSI main loop firmware to execute its routines during the remaining 105 microseconds. The servo track following service routines implement a lead filter and an on-track integrator as in the angle seek servo configuration.

The difference equation for the FIG. 7 servo track following mode is:

$$Uk = Xk + 8*(Xk - (Xk - 1)) + \frac{Sigma^k Xk}{80}$$

Figure 8:
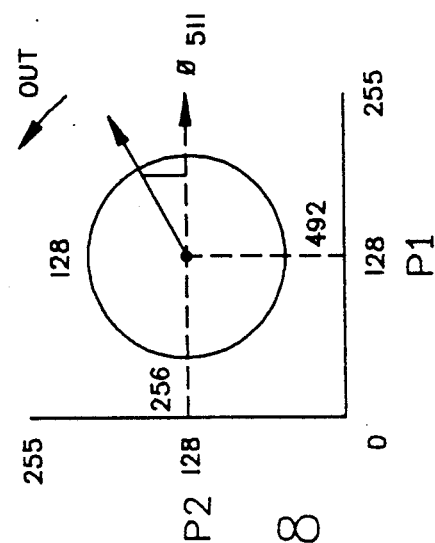
FIG. 8 is a graph of angular information derived from the optical encoder of the FIG. 3 subsystem operating in the track following mode during servo time.

The analog P1 and P2 phase signals from the optical encoder circuit 100 are converted into digital values by an analog to digital conversion process 344 carried out within the microcontroller 130. The analog values are converted into a sin x − cos y angle value by an arctangent table look-up which is similar to the process described in the present assignee's U.S. Pat. No. 4,419,701, incorporated by reference. This angle value is analogous to the four cylinder circle lissajous figure, as depicted in FIG. 8 in which the digitized four phases P1, P2, BAR P1 and BAR P2 define over the locus of the lissajous circle four cylinder locations in 512 digital angle increments. It is important for positional accuracy that the DC offset position of the FIG. 8 lissajous figure be maintained during operation of the subsystem 10.

The digital angle values 0–511 of the FIG. 8 circle represent four cylinder locations centered at digital values 0 (512) (track 0), 384 (track 1), 256 (track 2) and 128 (track 3, etc.). Thus, there are 128 digital increments or steps throughout each data cylinder location. Track 0 (and track 4, 8, 12, 16, etc.) is bounded, for example between digital angle values 63 and 447, while track 1 (and track 5, 9, 13, 17, etc.) is bounded between digital angle values 447 and 319, etc. The digital angle values wrap around the value 511 to zero.

The actual angle Aact measured by the optical position encoder structure 100 is differenced with a reference angle Aref in a summing junction ASUM 346 which results in a servo correction angle ANGLE ERROR. The reference angle ANGLE ERROR is derived by the microcontroller 130 for a particular track location from centerline offset and offset slope information obtained during the optical encoder servo calibration routines carried out during initialization and intermittantly during operation of the subsystem 10. The correction angle ANGLE ERROR is then further modified by a phase lead-lag process 348 conventionally provided for servo loop stability and is then pulse width modulated and put out as a track follow mode actuator coil current Ifollow by the pulse width modulator 312 of the microcontroller 130.

During a seek operation just preceeding the track following operation, the reference data for the particular head and phase (whether optical phase 1, 2, 3, or 4) of the destination track is read from the external RAM 136 into the internal RAM 133 in a block move.

The current Ifollow is then filtered and converted into an analog value by the filter/converter 141 and then amplified by the actuator power amplifier 140. It is then applied to the actuator coil 82 to generate whatever torque is required to cause the actuator structure to move to the angular position commanded by the microcontroller 130.

As already explained in the discussion of angle seek mode above, microstepping from track to track during settling, and seeks of e.g. twenty four tracks or less, is accomplished by adding or subtracting digital new angle values into the summing node ASUM from the angle reference source in order to cause the actuator to move to the new angular position. During settling at the end of a seek operation and during microstepping, position samples are obtained and processed from the optical encoder 100 more frequently than when the actuator structure is following a particular track location in the following mode. This increased sampling rate increases the servo phase margin and decreases settling time, thereby improving average seek time performace of the subsystem 10.

A bump detect feature of the track following servo prevents writing of data in the event of an external shock. A flag is set when the drive is writing data that enables bump detection via the servo interrupt. A bump is detected by testing the current value of ANGLE ERROR. If the off track error exceeds plus or minus 90 microinches, for example, the write function is aborted by writing to a register in the data sequencer 126. The servo service routine then sets a flag that indicates to the WRITE firmware that a bump has occurred. The WRITE command execution code will then retry to write the data block stream, beginning at the sector where the bump was detected.

A "write unsafe" service routine monitors the output of a signal from the read/write preamplifier 96. In the event that conditions such as a loss of write current, or no data pulses, are detected during WRITE command execution, the write unsafe service routine aborts the write operation and sets a flag indicating unsafe write condition to be read by the WRITE service routines.

A "seek back" feature of the track following servo mode is invoked in the event that ANGLE ERROR exceeds plus or minus one and a half tracks. This may occur if a very large shock force were applied to the drive. If this happens, a flag called OFF TRACK is set, and the subsystem 10 thereupon cannot perform a new seek until this flag is cleared. In seek back, the servo switches back to angle servo mode which has the full torque capability of the actuator 80 available for making the positional correction. The seek back mode will drive the actuator structure back to the correct servo reference angle, even if the shock force has driven the actuator several cylinders off track. The angle seek mode then initiates the settle mode to resettle and test at the correct angle. Then the track following servo mode is restarted and the OFF TRACK flag is cleared The subsystem 10 has recovered from the shock.

Initialization Process 202

When power is first applied to the subsystem 10 the microcontroller 130, SCSI interface circuit 122, and data sequencer/DMA controller 126 are first initialized. If an autostart jumper is installed, nothing further happens until a START command is received across the SCSI interface. If the jumper is not installed, or if a START command is received with the jumper in place, the spindle motor 52 is started and default servo and head gain values are loaded into appropriate locations of random access memory. Inward torque is then applied to the actuator structure 80 to move the heads 94 to the inner landing zone LZ in order to make sure that the actuator is at a known position.

The cache buffer 124 is loaded with "ones" (hexadecimal FF bytes) and then checked. The cache 124 is then loaded with "zeros" (hexadecimal 00 bytes) and again checked.

Spindle motor speed is then monitored until it is within one percent of 3662 RPM. The analog P1 and P2 values put out by the optical encoder 100 directly to an A/D port of the microcontroller 130 are then checked to be sure that they lie within a reasonable range. The digital P1 and P2 values put out by the comparators 148 are also checked and verified at the microcontroller 130.

The actuator 80 is then commanded to move to a midstroke position. In this subroutine the NULLI variables are set to default values. (NULLI is a current value which results in current in the actuator coil 82 which produces a torque equal to, and in a direction opposite from, any torque on the actuator 80 that would change its position, such as a bias spring force attributable to the flexible printed circuit, deflection from airflow generated by disk rotation, meaning that actuator actual position correlates to commanded position without positional error). The current cylinder register is set to 400 and the target cylinder is set to zero, which thereupon causes an outward 400 cylinder seek from the landing zone LZ and places the heads 94 at a midrange of the data surfaces.

Encoder center values are computed for both of the analog P1 and P2 values then being received by the microcontroller 130. An attempt is then made to read the format of the nearest track being followed by head zero to determine the actual track number recorded in the format.

If a track ID was successfully read, the initialization process 202 proceeds directly to an optical encoder servo calibration procedure. If not, the actuator 80 is commanded to microstep outwardly via the angle seek mode, e.g. 48 tracks at a time, until an outer crash stop is reached. Once the outer crash stop is reached, the actuator 80 is commanded to microstep inwardly while the microcontroller monitors the read channel via the peak detector amplifier 146, looking for the servo bursts written in the four outermost tracks. If the servo bursts are located, the microcontroller 130 has established a reference location for the heads and prediction servo initialization begins at track -4. If not, then a NO SERVOs routine is entered which places the actuator at cylinder zero, defined as the 18th track located inwardly from the outer crash stop.

Subsystem data, such as initial configuration values, a track defect map, a drive serial number, etc., is now read from a protected location, such as cylinder -3. This location is not directly accessible to the host computing system. Whatever configuration is specified by the information so read is then carried out within the subsystem 10. Typically, this information provides the firmware with values indicating whether an 80 megabyte drive with six heads is present, or whether a drive having greater or lesser heads/disks is present, etc.

A head A/B burst to encoder microstep calibration factor (Kab) is obtained and stored during initialization for each data transducer head 94. This factor is related to the particular width and gain characteristic of the head itself as determined by head manufacturing tolerances. This information enables the microcontroller 130 to know for each head how many degrees of compensation are required in order to move the particular head a known distance so as to be able to reach exact centerline alignment with the track to be followed. This calibration is only carried out in the initialization routine, as head width does not change significantly with temperature variations.

In normal operation a formula is used to compute the number of encoder degrees to change in order to set the angle reference to correspond with track center:

$$E = \frac{A * Kab}{[(A + B)/2]} - Kab$$

where:
  E = encoder correction (in degrees),
  A = A burst reading (0 to 255),
  B = B burst reading (0 to 255), and
  Kab = calibration factor.

For odd cylinder locations, A is replaced with B in the numerator of the above equation. The $[(A + B)/2]$ factor is the average of the A and B servo digitized amplitudes and normalizes the calculation for amplitude. As mentioned above, a nominal default value is used during power on initialization. Then, the head calibration factor Kab is accurately derived and stored for each head, as follows:
1. Seek to an even cylinder location.
2. Equalize A/B servo amplitude values using the default Kab calibration factor within +/− one microstep.
3. Step off a known number of microsteps toward the outside diameter (e.g. 16 microsteps).
4. Solve the above equation for Kab with all other variables known:

$$Kab = \frac{E}{\frac{A}{[(A + B)/2]} - 1}.$$

Servo calibration of the optical encoder 100 begins with the heads positioned at cylinder -8 and head 94(0) (track -8). The servo index interrupt 212 is enabled, which means that the index marker signal 173 on the line 174 causes the microcontroller jump to a routine to acquire and digitize peak amplitude values of the A/B servo bursts recorded on surface 0 immediately following the index marker signal. A timer is also started with occurrence of the index marker signal. The difference in peak values is determined and the track center encoder angle (OD) is computed and stored for head 0. Then, head 94(1) is selected and 2.8 milliseconds later the A/B servo bursts are read for head 94(1) and the difference in burst amplitudes is determined and the encoder angle (OD) is recorded for head 1. This process is repeated 5.6, 8.4, and 11.2 milliseconds after index for each of the other heads 94(2), 94(3), 94(4) and 94(5) for cylinder -8. Then, this process is repeated for cylinders -7, -6 and -5, so that angle (OD) values for the four tracks corresponding to each of the four phases defined by the optical encoder 100 are separately sensed and recorded. The outside diameter servo cylinders and surfaces have now been read and angle (OD) angle error values recorded in memory.

The same process is now carried out for the inside diameter servo cylinders and heads. The actuator 80 is commanded to seek to track 838, and the above-described process of obtaining and recording error values for the heads at cylinders 838, 837, 836 and 835 is carried out. Then, for each head and track phase, a slope value, comprising the difference in angle for each head at track phase P1, P2, BAR P1 and BAR P2, is calculated and recorded by correlating the angle errors from cylinder -8 with cylinder 835, cylinder -7 with cylinder 836, cylinder -6 with cylinder 837 and cylinder -5 with cylinder 838. These slope values, called ANGLE SLOPE, are then recorded in memory.

AGC gain is also determined during initialization, and also during calibration updates to control the AGC gain factor of the read channel circuit 128 as controlled by the pulse width modulator output through the filter 150. Since this variable is provided to compensate for gain variations due to head to disk velocity reductions as the actuator moves from outer cylinders to inner cylinders and due to thermal gain drift of the read/write head preamplifier electronics 96, the A/B gains of all of the heads 94 are averaged for an outer and an inner cylinder location and an overall AGC reference value and an overall AGC slope value is determined and recorded. Thereafter, when a seek is made, an AGC value for a particular track location is calculated and applied as an AGC value.

The NULLI or on-track current required to keep the head structure in track-following alignment will have a different value when the cylinder location is approached from different seek directions. Thus, during initialization, a hysteresis calibration is carried out by deriving and storing a value for seek in the inward direction and a value for seek in the outward direction. The hysteresis calibration is used to predict the required on-track NULLI current for a given track and seek direction. This value reduces settling time by priming the integrator established during the settle mode with a null torque value that is closer to final value than otherwise.

When all of the initial tasks required to set up the subsystem 10 for data read/write operation have been completed, the drive ready flag is then set, and initialization is complete.

Main Loop 204

The main loop process 204 checks to see if an ID switch flag is set. If so, the subsystem ID number available at the SCSI interface circuit 122 to the host computing system is changed. If any SCSI reconnects are owed, reselection arbitration is started for the initiator host system. If the drive has been reserved by a particular initiator, this fact is determined. If any initiator is queued on a reserve list, reselection arbitration is started for that particular initiator. If a self seek jumper is installed on the circuit board 58, a self seek service routine is called.

If a pre-fetch operation is active, meaning that the subsystem 10 either is transferring subsequent data blocks or about to transfer subsequent data blocks from the disk to the cache buffer 124 in anticipation that such blocks will be requested by the host, based on the most recent block requested, then the main loop branches to a series of pre-fetch service routines which are carried out until completed.

If a pre-fetch operation is not active or is incomplete, then the main loop process calls the next background subroutine pointed to in the subroutine pointer table 210. One such subroutine is the check thermistor subroutine. In this routine the temperature sensed by the thermistor 105 is read and converted to a digital value and added to a running sum. After 90 such readings, the running sum is divided by 90 to obtain an average temperature. This average temperature is then compared to a thermistor base value in order to determine whether the average temperature has increased or decreased more than a predetermined threshold amount from the base value.

Figure 13:
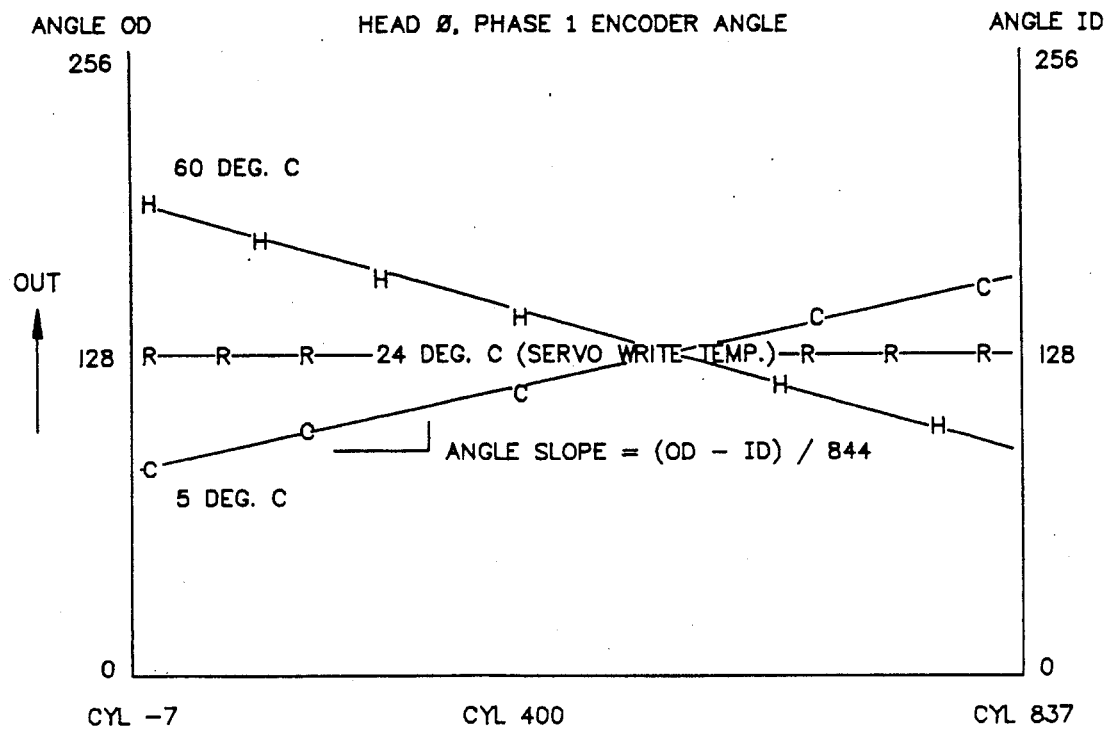
FIG. 13 is a graph showing the manner in which the prediction angle for a given head and phase will vary over temperature.

If sensed average temperature has risen above or has fallen below a threshold amount, such as 2 degrees Centigrade from the last reading, servo prediction recalibrate subroutines are called. During a prediction update, the microprocessor 130 will position the actuator over the outside diameter (OD) servo cylinders and read the A and B burst amplitudes for each head and optical encoder phase (See FIG. 12). The computed new angle references are stored in a table. The actuator is then positioned over the inside diameter (ID) servo cylinders and the A and B burst amplitudes for each head and optical encoder phase are read. The encoder reference angle measured on the inside diameter is differenced with that of the same head and phase on the outside diameter. A slope is then computed and stored, enabling the seek servo routine to linearly interpolate the prediction angle for a head as a function of the requested destination or seek target data cylinder location. Typically, the prediction angle for a given head and phase will vary over temperature as shown in FIG. 13.

During servo prediction recalibration, the X-Y center of the optical encoder P1 and P2 values is recalculated and compensation values are stored in order to eliminate any DC offsets due to encoder thermal drift. Values enabling determination of the NULLI or on-track current vs. track position and seek direction are also obtained and stored in memory during calibration.

During the servo prediction recalibration routines, the head gain correction factors Kab for each head determined during initialization are used. A timer is established within the microprocessor 130 and monitored as well as the thermistor 105, so that in any event, the servo prediction recalibration process is repeated periodically during continuous operation of the subsystem 10, e.g. once each hour.

When a background subroutine is completed, the subroutine pointer 208 is incremented, and then the next background subroutine in order in the table 210 is called and executed. In this way, a wide variety of background subroutines may be carried out progressively in an orderly fashion, and, new subroutines may be conveniently added as may be required for a particular disk subsystem configuration merely by adding jump addresses to the subroutine pointer table 210 and adding the subroutines to available space in the firmware memory 134.

The main loop then tests whether a SCSI command has been received at the SCSI interface 122. If not, the main loop returns to test for prefetch activity. If a SCSI command has been received, the prefetch is aborted after a minimum prefetch operation has been completed. The main loop process is then left, the SCSI command is decoded and then processed. After the command is completed, a return is made to the main loop; and, execution processing of a particular background subroutine in the table 210 is resumed in accordance with the location pointed to by the subroutine vector pointer 208. Thus, subsystem delays during command execution will be limited to those of seeking to and finding the correct sector on the disk surface.

SCSI Command Decode 218

The host computing environment, denominated an initiator, may send a wide variety of commands to the subsystem 10 including the Format command 220, Status command 222, Write command 224, Read command 226 and other commands 228 such as Test Unit Ready, Rezero Unit, Request Sense, Reassign Block, Seek, Inquiry, Mode Select, Reserve, Release, Copy, Mode Sense, Start/Stop Unit, Send Diagnostic, Read Capacity, Read Extended, Seek Extended, Verify, Read Defect Data, Write Cache Buffer, Read Cache Buffer, for example. These commands are received and stored as byte values in the SCSI interface circuit 122. Once received, the SCSI interface circuit 122 generates a SCSI interrupt 216 and sends it via the line 217 to the microcontroller 130. The microcontroller 130 senses this signal at the step 218, obtains the command from the SCSI interface circuit 122 via the bus 160 and calls a set of routines to accomplish the particular command. The write and read service routines are similar in architecture and will be described in conjunction with FIG. 11.

Figure 11:
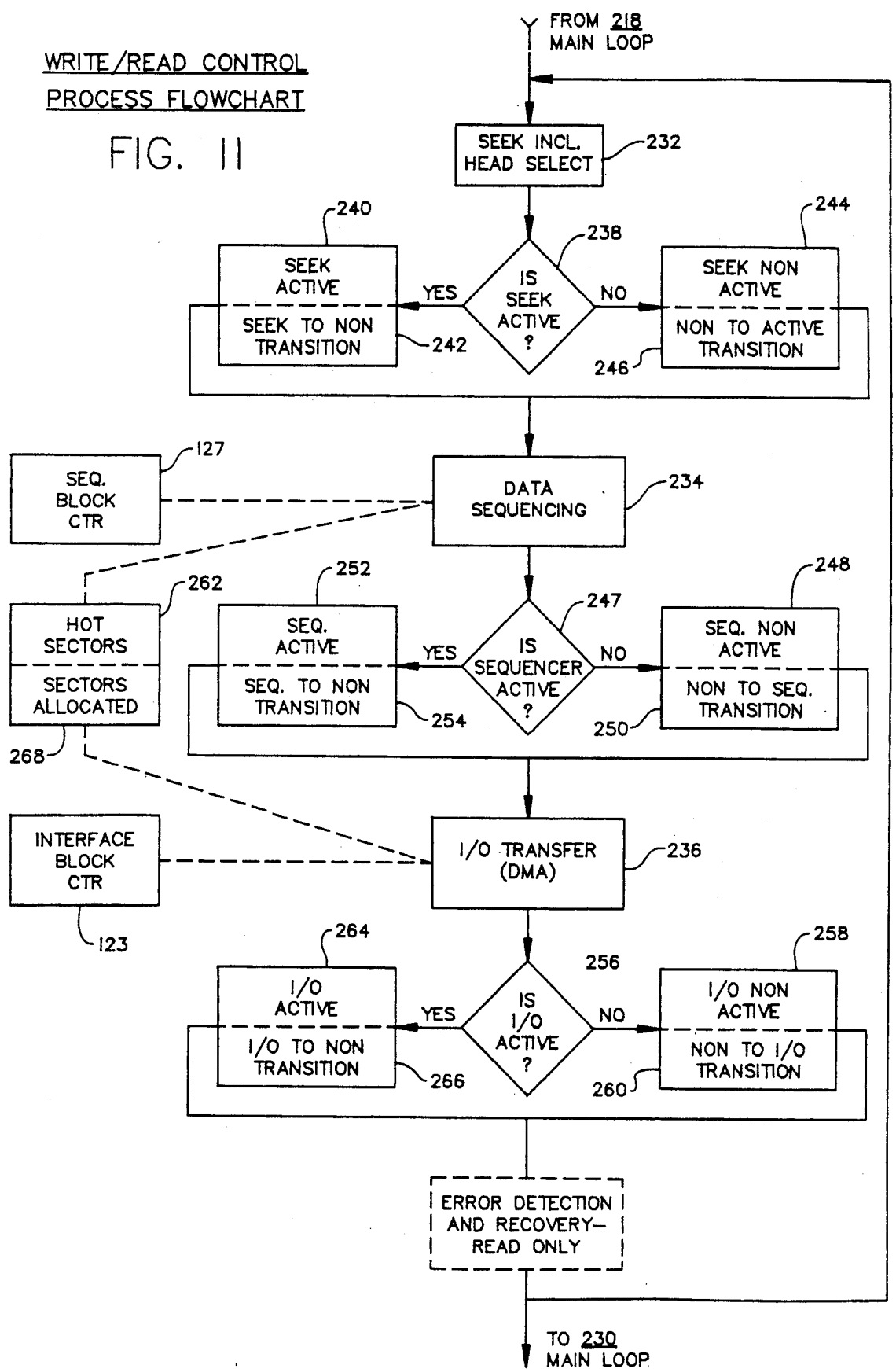
FIG. 11 is flow diagram of READ and WRITE command execution service routines.

Write/Read Command Processes, FIG. 11

The main processes carried out by a disk drive are read and write. These are very similar processes with a few exceptions. During write, it is very important to determine whether the drive has been bumped or jarred. Thus, the optical encoder phases P1 and P2 are carefully monitored in a bump detect routine in order to determine whether there has been any unexpected change in value. If so, then the write process is immediately discontinued. During read, checking is carried out to determine the validity of the data read from the disk and to correct for any correctable errors, should that be required. The following discussion is related to the read command execution process as exemplary of these two main processes.

When, for example, a SCSI read command is first decoded, the microcontroller 130 sets up the read process 226 by first determining if the number of blocks to read is greater than zero. If not, the process returns to the main loop. If so, values are set for the data sequencer/DMA controller 126 including target final head, target final cylinder and first sector identification. The block size, including ECC bytes is set into the data sequencer/DMA controller 126 and into the SCSI interface circuit 122. A check is made to be sure that the first sector is a legal value.

The cache buffer 124 is scanned to see if the requested data block is already in the buffer because of prefetch activity. If so, then there is no need to reread the data, and the DMA process will be able to transfer the block to the host without further data sequencer activity.

The seek process is then started and head position supervised during seek servo time. A routine is called to calculate the last or highest required address for the cache buffer. The cache buffer memory 124 is arranged as a logical ring, and buffer pointers which point to the next available space in the buffer 124 are set for starting and ending address values; the pointers may have to be rolled over through an address boundary.

A prefetch is calculated which is based upon an assumption that additional blocks in order will be sought by the host, and that throughput is increased if those blocks are read into the cache buffer just after the block being sought is read off the data surface. A main command execution loop, depicted in FIG. 11, is then entered.

Within the write command control process 224 and the read command control process 226 there are three independent and asynchronous activities: a seek activity 232 which is cognizant of movement of the rotary actuator 80 from one track location to another; a data sequencer activity 234 which is concerned with the task of locating data blocks (sectors) at a particular track sector location and moving such sectors to the cache buffer 124 during the read command control process 226, and with locating sector locations and moving blocks of data from the cache buffer 124 into disk track sectors during the write command control process 224; and, I/O (DMA) transfer activity 236 which is concerned with direct transfer of data blocks between the host computer and the cache buffer 124 via the SCSI interface bus 170. While the DMA transfer activity 236 may occur simultaneously with both the seek activity 232 and with the data sequencer activity 234, the latter two activities are mutually exclusive: data cannot be written to or read from a disk surface while the actuator structure 80 is seeking from one track location to another.

When the read or write command process is entered from the command decode 218 in the main loop 204, e.g. the seek process 232 is tested by determining whether seek is active at a logical node 238. If so, a seek active routine 240 is executed which basically tests to see if the seek process has timed out. The seek process 232 may be in a transitional state from active to non-active; and if so, a transition routine 242 is executed. If the seek process 232 is not active, the a seek non-active routine 244 is executed; and if the process 232 is in a transitional state from non-active to active, a second transition routine 246 is executed.

When the data sequencing process 234 is reached, a test is made to determine if the data sequencer 126 is active at a logical node 247. Since the data sequencing process 234 cannot be active during a seek, it executes a sequencer not active routine 248 which tests to see if the seek complete flag has been set. If not, then the data sequencing process 234 proceeds to the DMA process 236.

If the seek complete flag has been set, a transitional state 250 is entered. It tests whether the final head is the target head and final cylinder location is the target cylinder location. It then determines how many sectors are to be read in carrying out this particular read command from the host. A sequencer loop count in the sequencer loop counter 127 is set equal to the number of sectors to be read.

The identification of the first sector to be read is sent to the data sequencer 126; and, address pointers are set in the data sequencer/DMA controller circuit 126 for the cache buffer memory 124. A timer is set to enforce a sequencer timeout in the event of a failure to locate the first sector location. And, finally, in this transitional state 250 a flag is set to change the data sequencing state from non-active to active. Then, the DMA process 236 is entered.

If the sequencer is active, then a routine 252 is executed. This routine 252 tests whether the data sequencer 126 has completed its tasks. If so, the sequencer active flag is cleared and a transitional routine 254 is executed which tests for possible DMA overrun errors by testing whether the final loop count is other than zero. Since there may be additional sectors left to be read in this particular track, called "possible hot sectors" those sectors are loaded into the cache buffer 124 in anticipation that they may be called for by the host. The data sequencer 126 is tested for any possible errors, and if none, the sequencer active flag is cleared and the DMA process 236 is called.

If the data sequencer 126 has not completed its tasks, a check is made in the routine 252 to determine if the sequencer timer has timed out, indicating difficulty reading the desired data. Then, a check is made to see if there are more sectors to read and whether there is available room in the cache buffer 124 to hold them. If so, the SCSI command interrupt is turned off and a test is made to see whether the data sequencer loop counter 127 may be modified so that additional sectors may be processed while the microcontroller 130 is in servo time. If so, then the loop counter 127 is incremented by an additional count corresponding to the additional blocks requested via the SCSI interface circuit 122. When the sequencer timer times out, the SCSI command interrupt is reenabled and a sequencer done routine is called which sets the sequencer active flag to non-active.

During read mode the data sequencer active state 252, and the transitional state 254 also perform certain error correction code detection and correction processes which are lumped as a block 255 below the DMA I/O block transfer process 236. The data sequencer checks ECC syndrome bytes of each data block read from the disk surface and calls an error correction routine in the event that an error is detected. An error correction process of this type is explained in greater detail in the assignee s U.S. Pat. No. 4,730,321.

The third major logical node in the write/read process is the test as to whether DMA is active 256. If DMA is not presently active, the process follows a non-active routine 258 which may include a transition routine 260 to active.

In the I/O non-active routine 258, a test is made to determine whether the subsystem 10 is disconnected from the SCSI host bus. If the subsystem 10 is connected to the SCSI host, the routine tests whether the number of hot sectors already in the cache buffer 124 is greater than or equal to the total number of blocks required by the host. If not, then a test is made whether the sectors left to read value is less than or equal to the number of sectors to prefetch. If not, then a return is made to check the seek node 232.

If either of these last two DMA node tests is true, then a host reconnect interrupt routine is called and the SCSI interface circuit 122 is enabled and its data flow direction is set. A check is then made to see if there are any complete blocks present in the buffer 124 ready to be transferred to the host. If so, then a command is executed to be sure that the SCSI interface circuit loop counter 123 is loaded with a count corresponding to the number of blocks in the buffer 124 to be transferred via the SCSI bus 170 out to the host. If it is correctly loaded, then the SCSI interface circuit 122 is reset and commanded to send out the blocks presently held in the buffer by causing the DMA controller 126 to address each of those blocks in turn in the buffer 124 via the buffer address bus 166. The data blocks are read out of the buffer 124 via the buffer data bus 168.

As blocks are sent out to the host, a hot sectors register 262 is decremented by the number of blocks to be read out via the interface 170 to the host. A DMA active bit is then set, and a return is made to the seek active node.

If the DMA is active as tested at the node 256, a DMA active routine 264 is executed. A transition routine 266 from DMA active to DMA not active may also be executed if the end of the DMA block transfer has been reached.

The DMA active routine 264 tests for a verify command which if true clears a bit flag value for host DMA active and then calculates a sectors allocated value stored in a register 268 in main random access memory.

Certain checks are made at the block 255 to see whether there are any parity errors in the cache buffer 124, whether there are any communications errors across the SCSI interface and whether there are any errors associated with the FIFO buffer located in the SCSI interface circuit 122. If there are no errors and if the number of blocks to transfer has now reached zero, a return is made to the main loop 204.

If the verify command is not true, then the DMA active routine determines the number of blocks transferred from the number of blocks to transfer less the count held in the SCSI interface block counter 123. If the number of blocks transferred is greater than zero, then the sectors allocated register 268 is set equal to the number of blocks transferred times the sectors per block. The blocks to transfer value is set equal to the total number of blocks less the number of blocks transferred. A more-blocks-to-transfer value is calculated in a way that precludes transfer of any hot sectors in the buffer that are a part of a prefetch and are not yet actually requested by the host.

If the more-blocks-to-transfer value is greater than zero, then a request is made to increment the SCSI interface loop counter 123. A test is made as to whether such a change may be made in the counter 123, and if so, the loop counter 123 is incremented with the more-blocks-to-transfer value. This update of the counter 123 is carried out at this point in the program execution, so that the SCSI interface circuit 122 may continue sending blocks of data over the SCSI interface, even though the microcontroller 130 has shifted from the main loop phase to the servo phase. Then, the hot sectors register 262 of main memory is decremented by the number of sectors that have been incremented to the count held in the SCSI interface counter 123. A return is then made to the seek check logical node 232.

During execution of a read command process 226, it will be appreciated that the data sequencer process 234 will complete its task of locating data on the disk and transferring blocks into the cache 124 before the DMA process 236 has completed sending that data on to the host via the SCSI interface circuit 122. During execution of the write command 224, just the opposite is true: the DMA process 236 will complete before the data sequencer process 234 is completed.

As illustrated in FIG. 11, the three main subprocesses, seek 232, data sequencing 234 and DMA transferring 236 are independent of each other and DMA transfers may be occurring simultaneously either with seek activity or with sequencer activity. While the data sequencing process 234 is independent of the DMA transfer process 236, the actions must be coordinated. Coordination occurs via the hot sectors register 262 and the sectors allocated register 268 of main memory. The hot sector register 262 informs the sequencing process 234 during write command execution that one or more sector blocks are available in the cache buffer 124 for transfer to disk. When these blocks are written to disk, the sequencing process uses the sectors allocated register 268 to inform the DMA transfer process 236 that holes have been created in the cache buffer 124 which are now available for additional blocks from the host, and the DMA process 236 then goes out to the host, obtains new blocks, causes them to be loaded into the cache buffer 124 and then increments the hot sectors register 262 to cause these blocks to be added to the count of sectors awaiting transfer to disk.

Thus, during the progress of a seek to a specified track location the cache buffer 124 is filling up with data blocks via the activity of the DMA process 236, and the hot sectors register 262 is incrementing. If the host transfer is larger than the cache buffer capacity, 16 sectors are loaded into the cache 124 and the DMA transfer process waits until one or more of these sectors is written to disk and a hole in the cache memory 124 becomes available before requesting any more data blocks from the host.

In the read command execution process 226 the hot sectors register 262 contains the count of the number of sectors that have been transferred from disk to buffer including prefetch sectors which lie in the track sequentially from the requested sectors but which have yet to be requested by the host. In the read process 226 the sectors allocated register 262 contains the count of the number of sectors that have been transferred via the DMA transfer process 236 to the host thereby creating holes in the cache buffer 124 for additional sectors to be read from disk.

Data is stored vertically in each cylinder location so that during a read operation it may be necessary to perform a head switch to the next head in order, which provides the next data track. When a head select is made, the seek active node 238 is true and the sequencer process 234 is inhibited during the head select process which is accomplished in a few microseconds. When it is necessary to move the actuator to the next cylinder, an angular microstep to the next adjacent track is typically commanded via the on track position servo and this condition also results in the seek active process 234 being true. A single track seek requires about six milliseconds to complete.

Here follows a listing in object code of a control program to enable the microcontroller 130 to carry out the control tasks described above. The first two digit positions following the leftmost colon in each line set forth the line character count "n". The next four digit positions set forth the memory address for the starting byte of the line, the next two digit positions are zero, and the next "n" characters are the byte values of the program contained on the particular line. The last two digit positions of each line comprise a check sum for the line.

Microprocessor ROM 132

```
:2000000028004C200000000000000000000000000000000000000000000000000004
:20002000000000000000004F204A0BFC20FE08894EA0EB2B40072B41000944FF002CA320431C
:200040006F707972696768742028432920313938382051756E74756D20436F72706F72DC
:200060006174696F6E202D20416C6C207269676874732072657365727665642E09F048E05F
:2000800003AD0708A1EB03285B2008A29A08285E202861201407769B041C20057808A499A6
:2000A000DB08A29A3B09F0F5D83835F0050820909A2A8F1083D875E90708AFD2F9289D207C
:2000C0008A29B196712E05D165F80FBAC7F382DF07AF1F07AF02AB90009F110E02855206D
:2000E0008A29931A29909F0EEDB240109F0EFDB24E8475909F1BEDA5922840FFEDCDA8324
:200100000367C7DA240F09F1EFDBD009F1EEDB2894202CEE0209F0FBDB9C7C8150207D0AF3
:2001200010ADDA03AF47B90022F809F152E0387DF30AB0B5DA6700D6B90155B90306A00190
:20014000B90106A002B93E06A003B90806A004620500B19A28102020F809F152E0387DF33C
:20016000AB0B5DA207CADFF67FBDB16DC3C22FE280A20830AD3AC7FAF7F80062C56022C22
:20018000CB0208A7F337B80C05082D642724E809F0C2DA223609F0C1DA223709F0C0DA2295
:2001A0003809F0BFDA223909F0C5DA222409F0C4DA222509F0C6DA2284BA091437B808054C
:2001C00082D842524E809F0C0DA223609F0BFDA223709F0BEDAAC1F22383A390009F0C17C
:2001E000DA22243A2500AF008002262509F0C2DA2284BA0565BEDA58161C805F32F95922FE
:200200008303AC0408A1994E207D0A10ADDA030F081799030E081699AC0708A799028008C3
:200220009F0BEDAACE08102B09908A0830370994B08A2830408A1EB4808A07E6408A18390
:200240006207E3089747E0230A1AC079F7D81513A82182CFF023A801C1439289720AEC808
:200260009F1F6DBB90A77F302B9068A1209F1F4DBB90009F1F5DB3A801F14183A802014EA
:20028000133881806F8000800B08A4EB0F08A0EB063A30432CCB023A804414F83A80451446
:2002A000F308A3833109F0F9DB9C7C812909F015D903B92209F0D8D803BC1B09F0FADB2225
:2002C0008009F0F9DB9D7C09F1F9DB3A84003A82023A8320142909F0D4D8240109F0D3D8E6
:2002E0002E010009F14FE0D009F14EE0057F6F800080D86F8200800708A084033A82103838
:2003000082F028252008A79903708410A499B800B90609F140E02813202C5820B80A08A177
:200320008402B80B2813202C5820000000000000000000000000000000000000000000075
:200340000000000000000000000000000000000000000000000000000000000000000009D
:20036000000000000000000000000000000000000000000000000000000000000000007D
:20038000000000000000000000000000000000000000000000000000000000000000005D
:2003A0000000000000000000000000000000000000000000000000000000000000000003D
:2003C00000000000000000000000000000000000000000000000000000000000000000001D
:2003E0000000000000000000000000000000000000000000000000000000000000000000FD
:20040000319880009F0A3DBC1AF0A07FD0609F1A3DB140FB90009F1A3DB1C20057808A20E
:20042000EB015674EB1EB90209F1A5DBB90109F1A4DB141009F0A5DBAF0007FD024156C9E3
:200440009F1A5DB75EA0375E9282B82400B8E57120B8C57122BD240088F8208BFD20975DE
:20046000EAF908A5E9F5140A089F682BE040A5E940561C4E1E508115A1EA8706B0EA1A52E6
:200480001417A0EA0C5200003EF052140C1001AC079F8580024056B1EA655CFE67F0DABA64
:2004A000102085050A88E8BA04204EAC03050A88E815206750DBBA042085050A88E81520D0
:2004C0001001ACF89E851201088EE2088ECE3C4EFC0DFC080031E56000003C5EF26CF33F1E
:2004E000244A05EA30CC8F2C830146775F08240D1D5CAC0114061C5C8A0DAC011A5A1C4E35
:200500002D080030D024683861F2051A2060881098588202B9FF12162B82400B8E57120B0A
:200520008C57122BD240088F8208A1EA263C5AC23895E028912008A2EB15A2EB3A810028BF
:200540009D2072EB0A09F0DDD803AA033A8060A1EA40563C4E5067A4DA5BD85D774F0A1FA0
:200560004E07FD05089D011403088D010F4200008109774F063F4E4207FD0A089B01B900F0
:200580003A3D1C1408088B01B9FF3A3D2309F11BE00F52050007FD0420CA14213C4EFC0DB1
:2005A000FC08006000003C56F2244A05EA30CC8F2C830146205598FC70EA029A9E22544A18
:2005C00088EC8088EDE2B68062BE04105AA6530007FD0909F0A6DB9F5207FD05288B209F
:2005E000140D288E2009F0A7DB22DA0CD4021D05A8089EC8089EDE40561C52D830C80CD837
:2006000000070EA048A881402248824A93D5ADA6CDB011CCC28EA1D1AC08A0B03B804B924
:200620001402B9FF88091AC43C5AC23854CA3AE0200CE4161A3AE1043AEE020CECCEFE68
:200640002BE0312BC452A5E9A4E9089D004B2B6882562B72182B7A182B70112B6499089CBD
:2006600060A3EAA4EA38CBDB2B68023AECCC3AE1023AEE020CE43407A2EA2BE031088F6861
:200680004B0CDC0422089900A5E9089D0070EA082B14003ACB0014062B14FF3ACBFFBB056B
:2006A0008A2EAFCA2EA33F808A2EAFCA2EA1CCC28EA1D24281003AC03170031CA8F13807E
:2006C000E770EA0F77D2E1089F681C5230C870D310141908A7D2D1089F681C5230C870D3A1
:2006E000B131E82032D0100131C1409131C82032D0100131E2B72982B7A980CDC08222BFD
:20070000068043AECCC3AE1033AEE030CE441070CD44F0760FF011A6C1A6E1A703C52D20E5E
:20072000D20200111C011D1E8F0A07FDF62BE031088F685622EE3AECCC2BE031B2EA293421
:200740000722EE3AECCC2BE0312BC4922941074B111C011D1E1A521110011E1203AF0762D5
:2007600000008A28240A1B6C1B6E1B701D6C1D6E1D7030D0248860000073EA620F52B4007D
:200780007FD472052AF0607FD0230C9170074EA272431D831C80F522D0007FD048803A95C
:2007A0007A96D08201C92F280007FD036028008F88D33AD0008231B3EA38DBCB70EA05A6
:2007C0007897CB14247A97CB141FB9B4170074EA180FD82800821238DBCBB4EA140B20524E
```

```
:2007E000AF0607FD0230C9170030C824296FD300800A051AAF008106B8FF1402B84070EAA9
:2008000006B9808A101404D06AD1803898D2B800831230D0051AAF00800620CB8A108217FB
:20082000B9001413ADFFC130D0051AAF00800620CB88108202B9FF12146F530007FD09095A
:20084000F0A9DB9F5207FD082BC452B0E9294F076FEE0107FDFA2B68022BE04138DBCB288B
:200860008E2009F0A8DB22DAB7EAB3E9088C6029021D09F09EDA9F8507FD073A803E6F8052
:2008800000005609F09DDAD809F09CDA2D0A001F4E07FD0E08A74F070F4EF6FF07FD033A807D
:2008A0003F6F80005609F09EDA9F8507FD043A803E56655CFE67F0DABA102085050A88E8EB
:2008C000BA04204EAC03050A88E815206750DBBA042085050A88E815201001ACF8988512FC
:2008E000011C502D080030D03861F2051A206088109858121640560000000000000000000E6
:200900000000000000000000000000000000000000000000000000000000000000000000D7
:200920000000000000000000000000000000000000000000000000000000000000000000B7
:2009400000000000000000000000000000000000000000000000000000000000000000097
:2009600000000000000000000000000000000000000000000000000000000000000000077
:200980000105880105AD11FC1A744B09F042E003B80A03BA0A03B90A283D20572C1F202C50
:2009A00004202C3420088A0009F055E0AF0080022078227A0A10AE20227BB90809F144E00A
:2009C000B94809F146E0B59909F045E003AF0A28162009F045E003BFF6749914B499A299F1
:2009E000207B227D387A7C0A10B5DA09F152E0577F7B7D801ABB1B207B283720B80228255B
:200A000020B800281320282B20283A20282E20207B0A10ADDA03BE1509F046E003AB22B87F
:200A20008282520B800281320282820205709F0F7DB9C7A8010280D2083DE67F7DB207A1657
:200A4000DE28282057BB40207B283720B802282520B800281320282820057A59A09F054E06F
:200A6000ADFF67F7DB16DC089F820B8CD82D0B8ED82D2BD0402B82C009F042E003BB0E08A5
:200A8000AFD0F509F015D903B8DD2C4320B91809F144E0B94809F146E0B499B59909F054DC
:200AA000E0227A227C0A10AE20227B227D09F015D903BE05B88028132057B93809F144E052
:200AC000B91C09F146E0D009F14DE009F042E003ACF95609F0F3D803BF032C3C0BB90C0947
:200AE000F146E0B92809F144E0BA0665BDDA09F04DE009F042E003ACF909F04CE05032EEA6
:200B0000009F043E003BE2809F0BDDA171024314003AF28BA0409F04DE009F042E003ACF903
:200B2000009F04CE05032EE4009F043E003AE0C413A8030B900038E09F143E056B92809F144
:200B400046E0B92809F144E0B90109F150E0C909F14FE0B90509F14EE0B90909F15EE0098B1
:200B6000F15AE0B9A809F146E065BDDA09F047E003BCF909F04AE05017102431674AE0096C
:200B8000F043E003BE0377F32D09F047E003ABF909F047E003BEF95D505D505D505D505D35
:200BA000504009F043E003AE0C413A8030B900038E09F143E05609F047E003ABF909F047DD
:200BC000E003BEF95D505D505D505D505D5009F043E003BED4B90109F150E0C909F14FE093
:200BE000B90309F14EE009F15AE0B9A809F146E009F047E003ABF909F047E003BEF95D500E
:200C00005D505D505D501499B97809F144E0241009F1F8DBAF008104AF04803DB90509F174
:200C20005EE0B91C09F146E0D009F14DE009F042E003ACF94009F05EE003BA03A5995609F3
:200C4000F045E003AF0528162014F409F0F8DBAF048104280720564156B91C09F146E0D05D
:200C600009F14DE009F042E003ACF94009F045E003AF0528162014F356B97809F144E00665
:200C8000200209F1F8DBB91C09F146E05909F14DE009F042E003ACF909F045E003BF023219
:200CA000EB4009F045E003AF062816202CA10C56B90009F146E0B90109F15EE0B90009F128
:200CC00044E0A59956B8042813208302A59956207C75991AB59A09F154E009F058E0ACBF4F
:200CE000009F158E0B90109F146E008A599FC56759916B59A09F154E009F058E0ACBF09F119
:200D000058E0B90109F146E056B90C09F146E0B96809F144E009F04DE009F042E003ACF95E
:200D2000009F04CE0240109F043E003AE3EB900038E09F143E0BB30207B283720B8022825EB
:200D400020B800B90609F140E02813203AF8007F7D7B8108B90709F140E04156282B202849
:200D60003A20B90709F140E0282E20241003AF102431AC388012207B25310AB0ADDA405640
:200D8000AF0C07FD032C4020B0728132040560000000000000000000000000000000000055
:200DA000000000000000000000000000000000000000000000000000000000000000000033
:200DC000000000000000000000000000000000000000000000000000000000000000000013
:200DE0000000000000000000000000000000000000000000000000000000000000000000F3
:200E00000000000000000000000000000000000000000000000000000000000000000000D2
:200E20000000000000000000000000000000000000000000000000000000000000000000B2
:200E400000000000000000000000000000000000000000000000000000000000000000092
:200E600000000000000000000000000000000000000000000000000000000000000000072
:200E800000000000000000000000000000000000000000000000000000000000000000052
:200EA00000000000000000000000000000000000000000000000000000000000000000032
:200EC00000000000000000000000000000000000000000000000000000000000000000012
:200EE0000000000000000000000000000000000000000000000000000000000000000000F2
:200F00000000000000000000000000000000000000000000000000000000000000000000D1
:200F20000000000000000000000000000000000000000000000000000000000000000000B1
:200F400000000000000000000000000000000000000000000000000000000000000000091
:200F600000000000000000000000000000000000000000000000000000000000000000071
:200F800000000000000000000000000000000000000000000000000000000000000000051
:200FA00000000000000000000000000000000000000000000000000000000000000000031
:200FC00000000000000000000000000000000000000000000000000000000000000000011
:200FE0000000000000000000000000000000000000000000000000000000000000000000F1
:201000000000000000000000000000000000000000000000000000000000000000000000D0
:201020000000000000000000000000000000000000000000000000000000000000000000B0
:20104000000000000000000000000000000000000000000000000000000000000000000090
```

```
:201900000CFCF2FE0CFEDCDA0CF81DE0B80616604C51503BF0F809F08DDA240109F08CDAE6
:2019200007E8F031D824E86FF7008012247624652454244324 32BA000DFE080014E90FFE8C
:201940000000008008B9FF09F1EADA415607E9FE308F300E300D300C300B300A82126DF78C95
:201960006DF60C6DF50A6DF4286DF3186DF208D78E128E138E1480C609F0EFDA8C1580BE83
:2019800009F0EEDA8C1680B624C524D60CFA0080BA10240B7CFCF080097CFDF1800430CB72
:2019A00032F00CFA0100BB00240B7CFCF0800A7CFDF1800531CBC314EF8A23D209F1EADA34
:2019C000240F6CF007810B308E300D300C07E9FE14EE30DFD609F1EBDAD509F1ECDAD409A8
:2019E000F1EDDA240F09F1E9DAD009F1E8DA405600000000000000000000000000000001D
:201A0000030988004B2B688622EE3AECCC2BE0312BC49229041A4B22EE3AECCC2BE0312B14
:201A2000C49229161A4B7A9CD0835B9A9D832A8F108315810DDBD0B800051BD81710D82CB9
:201A4000E21A6040002CE21A2430B800051BD81710ADFFA881D82CE21AADFFC18F1083181B
:201A60008111DBD0B800051BD81710ADFFD82D0100146F60C000146A2430B800051BD81764
:201A800010A880D8145C6DD0FFC09A9D832A8F1083178110DBD0B800051BD81710ADFFC12D
:201AA000D8C1143E60C00114392430B800051BD81710A880D8C1142AADFFC18F108314817F
:201AC000DDBD0B800051BD81710D8C11414604001140F2430B800051BD81710ADFFA881F2
:201AE000D8C11BC01EC003A855B9FF1AE23ED0C41453B5EA089F682BE041089D00088EE290
:201B0000B3E9A4E9B7EA60410309F1ABDBD009F1AADB09F0A7DB22DA3AE01E3AEE043AEC87
:201B2000CC3AE1040CE4161A2BE0312B688229021D03BF0560FF00141A6000001415B9006B
:201B40001AE23ED0C41CC431D81AC61DC81DC4AF0080DE13141CC42DC8002D6FFE839371FE
:201B6000E9412C882020C4A80CA8E78218B90009F110E009F010E0B2E908A39F26088F0078
:201B8000089F00141E08AC001A09F00EE0AC0FAF0B801008AC000CB90009F110E009F01046
:201BA000E0B49B3DC4721C7203BF0B2E5000830F1A7226CA14092D500083041A7227CA3BC3
:201BC000E8073AE85B0C72000038CAC83AC9003EC6C8B0E92BC45229251A4B1CCE28EA1DDC
:201BE0001BC01EC003A814B9FF3ED0C4141203BF0560FF00141A6000001415B9003ED0C455
:201C00001CC431E01EC41EC41AC61DC8AF0080DE71EA070889001314141B20CAA40830499
:201C20008F01830C20CAA84083058F0107FD01D0088900121408A4E91A3DC4721C7203BF9D
:201C4000A1EDA830E1A7226CA14081DDA83041A7227CA38CAC83AC9001CC62D008069D0C9
:201C6000003C4CD2052A3C4CD230CA8A0A3ED0C874E9251CE21EC42D02002DFBFF836F3B38
:201C8000E0780C7200003ADB003893DAB4E93AE00108A49F65089F001CC42D03002DF9FF70
:201CA000834F3BE055089F682BE04120CA12143AE1063AEE063AECCC0CE4041AB5E9A5EAFB
:201CC000088D00A0E93894E00C7200003AE85B38CAC83AC9001CC431D83ED0C82BC452086A
:201CE0009EE2089ECE2BE0312B688629251A3CC4E23895E071EA033894E0B0E92BC4522997
:201D0000DA1B4B1CCE28EA1D1BC01EC003A80AB9FF3ED0C43CD0E21408B9003CD0E23ED0B3
:201D2000C431C8242831C888281CC430C8030E031F830A2F8001830E60800114092F80FE6D
:201D400007FD036080FE8A0A38DAD2861AADFF6DD0FF2D010031E0051AAF00800620CB8A96
:201D6000108214B900141031E0051AAF00800620CB88108202B9FF77EA050899001214A7E8
:201D8000EA20E2A805A8F583283BE02E1CC42D19002DCDFF822C74E907B4E93894E0141A71
:201DA00077C50726CB3894E0141027CB3894E014093894E074E9033895E0B0E92BC45229A8
:201DC000021DA4E938CAC83AC9001CC431E01EC41EC41EC43ED0C83894E02BC4523CC4E24E
:201DE0008A49F03088F0029DA1B7A9CD083529A9D83248F108311810BDBD0B800051BD82D
:201E00001710D856604000562430B800051BD81710ADFFA881D856ADFFC18F108316811013
:201E2000DBD0B800051BD81710ADFFD82D01005660C000562430B800051BD81710A880D877
:201E40000566DD0FFC09A9D83278F108315810FDBD0B800051BD81710ADFFC1D8C15660C08A
:201E60001562430B800051BD81710A880D8C156ADFFC18F108312810CDBD0B800051BD840
:201E80001710D8C156604001562430B800051BD81710ADFFA881D8C15600000000000046
:201EA00000000000000000000000000000000000000000000000000000000000000000022
:201EC00000000000000000000000000000000000000000000000000000000000000000002
:201EE0000000000000000000000000000000000000000000000000000000000000000000E2
:201F000000000000000000000000000000000000000000000000000000000000000000C1
:201F200000000000000000000000000000000000000000000000000000000000000000A1
:201F4000000000000000000000000000000000000000000000000000000000000000000081
:201F6000000000000000000000000000000000000000000000000000000000000000000061
:201F80001209870128462020B898BA300924313862B97751033863B938B9B020B8705002AB
:201FA00020BA0508051B7AB9B08A1103A702B9FF1DC41DC2AC011A48 0.8A0EB03284920B38F
:201FC000EB5705AC2B8000089FCE054C000000000000000000000000000000000000009D
:201FE000000000000000000000000000000000000000000000000000000000000000667B
:00000001FF
```

External Program Memory 134

```
:20000000047A4C208409000000000009E57C21F00000000000000000000000000000000093
:2000200000000000000004F20436F7079726967687420284329203139383820517 56616E74C1
:200040007 56D20436F72706F726174696F6E202D20416C6C207269676874732072657365 08
:200060007 2766564 2E285520 08A69A27B90009F140E074991808BFC81409F016D9AC07223D
:200080000790A10A620227809F153E0A69AB90709F140E009F0F7DBAF008117BA01304A09D6
:2000A000F0F7DB8C1281F674992EA2992822202C7C00707E2309F0EEDB240109F0EFDB2402
:2000C000E809F0F0DB240109F0F1DB8F0F81095D749905B2992822202C7C00281581287739
:2000E00081708 41009F015D903BF09387DF3B9000AB0ADDA729A0328552070840C089A00D9
```

```
:20010000B90709F140E02C68803A8400B90709F140E02CE00070995EB812207D05082D390C
:20012000D824E8B970080399031F51B900513880FC3AFD0031CD09F0E2DB240109F0E3DB16
:2001400088C8585109F0E1DB5109F0E0DB5109F0DFDB5109F0DEDB51B90A51B900515151D4
:20016000515C51B900515109F0F6DB5109F0F5DB5109F0F4DB515609F0F2DB240109F0F3AB
:20018000DB24C82D0D002F00D407FC086000D024C82D0D0009F1F3DBD009F1F2DB67BDDA9D
:2001A000BA0A1520208050207D50209A505628AF4D09F08DDA09F1E6DB09F08CDA09F1E78A
:2001C000DB09F0E5DB228A1C3009F1E9DBD009F1E8DB28814C60000022802282224411A260A
:2001E000228228722292290009F1F6DB09F1F4DB09F1F5DBBA0465DEDB1500BA0665E2DADF
:200200001500A19BA399A099A29AB79AA29BA39BA09BB1E9A2E9A49B09F0DED8C109F1E423
:20022000DBB90009F1A3DBB90209F1F8DBB9E009F106E0B9C009F10EE009F08DDA09F102F4
:20024000E009F08CDA09F103E009F0D4D809F109E009F0D3D809F10AE0B90E09F118E0B900
:2002600004F11AE0B93309F119E0B9FF09F149E009F15AE0B94109F143E056729B4F08C7
:20028000A5E94A6F2A008170388E2D7F2A2D8303382A2D7A2D8E204E09F114E0204F09F124
:2002A00013E0208509F115E0208609F116E0202D09F112E0204109F110E02B82400B8E40D7
:2002C000060B8C40062BD2402B82C0B29B5609F010E003A81108BFD20156B90009F110E0B6
:2002E000B583A6831412A29B09F010E0AF080F0782D867A2D2A8004285520566F8E008042
:2003000087280F4B5675E90D08AFD208289D206F8100800C56729BFC2804046F800081F42E
:20032000B583A68328552056000000000000000000000000000000000000000000000000069
:2003400000000000000000000000000000000000000000000000000000000000000000009D
:20036000000000000000000000000000000000000000000000000000000000000000000007D
:20038000000000000000000000000000000000000000000000000000000000000000000005D
:2003A000000000000000000000000000000000000000000000000000000000000000000003D
:2003C000000000000000000000000000000000000000000000000000000000000000000001D
:2003E000000000000000000000000000000000000000000000000000000000000000000000FD
:20040000323880109F0BFDA670B77165F822E65E476BB03050B88C85824015824E85C244F
:2004200021BB0009F0BFDAAF01800E09F048E009F1A4D7B90009F1A3D728EE92563A801F76
:2004400005609F0BEDA03B81BA3EB0CB4841F2B800208A3EBFC3C48C228912008A2EB0328D0
:20046000C25656A6E92B80005609F0BFDA228577EB06286452820E5628A508820156BA05AC
:20048000028315332FB09F0BEDA03B9152863546700D620B85520BA06A00162020028EE924B
:2004A000562880546700D6620C0028EE925609F0BFDA228528A508820156383DFA3A3D0173
:2004C000BB33285559B90009F110E009F010E0B90009F11BE0089B012B80000B8A3B000BF4
:2004E000883B002B641009F0BEDA03A8032C81850CB44B852B8002089C01B90609F110E09E
:20050000009F00EE0AC0FAF0483F609F0BEDA03A91E0CB46785088EE2BA05BC002B82000B5B
:200520008E400028CF54089FD008A3EBFC32F4B90009F110E009F010E0B8A12000B88129B
:200540000089C0138FA3D089EE256088C0120CA121409F00DE003BB0A089C010889800B95
:2005600088400028492057089C0120CA1214088F8208AFD0FC088C01089F82284920B3EB8D
:20058000570CB4EA852B82002BD0400B8E30000B8C30002B8002088C01B90609F110E00969
:2005A000F00EE0AC0FAF0483F609F0BEDA03A91BBA05BC1E2B82002BD0400B8E3A000B8C33
:2005C0003A0028CF5408A3EBFC32F7B90009F110E009F010E02B80000B8A12000B88120058
:2005E00089C0138FA3D089EE256089C01088F82089FD020CA12140B88300008898008AF39
:20060000D0FC088C012B8200284920B3EB57383D4A6500002B80000CB46A860B8A00000B27
:2006200088000 2B8002A3EB08A3EBFC283D59BC07288458B90528D2580DFC04006700D686
:2006400055D006A00162020028C8110DFC02003B4ADA62D20067000028DB94B90E09F118F4
:20066000E00B8A12000B88120056B3EB5709F0BEDA242109F0C0DAD809F0BFDA2F00008081
:200680000 01562FFA0007FD1270F2053DF0C214033EF0C26CC3012891205609F19FDB241060
:2006A00009F19EDB60FFFF70F20360010009F1A1DB241009F1A0DB2877515628315309F099
:2006C000C0DAD809F0BFDAAC011AC22891205665C2FE09F0BEDA03A80628315365C0FE67C1
:2006E00000D6060001555C06A00162020028EE925609F0E8DB240109F0E9DB2E02D7BA0AFA
:20070000051AD009F100D7B90008A09A02B90109F1101D709F0F4D8B80A05082D0200242881
:200720006700D728EE92560C20CE70B4EB60050009F1A1DB241009F1A0DB1C20057872EBDA
:200740000474EBF656A4EB28C256563A4A03BB01BE0109F0BFDAAFFF800B09F09EDA243132
:2007600024612413C9228528A508820156285559088C01089E01B90009F110E009F010E001
:200780002B80000CB4E7870B8A7C000B887C002B8002B90609F110E009F010E003B8F90964
:2007A000F010E0088E0133BA274A813209F0C0DA2401B90009F19FDB241009F19EDB09F02C
:2007C000BEDA62FFFF03803620100240A09F1A1DB241009F1A0DB2877512436148F0B8A31
:2007E00012000B88120056089C0120CA121409F00DE003BB06088C01088980284920573AC5
:20080000801F5609F0BFDA670B77165F82167E476BB03050B88E85924015924C85D24211C
:20082000BB0028329209F0BFDAF07802509F006D809F19DDA09F163D909F12EDA09F005A6
:20084000D809F19CDA09F162D909F12DDA2856991431AF0C800809F01DD8229F1425AF08DC
:2008600080150 9F007D809F19EDA09F12FDA09F164D9285699140CAF00800809F0A2D72857
:20088000B19D5609F0BEDA03A81067A5D73A85000C4EFEFF3A8602285B5A5628A3506700F8
:2008A000D6111C30C855D806A00162020028EE925628315365CCFE6700D65C550600010631
:2008C000A00162020028EE925628315367CFFE62010028EE92566700D624CF09F0EADA5097
:2008E00009F0E9DA5009F0E8DA5009F0EBDA5009F0ECDA5009F0EDDA5062060028EE92564E
:200900008A1EB11A1EB0C2086701C20057872EB7A08A5EBF528A35008A2EBF9A2EB3A8176
:2009200000089F01BB0509F09EDAAF038102BB0928A35033FB0C4A000A28492008980028E3
:2009400031532B14801CC02D8000AC011AC20CE200000CC880000CC4000028912072EB26D4
:200960002831531CC42D60002D3FFF831F0E4A010081100DC208006CC3013CC2C00CC400D2
```

41  42

```
:200980000014DD3A8161B2EB28C256560C4A00003CC0C20EC280006CC30128912072EBE667
:2009A0000EC208006CC3013CC2C00CC400002831531CC42D40002D7FFF830507E84A14E048
:2009C0001C4A30E025011A4A674AFE62020028EE920C2058701C20057872EBAF08A1EBF51A
:2009E000A5EB5609F0BFDA228528A508820156089E01285559089C0109F010E0B90609F166
:200A000010E009F010E003B8F9088E0109F010E05609F0BEDA03A941039809F1BEDA0C4E6E
:200A2000FDFF03BA040C4E0003A850028645272EB4728808A268509F09EDA9F8507FDECFC
:200A40003A850007E84E774FE309F09DDA240109F09CDA1F4E07FDD45609F0BFDA228528F1
:200A6000A5088315774F1309F09DDA240109F09CDA1F4E07FD0A3A803F560F4EFDFF83F6B8
:200A800009F0BEDA03A80F383DF2BB0031D265000028BC9314032804506700D6650000BB1A
:200AA00000383DF231D228C81109F0C0DA2431285559088C01B90009F110E009F010E02BC1
:200AC000080000CB4238B0B8A77000B887700089FCE2B8002A2E9A1E9B90609F110E009F138
:200AE0001DE072E92E09F010E003A80A8AB03F209F11DE014EC2B8000B1E9089C01A2E9BE
:200B000009F010E00B8A12000B881200B93309F119E056B1E9A2E9B90009F110E009F0109A
:200B2000E01486089C0120CA121409F00DE003BB0E088C010889800B8877000B8A770028F0
:200B400049205709F0BFDA12169A588202B9002260283D53562B80000CB47F8B0B8A4F0102
:200B60000B884F012B8002A3EB08A3EBFC0B8A12000B8812006700D662010028EE92562BB0
:200B80000688520CA1214088EE06700D609F09DDB2431089FE008AFE0FC106A8A1382028AA0
:200BA0001155284920B3EB576700D609F0F2DB240109F0F3DB2E00D055D006A00016202002C
:200BC00028EE926700D062000428EE925667F0DA62780028EE925628A9553CC24A3E5A4A79
:200BE000674AFE62010028EE925609F0BEDA03B908A7EB03B809B7EB5638CFF22874575600
:200C000009F0BFDA09F119E009F0C0DA09F11FE009F0C1DA09F11EE0B93309F119E056679B
:200C2000000D6B800D009F119E009F01FE05109F01EE051C06FF01083EB6700D6622000284E
:200C4000EE92B93309F119E0565609F0BEDA03A80CB69B2BCE003A81003AEB03560C20583A
:200C600070A1EB1C20057872EB0508A1EBF556A4EB28C2565608A69927280D20089A0009EB
:200C8000F0C0DA240109F0BFDA2B8240138E138C089FD0088F8208AFD0FC281C20088A00DD
:200CA000561C20350109F0C0DA240109F0BFDA055834011A205609F0BEDA03B81667BFDA9E
:200CC0006539FEBB04595233FC283698832628074B1403280F4B6700D6D551D451D751D6A7
:200CE00051208E556700D6BB0009F0C5DA242128E9214033A801D56284C526F80008101A3
:200D000056383D4A283D59B98528D258ACBF81083B4AF13A8058141909F014E0240109F0BC
:200D200013E01F4E800809F015E09F8581033A8010B90E09F118E05609F0C0DA240109F0AB
:200D4000BFDA244809F0C1DA246128285009F100D66700D662010028EE9256286B8D28EE31
:200D600009256286B8D24CF2832925665C1DA5824F15824E1465824315C2421560000000082
:200D8000000000000000000000000000000000000000000000000000000000000000000053
:200DA000000000000000000000000000000000000000000000000000000000000000000033
:200DC000000000000000000000000000000000000000000000000000000000000000000013
:200DE0000000000000000000000000000000000000000000000000000000000000000000F3
:200E000030888012401B90088082D0F8E0568880D298E880D880D880D5B8F918FCA8F7EAD
:200E2000905C90880D880D77906701D665010009F04DE009F042E003ACF909F043E003AEAB
:200E40000709F04CE02C2D0D09F04CE0AF0800562000114052421BB005109F04DE009F0BB
:200E600042E003ACF909F043E003AE0709F04CE02C2D0D09F04CE0518A2D80DE6701D6067A
:200E80002001AF018105A19A2C880D5DAF038105A19A2C880D719A6A207B2431B9000AB096
:200EA000B5DA22F8062003AF00800506A0021434AF0807FA05B90806A003AE0824410620D4
:200EC00022431AF3E8209B93E06A002B8001410651672B800BA10588F138204880214F744
:200EE0008E04241022F86205006700D6B90155281020207B243120F80AB0B5DA09F152E08A
:200F00004056062003AF008128AF0807FD27AE082441062002AF3E831C2431651672B8000F
:200F2000BA10588F138204880214F78E04241022F8A19A4056BB1A207B283720B80228252B
:200F40000B800B90609F140E0281320282B20283A20B90709F140E0282E20BB31207B2891
:200F60003720B802282520B800B90609F140E02813207F7D7B810B3AF80041B90709F14097
:200F8000E056282B20283A20B90709F140E0282E207F7D7B811AB9FF9D7A240109F0F7DB05
:200FA0008C1009F1F7DB207A2831203AF800415608A19A0A09F0BDB9D7A09F1FBDB282B97
:200FC00020283A20280720282E2009F0F8DBAF808013BB2C207D283720282B20283A2028FC
:200FE000720720F8DB2401B9002DF48F05687D904D907D9048907D90489049
:2010000048900E9048904890399039904890BB2C207D283720B802282520B800B90609F1A5
:2010200040E02813207F7D7B8053282B20283A20B90709F140E0282E20BB2C207B283720A5
:201040002807203A840014353A8038143009F0FBDB9D7A09F1FBDB3AF8001421BB30207B61
:201060002837202807203AF8007F7D7B800F282B20283A20282E202807202C02914156B9A1
:201080001409F144E0B94009F146E0089F820B8C0A000B8E0A002BD0402B82C008AFD0FC6D
:2010A00009F045E003AB09B91809F144E02C930A28072008A29922A29909F0EEDB240109C4
:2010C000F0EFDB2D03002FDCDA07FA0360C7DA09F1EFDB241009F1EEDBBB2E09F054E00A61
:2010E00010AE20283720282B20283A20282E20B94009F146E0B90B09F1ADBB9FF09F1F9D1
:20110000DB5705A835FF09F047E003B8F9B900038E09F142E008A2E0FB90009F158E06291
:2011200000260280035035709F048E02401AC0722790A10A620227809F153E0B90709F1A1
:201140040E0B98F03B402039809F158E0B9FF09F143E009F15AE008A1EB5075E9162B8293
:20116000400B8E57122BD040088F8275E90608AFD0F914A52041AF068103284F9D089F8265
:20118000000B8E03092BD0402B82C009F010E003A80E08AFD0F5B90009F110E009F010E0B99F
:2011A000E009F106E0B9C009F10EE008A4990328778167BDDAB9FFBA0A51C932FC287781C4
:2011C000A19A09F0F3D803BD0965B5DAB900BA081500B90009F1FBDB09F0F3D803AC06B908
:2011E000FF09F1FBDB28569C34FF08A1EB0F77EB040C208070089A00A499282E20089A00B7
```

```
:2012000074EB0214F008AC4A091B7413FC1C74A4995708A499032C199157B94209F1FADB61
:20122000B9FF09F1F9DB5608A59A06B90109F146E056B92809F146E0B90809F144E0B909B3
:2012400009F15EE06400000FF2001007FC27246D24CA60000064001005ECB9FF09F14FE092
:2012600009F14EE020FC09F150E0600010242D052A24CE14180EF20100D309F14FE0D2091A
:20128000F14EE00DF20100B90109F150E0009F15AE0B9A809F146E067010009F047E003BC4F
:2012A000F909F04AE0508A2F80F00FF40000811B242C0EF40100D509F14FE0D409F14EE0AD
:2012C000B90109F150E0640000014C209F047E003BEF94009F043E003AE0D413A8030B90018
:2012E000038E09F143E05603AA0328829D56B91809F144E0B93809F146E0B90109F15EE0AB
:20130000640000FF2001007FC2324CA60000064001005ECB9FF09F14FE009F14EE020FC5A
:2013200009F150E0600010242D052A14180EF20100D309F14FE0D209F14EE00DF20100B9B7
:20134000000109F150E009F15AE0B9B809F146E065010009F047E003BDF95909F14AE08A2D2A
:201360000080F00FF40000811B242C0EF40100D509F14FE0D409F14EE0B90109F150E06400C9
:20138000000014C209F047E003BEF94009F043E003AA0328829D56248D24AA6500D62832924E
:2013A00024C9242B6700D628C81156248A6500D628DD1124296700D628EE9256B90809F11B
:2013C00046E0B90809F144E0B90909F15EE06400000FF2001007FC27246D24CA600000642C
:2013E00001005ECB9FF09F14FE009F14EE020FC09F150E0600010052D242D24CE143B0F5A
:20140000F200008012B91009F150E0B9FF09F14FE009F14EE014230FF20C0007FD04289642
:2014200093560EF20100D309F14FE0D209F14EE00DF20100B90109F150E0B93609F10EE011
:20144000D309F10AE0D209F109E020FD09F108E020FC09F107E009F15AE0B93309F10EE01C
:20146000B98809F146E009F043E003BA5603ABF60FF40000814D0FF40C0007FD0888CA24D6
:201480002C28969356B93609F10EE0D509F10AE0D409F109E00EF40100D509F14FE0D40954
:2014A000F14EE0B90109F150E009F15AE0B93309F10EE0B98809F146E009F043E003BA03E4
:2014C00003ABF64003AA0428829D5603AE0C413A8030B900038E09F143E056B91809F14426
:2014E000E0B90109F15EE06400000FF2001007FC2324CA60000064001005ECB9FF09F14FCB
:20150000E009F14EE020FC09F150E0600010052D242D143B0FF200008012B91009F150E0B5
:20152000B9FF09F14FE009F14EE014230FF20C0007FD0428AB93560EF20100D309F14FE09D
:20154000D209F14EE00DF20100B90109F150E0B93409F10EE0D309F10AE0D209F109E0204C
:20156000FF09F108E020FE09F107E009F15AE0B93109F10EE0B99809F146E009F043E003F5
:20158000BA6603ABF60FF40000814D0FF40C0007FD0888EA242C28AB9356B93409F10EE048
:2015A000D509F10AE0D409F109E00EF40100D509F14FE0D409F14EE0B90109F150E009F1E0
:2015C0005AE0B93109F10EE0B99809F146E009F043E003BA1303ABF64009F049E003AD08E4
:2015E000413A802909F15AE009F043E003AA0328829D5600000000000000000000000002A
:20160000000000000000000000000000000000000000000000000000000000000000000CA
:2016200000000000000000000000000000000000000000000000000000000000000000AA
:2016400000000000000000000000000000000000000000000000000000000000000008A
:2016600000000000000000000000000000000000000000000000000000000000000006A
:2016800000000000000000000000000000000000000000000000000000000000000004A
:2016A00000000000000000000000000000000000000000000000000000000000000002A
:2016C000000000000000000000000000000000000000000000000000000000000000000A
:2016E00000000000000000000000000000000000000000000000000000000000000000EA
:20170000041388013C42FC288F9720FC09F1C1DB20FD09F1C2DB0CF42300BD0028A7971A9B
:201720004428B6970EFC010082032E010024A8248D38F03C3CFC3A09F0D1DB24C109F0D289
:2017400DB24D109F0A2D7AF0280014E288F9720FC09F1C7DB20FD09F1C8DB09F0C1DB244E
:201760000109F0C2DB880D09F1C4DB241009F1C3DB3AF41CBD0028A7971A4628B697888D81
:2017800082014588A838FA343CF83228C0975609F09EDAB800D8052D6782DA5924315D248B
:2017A0002160000005EA566783DA5B24015D052C240C07E9F056052D3835F2BB0005EA569A
:2017C0006000C009F1B9DB241009F1B8DB09F09EDA24C13AFD001C42052D09F083DA2421E2
:2017E00009F082DA243160000005EA241209F1BADB241309F1BBDB09F0C1DB24C109F0C22F
:20180000DB24D11C44052D3835F2BB0005EA241209F1C5DB09F0C7DB24C109F0C8DB24D17C
:201820001C46052D3835F2BB0005EA241209F1C6DB5635C7140D35C76F390080733C36F2CC
:201840003838F509F0A2D7AF02805809F02DD903B82809F00EDC8F15835607FD0E09F00CCF
:20186000DC240109F00DDC8F0A83457FF53407FD57832B3FF2328250142409F017DC2441B5
:2018800009F015DC240109F016DC07E8F02F00008001C48F54830707FD098F2882053A8089
:2018A0005F14107FF53407FD1F83053FF23282183A801D09F0A2D7AF02800C6732FE65DEF5
:2018C000DBBA031520B3994134C756243109F0EEDB240109F0EFDB24A809F0F0DB240109A0
:2018E000F0F1DB8FA881622413167F8109240B284A9924A814E324EB240F284A9924E82442
:20190000CB09F0F0DB240109F0F1DB8FE8811835C0BA03152034C0240D284A9924C8240F08
:201920000284A9924E814DA2E030009F1F1DB241009F1F0DB2FC7DA07F9B360D9DA09F1F131
:20194000DB241009F1F0DB14A4562D03002FDCDA830360C7DA5609F0DFD8242160FFFF6FF1
:20196000F2008105CA30C814F609F1EEDAD009F1EFDA28BA9A28DA9A28F89A09F08CDA2479
:20198000031C909F111E009F08DDA242109F0D4D8240109F0D3D824C860000005EA38FC35AB
:2019A0000FF2000081053A8141B2EB09F08DDA240109F08CDA242809F0ECDB24C109F0ED4C
:2019C000DB24D160000005EA20FCC109F1EBDBBA0109F0F3D803A80609F0F4D8242109F018
:2019E000EBDBB800AF008001C0D8051AD009F1E5DB282E9B09F0E5DB242109F0E6D824022C
:201A0000000508C1228D09F0E7D8050AC1240109F0E5DB8A10228C28C44B09F016D9030B0866
:201A2000169A285F9B2804976732FE6515DCBA03152009F09EDAB81C05083835F2051A1D45
:201A400003209F10DDCD009F10CDC2034A90009F10EDC28C045813267CED8592401592431C5
:201A60005D24218E128E1381200EF201006BF0007F34F007FD1083063F32F207FD08D022E5
```

```
:201A8000343CF23214033A806528C045800A670CDC6532FEBA03152009F015D903AF09B994
:201AA000C065ADDABA081500B80009F0F3D803AC02B8FF241009F1FBDB5667DDD8BC005D30
:201AC000AC06AF0280055D039955C45DAC09AF0980055D039B55C42CEF9A6782DABC00591C
:201AE00024315D24210FF200008004C4B901556FF40081033A80655609F0F3D803A81B09A8
:201B0000F0F4D824318D11BA05300BA90032FAAF018107C4B90409F1F4D809F0F3D803A958
:201B20000A03B807C4038809F1F3D82CEF9ABC00B90009F0E5DB3835F2051A09F0F6D88F0E
:201B4000018207C4241009F1F6D8240109F0F5D88F1007FC07C4241009F1F5D82CEF9A092A
:201B6000F006D8240109F005D82F4E0207FC120C424E022E4E0209F1D2DB241009F1D1DB6B
:201B8000561A42B90009F1D1DB09F1D2DB56B81205082D39D824E8B970039F51B90051658B
:201BA000000024C331CD09F0E2DB240109F0E3DB88C85851B90051515151B90A51240F2D44
:201BC00040024E85C51B9005151B90051515124135556B9A909F15CE009F048E02401B9C8
:201BE0008F03B402039809F158E0B90009F159E0B90109F15EE0207809F153E0B94309F137
:201C000056E0B94A09F157E0B90709F140E0B90009F141E0B9DF09F15DE0560BFC00E0623E
:201C20000002606580350357089A00207D2431B9000AB0ADDA3A80003A8200A399B90009CC
:201C40001F6DB09F1F4DB09F1F5DBA09AA19AA099A499A2995660C7DA09F1EFDB09F1F103
:201C6000DB241009F1EEDB09F1F0DB3A7E00B90009F1F7DBA599A299A099A09AA1993A80B0
:201C8000003A820065ADDAB900BA081500B90009F1F4DB09F1F5DB09F1F6DBA399B92309D4
:201CA000F1FADBB9FF09F1F9DBB90009F12DD95667C27365C9D809F06D742421152067C2AA
:201CC000736594D909F06D742421152009F0FE9FAF028016B92409F1DDD809F1A8D9B908C6
:201CE0009F115D909F1E0D9140EAF01800AB91009F1D8D809F1A3D9673E74657FDA622E9D
:201D0000001520BA97674D7665A2D7152009F0FE9F09F1A2D728B19D5609F041FEAF0681BD
:201D200003284F9D089F820B8E03092B82C02BD04009F010E003A80A08AFD0F5B90009F149
:201D400010E0B9E009F106E0B9C009F10EE05609F012E0AC7F240109F012E0AC7F8F1080F3
:201D6000EEAF0207FA1BB90109F11CE009F012E003BF0809F010E003B8F256B90209F11290
:201D8000E0564109F049E003A9053A8048141303AB053A804A140B03AA053A804914033AF4
:201DA000804C09F15AE009F046E0039F09F146E0562431679C2828CC9D1A22D367247228A7
:201DC000CC9D09F1E3DBD009F1E2DB5631892401B90088E85924015D5600000000000000CC
:201DE000000000000000000000000000000000000000000000000000000000000000000CC
:201E000000000,000000000000000000000000000000000000000000000000000000000E3
:201E20000000000000000000000000000000000000000000000000000000000000000000C2
:201E40000000000000000000000000000000000000000000000000000000000000000000A2
:201E600000000000000000000000000000000000000000000000000000000000000000082
:201E800000000000000000000000000000000000000000000000000000000000000000062
:201EA00000000000000000000000000000000000000000000000000000000000000000042
:201EC00000000000000000000000000000000000000000000000000000000000000000002
:201EE0000000000000000000000000000000000000000000000000000000000000000000E2
:201F000000000000000000000000000000000000000000000000000000000000000000C1
:201F20000000000000000000000000000000000000000000000000000000000000000000A1
:201F400000000000000000000000000000000000000000000000000000000000000000081
:201F600000000000000000000000000000000000000000000000000000000000000000081
:201F800000000000000000000000000000000000000000000000000000000000000000061
:201FA00000000000000000000000000000000000000000000000000000000000000000041
:201FC00000000000000000000000000000000000000000000000000000000000000000021
:201FE000000000000030342F31332F38380D0A31343A35370D0A362E382020200D0A00A25D
:2020000030788012C5A0A2CB00C2CD30A2CC50C2C080C2C090D2CD10C2CCF0C2C40
:20202000A5092CEF0C2CBA0A2C27922C289C2C1B9C2CCB982CEF902C8E9B2C199D2C1A92DA
:202040002C048E2C7F902C60552CF1522CFC502C03512C00182CAE812CDB802C69532C7C89
:20206000822C05832C41172CAD162C09162CBD132CB2152CE2152CD7162CC6162C34172C89
:2020800088172C4E162C0F172C651B2C31582C21582CC8512CF0362C3D112C4A112C75522E
:2020A0002C84582C047A010204081020408000000100020000000300000000000040065
:2020C00000000000000000000000000005000000000000000000000000000000000000FB
:2020E00000000000000000000000000000000600000000000000000000000000000000DA
:20210000000000000000000000000000000000000000000000000000000000000000000BF
:2021200000000000000000000000000007000000000000000000000000000000000000098
:20214000000000000000000000000000000000000000000000000000000000000000007F
:20216000000000000000000000000000000000000000000000000000000000000000005F
:2021800000000000000000000000000000000000000000000000000000000000000000003F
:2021A0000000000000000000000000000000000000000000000000000000000000000003F
:2021C0000000000000000000000000000000000000000000000000000000000000000001F
:2021E000000000000000000000000000000000000000000000000000000000000000000FF
:20220000202880002010300FFD8997D6C6058A2978E87807B76726E6A6764615F5C5A5879
:2022200056545351504E4D4C4A494847464544434241403F3E3E3D3C3C3B3A3A393938
:202240003837373635353434333332323131303002F2F2F2E2E2E2D2D2D2D2C2C2C57
:202260002C2C2B2B2B2B2A2A2A2A29292929282828282827272727262626262525522
:2022800025252525252524242424242423232323232322222222222222212121212121E2
:2022A000212121202020202020202020201F1F1F1F1F1F1F1F1F1F1F1F1F1F1F0000008C
:2022C000000000000000000000000000000000000000000000000000000000000000FE
:2022E000000000000000000000000000000000000000000000000000000000000000DE
```

```
:2023000000000000000000000000000000000000000000000000000000000000BD
:2023200000000000000000000000000000000000000000000000000000000009D
:20234000000000000000000000000000000000000000000000000000000000007D
:20236000000000000000000000000000000000000000000000000000000000005D
:2023800004068801000017F02037F7F04057F06077F7F7F7F7F087F7F090A0B7F7F0C0D5D
:2023A0007F0E7F7FFFFFFFFFFFFF80FFFF81FF8283FFFF8485FFFFFFFFFFFFFF86FFFFFF878A
:2023C00088FFFFFF7F7F7F7F7F7F7F7F7F7F7F7F7F7F7F7F7F7F7F7F7F7F7F7F7F7F7F7F94
:2023E0007F7F7F7FFFFFFFFFFFFFFFFFFFFFFFFFFFFFFFFFFFFFFFFFFFFFFFFFFFFFFFFFFD
:20240000FFFFFFFF7F7F7F7F7F7F7F7F7F7F7F7F7F7F7F7F7F7F7F7F7F7F7F7F7F7F7F7FDC
:202420007F7F7F7FFFFFFFFFFFFFFFFFFFFFFFFFFFFFFFFFFFFFFFFFFFFFFFFFFFFFFFFFBC
:20244000FFFFFFFF0F10111213141516171819 1AlB1ClD1E1F202122232425262728292A62
:202460002B2C7F7F8B8C8D8E8F90919289938A96FFFFFFFF9495FFFFFFFFFFFFFFFFFFFF3C
:20248000FFFFFFFF00017F02037F7F04057F06077F7F7F7F7F087F7F090A0B7F7F0C0DF3
:2024A0007F0E7F7FFFFFFFFFFF9780FFFF81FF8283FFFF8485FFFFFFFFFFFFFF86FFFFFF87F1
:2024C00088FFFFFF7F7F7F7F7F7F7F7F7F7F7F7F7F7F7F7F7F7F7F7F7F7F7F7F7F7F7F7F93
:2024E0007F7F7F7FFFFFFFFFFFFFFFFFFFFFFFFFFFFFFFFFFFFFFFFFFFFFFFFFFFFFFFFFFC
:20250000FFFFFFFF7F7F7F7F7F7F7F7F7F7F7F7F7F7F7F7F7F7F7F7F7F7F7F7F7F7F7F7FDB
:202520007F7F7F7FFFFFFFFFFFFFFFFFFFFFFFFFFFFFFFFFFFFFFFFFFFFFFFFFFFFFFFFFBB
:20254000FFFFFFFF7F7F7F7F7F7F7F7F7F7F7F7F7F7F7F7F7F7F7F7F7F7F7F7F7F7F7F7F9B
:202560007F7F7F7FFFFFFFFFFFFFFF98FF99FFFFFFFFFFFFFFFFFFFFFFFFFFFFFFFFFF48
:20258000FFFFFFFF1FFFFFFFFC0F04331FFFFFFFFC0F8B371FFFFF00FC020533000000000A5
:2025A000FC2F6F3E1FFFFFFFFC2F443C000000000FC4F046600000000FC8F9A5B000000FF48
:2025C000FC0F33521FFFFF00FC0241360EFFFF00FC0FE43301FFFFFFFC09942001FFFFFFFF6
:2025E000FC096B371F00FF00FC0F53351EFFFFFEFC0B80331BFFFF00FC0BB037000000000A8
:20260000010048400000000001F418400000000001F698400000000001FAE8400000000E1
:2026200000003F0E86000000000001F6D86000000000001FBB86000000000001FCF86000000000E1
:202640000010F186000000000001F278700000000003F4B8700000000003F03880000004B
:2026600001F9B8800000000001FB188000000000001FC98800000000001FD688000000D3
:2026800001B0089000000000001FE389000000000003F118A0000000001F438B0000044
:2026A00001F558B000000000010A88B000000000010CD8B000000000001FD78B00000000EF
:2026C00001FEA8C0000000000100080C000000000104980C000000000001B4A8C00000000F4
:2026E0001B758C0000000000101F8C00000000000000000000000000000000000003
:2027000000000000000000000000000000000000000000000000000000000000B9
:20272000000000000000000000000000000000000000000000000000000000000099
:202740000000000000000000000000000000000000000000000000000000000079
:2027600000000001F00000000FFFFFEFC0F173A1F00000000FF0000FC4F04661F000000F0
:2027800000000FF0000FC8F9A5B1F00000000FFFFFFC0F33521F00000000FF0000FC2F045B66
:2027A0001F00000000FF0000FC2F166F1FE0FFFFFFFF0000FC2F113D1CFFFFFFFF000000BF
:2027C000FC2B983A1CFFFFFFFF000000FC0B1D3B1F00000000FF0000FC2F6D661F0000004E
:2027E00000FF0000FC2FC55B000000000000000001F4C520000000000000000003F9D6690
:2028000000000000000000000000003FE75B0000000000000000000003FA866000000000000000EA
:2028200003FF35B00000000000000000003FB53C000000000000000010B68C000000089
:2028400000000000000001FF88C0000000000000000010A18C000000000000000105B8DA0
:20286000000000000000010628D000000000000000010388D1FFFFFFFFFFFFFFFF6C
:20288000FC2FD23F1F00000000FFFFFFFC2F6D661F00000000FFFFFFFC2FC55B842384232D
:2028A0000084240000000000000000000000000000000000000000000000000070
:2028C000032388018B9FF09F11BE0088B013A5830288B55AF338210AA4CADFFC13099019805
:2028E000168355121614E9AF668313AA3F3099240110168A1083411216288B5514E9620030
:2029000002B90009F19FDB09F1A1DB28635420B89ABA8203ADFFC12401AF0F833EB90109AE
:20292000F19EDB3098B9008A28830D241009F1A0DB28775108A2EBD33A8107B2EB28C256CA
:20294000560D200400B90009F1A1DBB90709F1A0DBB9FF09F11BE0088B0156BE6628F92E82
:2029600072EBDA0C4A0302283D59B98528D258811CAC30AF008116274A80EC274B81C2B96D
:20298000000009F11BE0089B013A4A0314DA09F016E0AF0081D209F014E0AC0324412421BB37
:2029A000000009F014E0240109F013E08A0A1A506FF400812660050009F1A1DB241009F1A068
:2029C000DBB919050C09F19FDB241009F19EDB28775108A2EB0428C2565628A95572EBF28A
:2029E00010169A5822603CC25C3A8505283D533B85FA283D5328212B2CDE70A4E9B5E93AA2
:202A0000 4A09B90509F1A0DB0D20020056B9CC09F19EDBB90409F19FDB2831531CC42D4089
:202A20002D7FFF833A09F09EDB240109F09FDB2E010009F19FDB241009F19EDB81190937
:202A4000F0A0DB240109F0A1DB3DF0C26CC3013CC2C00CC4000014C16F4A0081B0274A563E
:202A60001CC22E8000AC011AC228912072EB1DB98009F19EDBB90209F19FDBB9FF09F1A0C1
:202A8000DB09F1A1DB28775108A2EB0328C2560D200200561CC22428BA008A0A2D0006BA33
:202AA000A051A2D01001A4A2863546FB86682150E4A0100815A0EC20A006CC30128912041
:202AC00072EB5A14E328635420B8AFF007FD049FBA83150E4A010081370EC20A006CC301DE
:202AE00028912072EB3714DD0F4A320083190C50F8FF28A95572EB250D20040008A7EB0685
:202B0000038CA5528212B56BA0A204A050A2C5A2B0C50000038CA5528212B2CDE7028C256C5
:202B2000563C504E0C5000003CC25C3A8505284E533B85FA284E530F500300810E07E8506F
:202B40001C5C2E8000AC011A5C14E03C4E50561CC22428BA008A0A2D000609F19FDB2410B5
:202B600009F19EDBB9FF09F1A1DB09F1A0DB28775172EB123A580038CA550C5000000D206E
```

```
:202B8000020028212B5628C2565660000409F19FDB241009F19EDBB9FF09F1A1DB09F1A08C
:202BA000DB28775172EB090C5000000D2002005628C256563A85000C4EF8FF28645272EB22
:202BC0001D2B641008AB02FC08BB02FC0D2002005628A508BE66288E2EBE66288E2E72EB00
:202BE000603CC25C284E5328155672EB54226210169A582260283D53268509F09EDA9F85F8
:202C000007FC015638CA550C4EF9FF3A85000D2002005628645272EB2828A95572EB223C29
:202C2000C25C284E53268509F09EDA9F8580E40F50FBFF810707E84E3A8500560D200200A7
:202C40005628C256560C4E44033A850028645272EBEF654C0328C9320D20020056286452C4
:202C600072EBDE2B64100D2002005628A50828A95572EBCD0F504403801CBE4D288E2E722D
:202C8000EBBF10169A589A608202B900242160D300051A38F0611CC21E5C03A8100C5E009E
:202CA000806DF0FFC02420BB002448140A0C5E00002420BB00244A65C03460000005EA3040
:202CC000CC8F2C8301467EFC5E7EFD5F284E530F504403800B28155672EB4D2263283D537D
:202CE000268509F09EDA9F858101560F504703810B3A850007E84E0E200200563A85000C3A
:202D00004E000028645272EB1F28315338CF91A7EB3A925A0C6400000C68B2060C665601AA
:202D20002BE2000D2002005628C256563A85000C4EFEFF3A86006500D428F15980606700A3
:202D4000D465C273BA0515248054670CD465CE73BA03152480486711D465D373BA031524A1
:202D6000803C671AD465DC73BA03152480306727D465E973BA03152480246738D465FA73E6
:202D8000BA03152480186749D4650B74BA031524800C6700D465C9D8BA521520140628B047
:202DA0009C2CE22D3A85000C4EFEFF3A86016500D428F15980E86700D4653E74BA0315240A
:202DC00080DC6719D4655774BA03152480D06700D46545D9BA2E15206700D4657FDABA2E11
:202DE00015203A85000C4EFEFF3A86026500D428F159806E67B3766563D4BA10152480621C
:202E0000006700D465A5D7BA94152067CDD7651ED9BA0C152009F01DD8229F09F007D809F130
:202E20009EDA09F12FDA09F164D909F006D809F19DDA09F12EDA09F163D909F005D809F190
:202E40009CDA09F12DDA09F162D909F019D809F157D909F122DA09F01BD809F159D909F1AA
:202E600024DA2856990D20020056BB0028FC44810FB9FF09F1F9DB208009F1FADB3A800056
:202E80000D200200560D200200B1EBA4EB5628955524018A16A802A8FB8302145824108F25
:202EA00016833D140B285D2F10168A10831912162895558F1682EE1016C1810B1216289566
:202EC000558F1683F2142EB2EB3A813C3881800D20020056285D2F241001981683E91216C4
:202EE0002895558F1683ED1016C981DB12162895558F1682F228A95556288B5524018A16C4
:202F0000A802A8FB8302145424108F168339140B285D2F10168A1083191216288B558F16DE
:202F200082EE1016C181A01216288B558F1683F2142AB2EB3A813C38818056285D2F241086
:202F400001981683ED1216288B558F1683ED1016C981DF1216288B558F1682F2568A16BAC5
:202F6000042401B9008205BBFF8D03C0051A6FF0008001C0561C4E3885F2350309F098DB0C
:202F8000229C09F09ADB229D0C4EF8FF3A850028645272EB400B8A12000B8813000CB4842A
:202FA0001F2B6410A3EB089FCE08898008A3EBFC3CC2F428A531831D28A7570F50F9FF811F
:202FC000807E84E3A850014C634031A4E38F2850D200200562CDF301C4E3885F235030CA8
:202FE0004EFAFF3A850028645272EBE90B8812000B8A13000CB4841F2B6410A3EB089FCE55
:20300000008898008A3EBFC3CC2F428A53183C628A7570F50FBFF810807E84E3A850014C6F6
:203020000C4E5C003A850028645272EBA808BB02FC08AB02FC08BB02FC20CA09F19CDB3476
:2030400031A4E38F2850D200200561C4E3885F235033A85006050021F5007FD081A4E2804
:20306000645272EB7A0C4EB40228645272EB7008BB02FC08AB02FC08BB02FC09F09CDB2243
:203080005520CA09F19CDB65580228C93220CA9A558A00D8620603051A8F238301C07AF079
:2030A000550C4E44033A850028645272EB310B8A12000B8813000CB4841F2B6410A3EB080A
:2030C0009FCE08898008A3EBFC3CC2F4282432830E0F504503810E07E84E3A850014C9349C
:2030E0000328C2565634031A4E38F2850D200200561C4E3885F235030C4E46033A85002889
:203100000645272EBDA0B8A12000B8813000CB4841F2B6410A3EB089FCE08898008A3EBFCCD
:203120003CC2F428243283B70F504703810807E84E3A850014C909F098DBD809F099DB88A1
:2031400010300909F198DB09F09ADBD809F09BDB8810300909F19ADB0C4EB4023A850028CD
:203160000645272EB2E08BB02FC08AB02FC08BB02FC09F09CDB9ACA229E34031A4E38F285F9
:2031800028645272EB0D0D2002000B8A12000B881300562CDF3028645272EB77BC1028CF65
:2031A0005408A3EBFC6768DB3885F3319B2050AC0331898831204817B02049C317B020B877
:2031C00098BA3009240109F010DC881009F110DC820909F011DCC109F111DC6F8502802726
:2031E00071501370500820CD09F19ADB141920CC09F198DB141170500820CD09F19BDB14F3
:20320000620CC09F199DB268509F09EDA9F85808540564156286452726BF8BC1028CF5492
:203220008A3EBFC6768DB3885F3319B2050AC0331898831173025SCC31730225D1C481E74
:20324000005C03A8100C5E00806DF0FFC02420BB002448140A0C5E00002420BB00244865C0CE
:203260003460000005EA30CC8F2C8301467EFC5E7EFD5F284E536F8502803F71501F70507A
:20328000000E09F09ADB98CD300909F19ADB142B09F098DB98CC300909F198DB141D70500EF1
:2032A0009F09BDB98CD300909F19BDB140C09F099DB98CC300909F199DB268509F09EDADD
:2032C0009F8581032C1532405620CA9A5524218A33244A60000005EA30CC8F2C8301463CE8
:2032E000FC56560000000000000000000000000000000000000000000000000000000000026
:203300000041388015628603308A0990E676E336300D624CBBA121520142C09F0F9DB9C7C57
:203320000812409F015D903B91D063002AF00801609F0FADB22802815813A800009F0F9DBF6
:203340009D7C09F1F9DBBA09F0C1DAAF00810824238F1282022421BB0024EB28EE925683
:20336000207DB81205082D39D824A8BB12567000500000000A00000000250000C0000147
:2033800009F0C1DA03A8971EB5974EB060C200670B4EB09F0BEDA03B84908A69903280D56
:2033A000201C20057872EB2E08A1EBF5A5EB142B75EB30A4EBA1EB0C20867009F0BEDA03F0
:2033C000B82108A69903280D201C20057872EB0608A5EBF51405388180A4EB759905207C3C
:2033E0002819205609F0C1DA2461AF008108AF0407F9062C0E352C1D356500D6BB002421E4
:203400000028329283F1A49A6300D6BF00281E358076281E358071281E35806C281E35814F87
```

```
:20342000AF0880636FF60C83CD281E35805965CED8BA03281E35164F8102B49A5032F428C6
:203440001E358043281E35803E281E35AF028108AF048104AF08802F2401281E3580280979
:20346000F0D3D88F018108241009F1D3D8B49A8F7607F94F281E35AF3F8276243167A0D987
:20348000282535806C14021468281E35161F80612431240F2EA0D965D5D888C8617A748833
:2034A00088281E3524011660ADFF8C10804B1660ADFF164C8E10164F810354B49A444633F1
:2034C000E014AC08A49A11285699207CADFF09F1F9DBB92409F1ADB09F0BEDA03A83E673B
:2034E000C9D80C4EFEFF3A85003A8600285B5A142CB98009F1F6DB140A0A10AE20AE8809EF
:20350000F1F6DBCFD709F1F4DB3A8021140FB90409F1F4DB3A801FB9C009F1F6DB561670FD
:2035200045C7AF005659AF00810EAFFF8122240109F0A2D78F10800E596FF33F8114AC3F54
:203540008F13810E140147592401B90088E814D502965609F0C1DAAF0080032CF8356500DC
:20356000D66794D9BA0A15206506D61C322D010050D0524E2034A9005428C0458016B9005E
:2035800050B90050B81C09F09EDA05083835F2051A24105409F0BFDA03BF0B67D3D803AE58
:2035A00011677874140C679ED903AE0628F935670AD4650AD6BA02152009F0BFDAAC3FAFF5
:2035C0003F810D243128253580144F283836140E3AF33F28253580064F28383614F20EFC43
:2035E00000D6242D2412C96700D65509F0C1DA8F128202242128EE92560C4EFEFF3A850001
:203600003A86006500D428F159802C6700D46500D6BA7C15203A85003A86016500D428F1E0
:203620005980146700D4657CD6BA2F15206700D66500D4BA00152056595 05D2421C2152090
:203640005609F0C1DAAF008172679C7509F0A2D7AF01810E67D37509F0A2D7AF02810367F8
:20366000019756500D6592421152067A5D76508D6BA08152009F0A2D7AF00800A67E5D7655E
:2036800062D6BA20152028D63609F0A2D7AF01810328BC3608A09906B97F09F100D609F0A7
:2036A00004D6A805240109F0C1DA8F1007FC0224102421BB006700D628EE925667E59F6567
:2036C00024D6BA08152067CDD75DAF008107652CD6BA0C15205667B5D75DAF0081F76510B6
:2036E000D6BA10152067F69F6520D6BA0415205608A07E052862378011387DF0305809F0B2
:20370000BEDA8E100388227E145708A69950280D2075994A09F0F0DB24C109F0F1DB24D136
:20372000207C5009F0BEDA5009F0C2DA5020FC09F1F0DB20FD09F1F1DB0FFCDCDA830CB90A
:20374000C709F1F0DBB9DB09F1F1DBA499089A00387DF3B9000AB0ADDA34012CFA803A826B
:203760001856207EACE031599F7D5609F0BEDA03BC05747E15140CAC1E387EF06CF01E8FC0
:20378000108072862378002A07E5608A1EB1D08A69903280D200C4E00003A850028645294
:2037A000759905207C28192008A2EB033881805609F0BEDA03BA7E09F0C1DAAF0780406597
:2037C00000D662070028329283676700D6B901165F801747651E72BA0615248039B199B9E0
:2037E0000009F1A2D728B19D1447B900165F8026A19909F0FE9F09F1A2D728B19D1432B9F9
:20380000409F1F4DBB90009F1F5DBB9C009F1F6DB3A801F141BB90009F1F4DB09F1F5DBC0
:20382000B98009F1F6DB1406B9C009F1F6DB3A8021281C205609F0C1DAAF0080C271EB1F91
:203840003881806F800080E908A4EB0E08A0EB053A804314DC3A804414D73A804514D228B7
:20386000BA5980CD08A69903280D20BBFF28985828B65880BCBB0028985828B65880B228A2
:20388000935980AD6700D6BA20B9FF51C932FC62100065F0DF6700D628C811621000065003D
:2038A00028C811B9DF09F104E0B90009F105E065F0DFBC0528A02 06720D6BA2009F017D5
:2038C000E009F017E05132F96500D66720D6BA201524810B3A8052388081B2EB2C313828C6
:2038E0003D59B98528D258ACBF81053A805814EC09F014E009F100D609F013E009F101D625
:2039000009F015E009F102D6B90009F1ACDB09F1ADDB285B2072EB320F4EA10180F409F08D
:2039200000D6240109F001D61A4E09F002D6228528645272EB14283D59B98528D258ACBFD4
:20394000810A3A805814953A8010149009F014E0240109F000D68F1080ED09F013E02401B5
:2039600009F001D68F1080DF09F015E0240109F002D68F1080D1B92809F146E0B90109F1F0
:203980005EE009F15AE0B91109F14AE0A811AF9980F6B90909F15EE009F15AE0B81109F060
:2039A0004AE08F10806768F0116FF09980F0B90109F15EE009F15AE0B9AABA0809F14AE017
:2039C00032FAB90909F15EE009F15AE0B8AABA0809F04AE08F10803532F6B90109F15EE0D8
:2039E00009F15AE0B955BA0809F14AE032FAB90909F15EE009F15AE0B855BA0809F04AE053
:203A00008F10800932F609F15AE02C31383A804A09F15AE02C31386500D6BA08B9001500F5
:203A200009F0D3D809F106D609F0C5DA03A83D283698831B28074B388EF0B9003835F205AB
:203A400001A6FF0008117C83DF036821107E838B90209F1F4DBB9C009F1F6DB143A6700D61D
:203A600001C3851D0511C3651D055142267BFDAB900161E161E161E161E8105B9022C103547
:203A80006700D6B900512034511C3251D0556700D662080028EE925628063B816809F0BEC8
:203AA000DA03B86103B9180EF404008203CE8740350C6204006500D6283292340C83462421
:203AC000168E158E14813E09F0ECDB240109F0EDDBBA00AFFF8001C207E8F08F268311074C
:203AE000FD048F0C830A242C65000028BC9314153A8021B9C009F1F6DBB90609F1F4DBB9E8
:203B000000009F1F5DB5609F0C5DA240109F0C4DA24488E0109F0C3DA24618E105628063BBE
:203B20000814209F0BEDAAC03AF018138AF008136AF0281706700D6B9FF5509F0ECDB2421C2
:203B400009F0EDDB2431B9006FF3FF8001C106A00107E8F2241306A002241206A003620447
:203B6000 0028EE92146F0EF404008203CE8781350C6700D6B9005506A00109F0ECDB242181
:203B800009F0EDDB2431AFFF8005B90106A00107E8F2241306A002241206A00362040028 4E
:203BA000EE92340C24168E158E14812909F0ECDB242109F0EDDB24310DF20100B8008201C6
:203BC000C08F6007FD0983058F4A07FD02242C67000028DB9456000000000000000000001E
:203BE00000000000000000000000000000000000000000000000000000000000000000C5
:203C000000000000000000000000000000000000000000000000000000000000000000A4
:203C2000000000000000000000000000000000000000000000000000000000000000000084
:203C40000408880128C04580032CAB3F285742835D815EBB0228E2448057289042812E0FEF
:203C6000F2030007FCF46539FE3582BA04595232FC283698820434821421280446 3482AF30
:203C80000081180DFE04000EF2040014D2BB8228E244801DBB8028E2441416B3996736FED0
```

```
:203CA00065DEDBBA041520BB0028E24414033A8030281C2056BB0228E244805367BFDA59F8
:203CC0002451592441592471502461283D47833F0FFE00008121B90116DE28B846832B0F33
:203CE000FE00008112B90116DEBB8228E244801FBB8028E2441418BB0028E244801109F013
:203D0000BEDA03A80A3A801E1405BB0028E24414A06700D6B9005109F0BFDA51B90051551F
:203D200009F0C4DA247109F0C5DA24618E1780032CD23D6FF700810366FF7F0EF60400827F
:203D400005B9082CD23D09F0BFDAAC06AF04810D3A805E09F0BFDA038809F1BFDA09F0BF5D
:203D6000DA03AB113508BB0228E24434088063281C2028D33D09F0A2D7AF02801109F018E2
:203D8000D803AE0A09F0BFDA039C09F1BFDA09F0BFDA03AC0E3508BB0128FC44340880322E
:203DA00028D33D6700D6620400350828EE92340809F0BFDA03AC0328FC3D09F0BFDA03AB22
:203DC000113508BB0228E2443408281C20800328FC3D566700C85DAFFF81060DFE060014CA
:203DE000F50EFE00C8240FBA06051A31D824286703D65B24015D880A51D055566700C86485
:203E000000016500D65DAFFF81510EF60800874BB90050062004AC0F50062003500620004CA
:203E200030A150B900505009F0BFDA03A809B9005006200550141A09F0E6DB242109F0E731
:203E4000DB24310620052401B900052AD3502412500DFE06000EF4080080AA6200018A2CF3
:203E6000810C35886700D628EE92348814915628C04580032CAB3FB90009F118D86745D96E
:203E8000657FDABA2E152009F0BEDAAC0FAF0D80032C563F09F0BEDA03BC032C423FAC143B
:203EA000AF1480032C973F285742832B6501D68008060001060E02801B5C2401AC3F8005DE
:203EC000D0AF4080183A8021B98009F1F6DBB90109F1F4DB2CA63F3A80302CA63FD009F153
:203EE00018D8AFC009F0BEDA03AB47831FB9FF09F100C828204183DCB9FF09F100C028CD72
:203F00004083D1BB8228E24480CA1463B9FF09F100C828204183DBB8228E24480B6BB0101
:203F20028E24428C341BB0228E24428CD408376143D8307BB0228E24414B8BB0228E24411
:203F400014D0BB0128E24428C341BB0228E24428CD408352141C08A1993D2876408347BB20
:203F60008128E244804028C341B9FF09F100C8286D472879470C4EFEFF3A85003A8601670A
:203F800045D9285B5A285699288A8809F015D903AB1428D241140F3A801FB9C009F1F6DBB1
:203FA000B90109F1F4DB281C2014033A805F5635816703D6383DF3165F24018006203DC9F0
:203FC00055140582035DC955D00DFE040033E834815628C04581032CAB3F08A69903280D28
:203FE00020BBF5289858644103BF003CF44E38F785350C28645272EB25340CBB1C350C65E2
:20400000000002407BA00246C3AF4053AF502281059340CC709F09EDA8F7183CF1405340C13
:20402000388180281C20566700C8B8015DAFFF813803AD2F062003224E062004AC0F224F13
:204040006200430A12285358128645228045034816FF001810606200528AF3F358128995A
:204060008A34810DFE060014C3C06FF00207FD056700C014B75628574265000C8B9FF543578
:2040800040289042344081350FFCF8CF823AB98450B90050500620025009F09EDA062F0327
:2040A0007FC2006200331A1062E0150062007500DFE08000EF2080007FBCD14C2B9FF5414
:2040C0004014093A803E14033A802741566500C05CAFFF81060DFC060014F56700C8B9FF47
:2040E00054165F813A0FFCFAC782300620032441062004AC0F245106200430A12471062020
:204100005246135806700C0288515348080060DFE060014C9BA06152014C3413A8027560B
:204120006100C81660AFFF81060DF8060014F43510289042341040817040FF2030007FCEFEA
:20414000FF8FACF82780EF2040035826539FEBA04595232FC283698835D351028074B34DE
:20416000103835F06FF00007FA456F8E0007FB073511280F4B3411278E6700C828851581F3
:2041800028B98116E0B90006C00106C002241406C003241731A18E1506C004241606C005FF
:2041A000B9FF06C0060DF80600C6C814B7141334820DFE0400148234823A801D1404413A75
:2041C0008027566700C86500C0BB08BA00152033FA5609F0BFDA24312898586700C06400CF
:2041E000000BF003CF44E38F785358C28645272EB60348CBB230FF44E028302BB1C5DAFFF1A
:20420000811A03BD060DFE060014F2D4062F03800BD731A18815062F048001CB358C65009E
:2042200002407BA00246C3AF4053AF502281059348CC709F09EDA8F718305BF0007E8F4F2
:2042400009F09DDA240109F09CDA8F0C07FD941405348C388180566500D662040028329232
:2042600028683736502D65809F1B7DB164E5C09F1B6DB8162AC0380040296145A3A80215D
:20428000B98009F1F6DBB90309F1F4DB0286144767B6DB59163E813F281C20620001592409
:2042A00015D8F0A820809F1B6DB24281405C909F1B7DB6500D635422832923482029660844
:2042C000A6991408A59910493582B022813208303280D20348244856350167DEDB709B3957
:2042E000240109F0CFDB8A0109F0CDDB8801B9003835F2051A242809F0C9DB240109F0CA39
:20430000DB880A06A001D05509F0CBDB201C106A002B90006A003140A51208551204E5153
:204320000204F5534015628854381593C50F43885F7350C28A844803E3501283D4734018383
:20434000350FFE00008130B90216DE350128B8463401831D0FFE00008109B90216DE28BE5E
:204360004480D5BB8028E2448007BB8228E2448005BB0028E24441340C493CF44E38F7857F
:204380002864524856350124210F0A2D7AF0180343AFA0A24D03AFC003C50F63885F0BBFE
:2043A00001B90809F11AE0BC05BD02356B281059346B8011356BBC05BDC1281059346B80D7
:2043C0000427FA80E240340156351035110640032224E064004AC0F224F06400430A122850F
:2043E000286452341172EB45B90809F11AE009F014DC03A80328424424D03AFC000640038B
:20440000002461064004AC0F247106400430A124010640052421BB01BC05BD02354B281059 60
:2044200034480BC05BDC1281059810502963A8055B90409F11AE0283E44341056B8A02A
:20444000001402B8A1B90A09F119E0B90109F11FE0D009F11EE0B93309F119E056351035808D
:204460000062003224E062004AC0F224F06200430A1228528645272EB2834800620032461E6
:2044800062004AC0F247106200430A124010620052421BB01650000BC07BD0128105914CB
:2044A0000004348002963410563C50F43885F72461350DBB0228E24480028F11340D5635100E
:2044C00028C9433410811A060032441064004AC0F245106400430A12471064005246E1021F
:2044E000965608A6991208A5990E3502B80022813208303280D20340228FC4456350267006A
:204500000006500D462000228DD113402B90409F1DDDBB8042413AC03050868F008BA042452
```

```
:204520001303BC07AC036700C081036700C877F34424CF35C30C4EFEFF3A850038F0862894
:20454000F15934C380120DFC0002C032E624CF28B245AF4C8002144B09F0DDDBC9810609AD
:20456000F1DDDB14ADB9FF5509F0BDDAAF0481333A8016142E24CF61FF07B90017C028B2F7
:2045800004 5BB4C8A3124134E5435830C4EFEFF3A850038F086285B5A34830DFE0002C0322C
:2045A000E88F114965000067 00D462000228C81148566610000B9001608446FF90883F856CA
:2045C00009F0A2D7AF02800809F02DD903B801C156000000000000000000000000000000005E
:2045E00000000000000000000000000000000000000000000000000000000000000000000BB
:204600000 31888016000C009F1B9DBD009F1B8DB28074B20353501AF0007FA6C6F8E0007C6
:20462000FB03280F4B278E283D47835E0FFE00008104B90116DE28B84683780FFE000081C9
:204640005BB90116DE350C6F80558113B90009F114DC285C44810BB90109F114DC14033A4C
:204660008000B80028C943340C6F8055801E6640032441064004AC0F245106400430A12445
:2046800071 06400524611 49F1419142724290DF20600D209F1B8DBD309F1B9DBC63401C9E8
:2046A0002C15466000C009F1B9DBD009F1B8DBB9011402B900340256350C6300C01670AFBA
:2046C000FF811728702081060DFA060014EF40167003BF63038F16F014516300C01670AFB4
:2046E000FF810E03BE0528702082060DFA060014EC242B6700C028C54AAF008139B98028A2
:20470000A61709F0BDDAAFE58021287620821C0630012421 0630022431B86028BD498E10CE
:204720000009 24EBB91016DE40140F24EBB90128F148AF00800441670000340C56350C6382
:2047400000 0C81670AFFF810D287020811D82060DFA060014ED6700C8242B28C54AAF0081FE
:20476000D5B98028A61724EB14D04014CA6700C828504ABB8228E244566700C028504A6713
:204780 0000C05DAFFF8128062003 2441062004AC0F245106200430A1247106200524612855
:2047A000672006A002D006A0010DFE060014D36700C05DAFFF80032CDF48062001226A069A
:2047C0002002226B3580286420287F2024AF09F0BCDB244109F0BDDB245109F0BEDB24710D
:2047E000BE00287020348082072 4CF28F04A14C209F083DA09F1DBDB09F082DA09F1DCDBCF
:20480000B90009F1C0DB5DAFFF81AC06200 32441062004AC0F245106200430A1247109F0A1
:20482000BCDB8F14805F09F0BDDB8F15805709F0BEDB8F17804F0620052461358028762029
:20484000348083373C6AF2B870358028BD4934806FF000810CB92016DEB90109F1C0DB1477
:204860001E09F0C0DB06AA05B90028F148AF008167AF01800A0DFE06001404B99016DE0D73
:20488000FE0600148109F0BEDBC109F1BEDB240109F09EDA8F01831DB90009F1BEDB09F08E
:2048A000BCDB240109F0BDDB07E8F009F1BDDB241009F1BCDB09F0DBDB240109F0DCDB07EA
:2048C000E9F009F1DCDB2421241009F1DBDB8E1281032C00482CB247BB0028E2441411BB7F
:2048E0001028E244800ABB8028E2448003282740563581248F6700C028851580185D03AEE7
:20490000143401AF00800AAE845524C928F04A248FB90214043401B90109F1D0DB064001DE
:204920002421064002 2431B87028BD496FF00007FB46630100882B871909F0C3DB2401091C
:20494000F0C4DB8F28820BB87028BD496FF00007FB266000008FA88707458A0B24A81414B4
:204960008A0B24A84509F0C3DB240109F0C4DB8FA807FB3D882B14BF24AA280C4A0DF806EA
:20498000006700C0242928C54AAF008127B94016E0D406C003D731A18E1506C004D606C0D7
:2049A000528672006C002D006C00109F0D0DB14093A8046B90009F1D0DB348056350C6713
:2049C000 00C05DAFFF81380620018F1280350620028F13802E5D8C10802135830620 0324BF
:2049E00041062004AC0F245106200430A1247106200524612876203483820 8B800140AB84F
:204A0000 0114060DFE060014B9340C56242B09F083DA2401B90007E8F2052A07E9F209F099
:204A2000 2C1DB240109F0C2DB8FA8830C09F0BADB240109F0BBDB882809F09EDA250A051BA7
:204A40002 4482473BE231C428F488302BE1CCE5624CF62FFFF5C0DFC0600AFFF07E8F280ED
:204A6000 F40FF2010007FC5C244F65000024ED47350624AC242D600600052A88AA248C24BA
:204A80002F600600052A888A0640032441064004AC0F245106400430A12471064005246198
:204AA0002870203406AF01800C35C224C924EBBA06152134C2478FEA83B646246A07E9F636
:204AC0008FCE83A95624CA5C0DFC0600AFFF80F70DFE00088FCF820E24ED0EFE06008FEADC
:204AE0000830B5B5214F83A8027B9001402B90156358024ED0DFE06005950AFFF8106BA053B
:204B0000152014F434805628C045810B2C001328C04581272C2F133836F009F015DC8A0140
:204B2000C8B900BE1C051E24706441033A8E1C7AF68ED7C109F1BEDB2C0E1309F0CDDB249C
:204B40000109F0DADB8801B9003835F2051A242809F0C9DB240109F0CADB880A09F1CADB09
:204B6000D009F1C9DB820909F0CBDBC109F1CBDB09F0BEDB2471C109F1BEDB644103BE005B
:204B80003A8E1C2C7F13000000000000000000000000000000000000000000000000000073
:204BA000 000000000000000000000000000000000000000000000000000000000000000F5
:204BC0000307880128034C0C3002D73C30F806400809F10BE009F104E009F112DC0640090A
:204BE00009F10CE009F105E009F113DC09F108E009F101E0B8001A2EB90009F107E009F1B6
:204C0000000E05609F0F3D803B806B90109F1F4D809F0F4D8243109F0EBDBB800AF00800198
:204C2000C0D8051BD009F1E5DB228AB9003835F3051BD009F1EADB6502D709F0F4D8B80AF9
:204C400005082420B90015006102D7670A0009F0F4D8243109F08DDA240109F08CDA3AF55D
:204C6000 000388AF4052C630000B98006C00220FB06C0093DF4FA20FBC906C008888F33E9EF
:204C80005609F0F3D803B80A288D636502D73CFC30566102D724C9670A00BE0009F0F4D806
:204CA000242106400203BF18064007388FF38A318F3607FC04246324C9888F32E52CC24C23
:204CC00024C9248D06400809F10BE009F104E009F112DC06400909F10CE009F105E009F12F
:204CE00013DC09F108E009F101E0B8001A2EB90009F107E009F100E03CFC30561C24BB00DB
:204D00003835F2052A246A2440BD0008A084032CAB4D09F0F3D803AA06388AF52C544D6F99
:204D2000F40F00226FF700801D7FF68A07FC17388AF58A5609F0F5D83835F005088F508299
:204D4000 01324502C644D09F0F5D83835F0050824502C644D09F0F6D83835F005088F500757
:204D6000 FC022450B90024053835F2051A3DF03E6940003C32F23834F03E3EF27B40F082F6
:204D8000011203E9A323835F2050A8A503834403C323E886569F70069F4003CF62638F428E2
```

:204DA00038F5906FF5008103B29A563A90005609F0F3D803B801566102D7670A0009F0F41E
:204DC000D8242108A5830428C44B5608A7835A3F30F881322038064F0507FD2A830C06409A
:204DE0000324010640041F36831C2040064F02831507FD0D064000024010640011F3E07FDDA
:204E000005B98006C002888F32C509F0F3D803AB093C30F8B98006C002563C30F809F08F5C
:204E2000FEAA8006C0072C3C4E768301563C30F809F08FFE06C00708A09A01563C26FA3893
:204E400028F41C2A8AA87B2CF4B900240424CBBB003835F205EA248DBE016F2C0080080FA8
:204E60002A00008002BE0088A669FB0069F4006FF40007FD1A6FFB0007FD147F8AFA07FDCF
:204E80000E3C30FCB90006800638F8F52CAC4E09F0EADB242124098806A900051AD23C3048
:204EA000FC06800609F0EADB8A16245124293AFF003D36F27938FF38FFF424AA8AA56BFB6E
:204EC000006BF4003C30FC20FA06800020FB068001D40680020EF201006BFF00D2068003A7
:204EE000D306800420FF068005560000000000000000000000000000000000000000000055
:204F000000000000000000000000000000000000000000000000000000000000000000091
:204F200000000000000000000000000000000000000000000000000000000000000000071
:204F400000000000000000000000000000000000000000000000000000000000000000051
:204F600000000000000000000000000000000000000000000000000000000000000000031
:204F80000118880209F08DDA240109F08CDA248809F0E8DA240109F0E9DA244863EBDA8F1F
:204FA0004982333C2EFE88EC6500D662010035FF28DD1134FF16706700D616DD3C2EFC8858
:204FC000CC62010035FF28C81134FF07E8F4450FFAEDDA07FCC9560000000000000000020
:204FE00000000000000000000000000000000000000000000000000000000000000000B1
:2050000041288013C50F43885F6282850383DF36700D61C5051D0512085517F3DF2800275
:20502000BA00D251C233EC5609F09EDAC9240109F019D8050824C809F01BD82401B90088C3
:20504000C877F5283FF44207FC2209F019D8050E2428240C052D88CABF232427BB0005EA86
:20506000D78A128F178002B9002421561C42052D61230005E909F09EDAC9240109F01AD8F5
:205080002431050824C809F01CD82401B90088C8D6050B2428240C1E42052D88CA88C9BF51
:2050A0001C14B72B72000B1C00002B7280A3EBA6EB0CB4D3502BCE002B8002BA3073EB1226
:2050C0008AE72F9089E72B6EB32F23A8101B2EBA1EB562B72000B1C00002B72803AF2305A
:2050E000CB4EF502B800208AF680328492057089F72B3EB08AF68F628492057088FDE28A9
:205100001753574B350109F042E003AE12340108AC4A09620002600291353503572C02910886
:205120000AEB1A08BE0319016F40308110283A20A0EBA1EB0C2086703A8125B2EB340157B3
:2051400008A199033A805B34015777EB050D200400562CDE70088B01088D01B9013A3D2383
:20516000F4200008008B900089B013A3D1C09F11BE00D2002005609F09EDB240109F09FBD
:20518000DB2F000081402831531CC42D40002D7FFF833409F0A0DB240109F0A1DB3DF0C2EC
:2051A0006CC3013CC2C00CC4000009F09EDB240109F09FDB2E010009F19FDB241009F19EB8
:2051C000DB80C32891204056088EE26141034A2B68062BE041A5E9A0E9A4E9089D003CC2AF
:2051E000C00CC4000038CAC83AC9003CC4E20CECCEFE0CE4161A0CD4DA1B3AE1043AEE026E
:205200002BE0312BC4523CCCCE2B68824B08A49F03088F0075E91B08A0E9F9A0E90EF80163
:20522000080F13A8102B2EB08A09F06088F00089F005628369833132807B08A69903284A
:205240000D20286452759903281C205609F0C0DA240109F0BFDA1A4E09F0C1DA22852872F1
:20526000881015628230475E97F08A2EB032C9D2008AFD2F208A19F06088F00089F007426
:20528000EB5E09F0A4DBAF008156C909F1A4DBB4EB1C4E3885F23886F33841F43507A1EBE7
:2052A000C2096701C20057872EB4008A1EBF534071A4E38F28538F38638F441B90E09F1AC
:2052C00018E028440409F0DDD803AA0A3A8004B399208628D84275E91072EB0908AFD2F6BC
:2052E0003A8153B2EB28C256564056340728C25656769B222B68062BE1173AEF6A0CECCCC0
:20530000FE0CDE15713AE1063AEE062BE0312BC452A0E92B68865608AF6815089F680CEC20
:20532000CCFE38E1EE2BE0312BC452A0E9088F6856A0E9BBFF4070E90333FB41566550DB0D
:205340006760FEBA042085050A88C815205665F0DA675CFEBA102085050A88C8BA0420504F
:20536000AC03050A88C815205672EB496F800080442079AF06813F09F0ACDB240109F0ADE2
:20538000DB1A4A6041031E4A1A4E28645272EB2207E84A0F4A410380040C4A00001C4A1ACD
:2053A0004E09F1ADDB241009F1ACDB28645272EB015628C256561C5009F1B4DB241009F11D
:2053C000B5DB2B64192B7280002B7200111024C860000062420305EA240A1A4E09F1B2DBBB
:2053E000241009F1B3DB268509F09EDAC99F8582033A850028645272EBB8383D4A283D5934
:20540000B98528D258ACBF810D3B4AF13A8058144B3A8010144609F014E0240109F013E0FA
:205420001F4E80ED09F015E09F8580E509F0B1DB240109F0B0DB2D010009F1B0DB241009FD
:205440000F1B1DB821709F0AFDB240109F0AEDB2D010009F1AEDB241009F1AFDBB90E09F1E2
:2054600018E056A6E90CB4841F0B8A13000B8812000AA4B8B089FCE0889804B08A3EBFC560E
:20548000A3EB2B64100CB4C6540B8A12000B881300088ECE088980089FCE089ECE08A3EBC4
:2054A000FCBA05BC106700D620B85120BA5128CF5408A3EBFC20B85120BA5132F10B8A12D9
:2054C000000B8813005628462028492B0B3EB57A0E92B8000088EE22B64192B7280002B72AE
:2054E00001110011E1208A7F1096DF0FF6DF1FF2D01002FD403832B2FEE07832B2F080C01
:205500000832B2F2210832B2F3C14832B0B8A12000B8813002B6410089ECEA3EB088980089A
:205520009EE256611A041412613408140D614E0C14086168101403618214888425098A09A7
:2055400031D8BB03051B138A2D01001388A3EB4088F8008A0E9044B2CCF544B089EE256B7
:205560002B6885088EE020CA121467B8FEBA0309F09DDB2431089FE008AFE0FC106A8A13BC
:205580008202B9005132EE3CC4BC5628635420B898BA3009560CB4C654BC1028CF5408A317
:2055A000EBFC20B898BA300956BA1E0CB4841F0B8A12000B881300CC2A3EB2B800208A3FF
:2055C000EBFC3C48C228912072EB111E482D01002DFDFF820A32E03A8151B2EB28C25656BD
:2055E000BA100CB4841FB6E9BC101CC2246828CF54240E08A3EBFC3C48C228912072EB110D
:205600001E482D01002DFDFF820A32DCB2EB3A815128C256561CC22D1200AC011AC2289195
:205620000BB0214022440288B552421B80020B8051A2E000124201CBC2D0A002DEBFF83FB

```
:20564000E61CBC2D1000D0B800051A33D8D0881430095608A0EB070C4E44032864522B461S
:20566000032BE2413A4A01088EE0089F680889002B14C80D200200560B8EFFFF0B8CFFFF86
:20568000089FD02B82C008A0EB0A088E00A0EB0D200200560B9E00088800088F010D2002E6
:2056A000005608AFD010089E00088800088F01089FD00D2002005608AFD006B5EB0D2002D7
:2056C000005608B8002B14802B8000A1EB089F682BE0400C2090703881805677EB4A70E9D4
:2056E0000156A0E975EA60B90038CFF03DF0643B92363A925ABA5A1C640C640000051AD0AE
:2057000024219A91A802A8FC831F3F686683191C6831C81A681C662F5B5007FC080C665B4D
:20572000500C68B6A0287457561C662F5B5007FC05605B5014092F720007FD036072001AE6
:20574000680C66000014DE09F0AADB240109F0ABDB2E0100810A09F1ABDBD009F1AADB567C
:20576000B90209F1A4DB289D2072EB01563A805A3A815A5638F2910D20020008A1991B1C7A
:20578000C235010F204A7081091C20057872EB0B14F134013F0C2289120563401564B0D43
:2057A0006601002817535709F09EDA242109F010DC240109F011DC051AD0AF7007FD0EAF24
:2057C0005C07FD102658800C3A58FF1407275880033A5801B90009F110DC09F111DC562012
:2057E000C4A80CA8E78219B90009F110E009F010E0B2E908A39F06088F00089F002CA31B68
:205800008AC001A09F00EE0AC0FAF0B801008AC000CB90009F110E009F010E0B49B2CA364
:205820001B1CCC4B089F682BE0412BC4524A2CF9051CCC4B089F682BE0412BC4524A2C5273
:205840000600000000000000000000000000000000000000000000000000000000000042
:205860000000000000000000000000000000000000000000000000000000000000000028
:2058800003248801B9E009F106E06701E0240D53D055D409F106E056BC03650000288458BC
:2058A00009F0ECDB24E109F0EDDB24F1281012B583A683A78356BC0165000028845809F003
:2058C000ECDB24E109F0EDDB24F109F017E028F8115609F110E009F141FE621601A0E90981
:2058E000F010E003A81B08A0E9F5A0E90EF2010080EDB90009F110E009F010E0AEFFB8FF95
:205900005609F010E0240109F011E02501AF0056D309F112E0D709F113E0D609F114E0D0F7
:20592000009F115E0D209F116E0B93309F119E0B90E09F118E0288458D528D25856B93309A8
:20594000F119E0B90709F118E0B90009F116E0C109F112E056BC0565000028845820 3D096F
:20596000F112E0B90E09F118E0B90B09F119E0D309F11EE0B90109F119E0B9D13F4E4207FC
:20598000FD02B9AA09F11FE0B92109F119E009F010E05665570671EE0621000D309F11919
:2059A000E058161F800B58163F8006C332EE8A22563A8037388081B2EB5609F0FE1FAF00F5
:2059C000802C67000065FF1FB900281D12AF0081053A8022F141267002065FF9FB900281D55
:2059E00012AF0081083A8032388081B2EB56028656354028645272EB3C08A4EB14BE662884
:205A0000F92E72EB3028A95572EB2AB90809F11AE03885F03886F2BB013AF4073AF5013CB6
:205A200004EF60CFC00002810598IIC268509F09EDA9F8580BEB93409F1FADBB9FF09F1F907
:205A4000DB02963440140D670000344062000228DD110286B90409F11AE056650000620093
:205A60000228C8113AF80028645272EB3928A95572EB33B90809F11AE03885F03886F2BBFA
:205A8000013AF4053AF5023C4EF60CFC00002810598 00226F8268509F09EDA9F8580C86FF1
:205AA000F8028302140502963A8033B90409F11AE05600000000000000000000000000C2
:205AC00000000000000000000000000000000000000000000000000000000000000000C6
:205AE0000000000000000000000000000000000000000000000000000000000000000000A6
:205B00000411880109F0BDDA244109F0BEDA245109F0BFDA246109F0C0DA247109F0C1DA19
:205B20000248109F0C2DA249109F0C3DA24A109F0C4DA24B109F0C5DA24C109F0C6DA24D1A4
:205B4000353E289A5B343ED409F1BDDAD509F1BEDAD609F1BFDAD709F1C0DA20F809F1C1D0
:205B6000DA20F909F1C2DA20FA09F1C3DA20FB09F1C4DA20FC09F1C5DA20FD09F1C6DA3894
:205B8000F63938F73838F83738F93638FB2538FC246F8000800328166F5628216483530FEA
:205BA000240000814D09F08FFEC109F18FFE3A4102289A202804046F810080062807 4B2C7A
:205BC000775C2C706328216483280F240000800C09F0A2D7AF02801A0C2401003A412A2821
:205BE000E363288D6314CA0F24000081053A4102140D560F24000081F93A412A28E36309F3
:205C0000F0C0DA240109F0BFDA1A4E09F1D4DBD009F1D3DB09F0C1DA228509F1D5DB09F0DC
:205C2000C2DA2286B09B09F09EDA9F8507FD043A803E5660FDFF1F4E07FB0F09F09DDA247C
:205C4000109F09CDA1F4E07FB043A803F563A3D233F424E83033A3D1C383D8E7A868E7F80
:205C6000863D07FD073A8047562C70632804046F810080F5288D631C243835FC3AFD00056E
:205C80002D3CFC263CFC2A38F02838F02C6004DC09F103DCD009F102DC08A39B0D2C245DB2
:205CA0000008A29B032C0D5F2C7C5E75991D7F8C2907FD6E207C281C20B90809F146E0B9088B
:205CC00009F144E0B90909F15EE0388AF07A29F0B9003835F2051A38F0886F250080097FE4
:205CE000248807FC033824886F88008134B90809F146E0B90809F144E0B90909F15EE02088
:205D00008809F150E009F15AE0B93709F10EE0B98809F146E020883835F0050878F029B30E
:205D2000B2CA05C09F043E003AB032CB75D6F250080087F882480032C8B5D388AF07A2960
:205D4000F0B9003835F2051A2F000080032C8B5D6F2500800B20249A888F0107FC02240117
:205D6000B90109F151E06750E05D03AF0A09F043E003ABF52CB75D165F80EE881009F150CA
:205D8000E078F0882035050878F0293888F26750E05D165F80FBAC7FC18A2107FC1609F001
:205DA00043E003BB127AF288BB003EF2242035050A78F0872CA05CA39B09F043E003AE0265
:205DC000145203AA02145220883835F0050878F0877A88246B250009F045E003AF0A281679
:205DE0002009F045E003BF67F298A810F0F24000081032CA05C08A69917141209F016D9A0
:205E000003BF0E08A6990AB80228132 08303280D202CA05C3A8030143709F049E003B81423
:205E200003B91603BA1803BB1A03BC1C03BD1E3A804C141C3A801814173A804814123A8015
:205E400049140D3A804A14083A804B14033A802909F046E0039F09F146E0008A29B1009F08A
:205E600010E003A81308AFD2F5287C64140A75E90708AFD2F9289D20562CA76008A5E9F9EC
:205E80008A79A23A79A09F0D5DB9F8509F0D3DB240109F0D4DB80041F4E810B1A4E09F036
:205EA000D5DB22852C9C6038872D7F8E2D07FC03388E2D6F2D008152B90409F106E01C4ECE
```

```
:205EC00009F113E0D009F114E0208509F115E0208609F116E0202D09F112E0B90509F106F6
:205EE000E0204109F110E02B82400B8E00800B8C00802BD2402B82C009F0DED809F1A2DB8A
:205F00007A2D877A2D8EB29BA1E92C995C09F010E003B8032CDF5F08AFD21308A79F06081D
:205F20008F00089F00287C643A7F4D2C7D62202B9E2C80057F2D2A816E3887F07F8EF00700
:205F4000FC03388EF06FF000815DB90009F140E0B90109F11CE06712E05D03BF1D09F0102E
:205F6000E003B809B90709F140E02CDF5F08AFD2E8B90709F140E02C1B5F165F80DBAC7F4D
:205F800081D7243109F010E003A8D9D3881009F112E0B90009F11CE0B90709F140E078F09F
:205FA0002D7AF0877AF08E09F011E003A81308A69F06088F00089F00287C643A7F632C7DC5
:205FC000626712E0382DF25D165F80FBAC7F240109F010E003A8088A202800112C995CB1C1
:205FE000E9A29B08A2E90B382DF028B96082ED2C706308A49B032C856309F011E003B8AE28
:20600000382DF209F012E08A2128001109F010E0AF0081062C5361729B10202A9E2B9E2C61
:2060200081716F8E0081062C7C5E2C995C08A09B37268509F09EDA9F8507FD233A8500071C
:20604000E84E774F0F09F09DDA240109F09CDA1F4E07FC393A3D233F424E83033A3D1C3ACC
:206060008600383D8E2C9C60088EE22BE0412B680620CA1214280F4B0CECCCFE3AE1063A63
:20608000EE062BE0312BC4522B6886140F3A803F2C7063759905207C281C20562804046F53
:2060A000810080122C995C08AFD2F9289D206F810081F13881802C7063B94F285C6409F0C2
:2060C000A2DBC909F1A2DB81302B82400B8E00800B8C00802BD2402B82C0A1E9A2E9BA05B7
:2060E000A0E908A0E9FC32F808A2E91208AFD2EC3A804FA2E9B1E941563A800A14F509F0BB
:20610000DDD803AA0E08A1990A3A8050B399208628D842B90409F106E020F009F112E01CD0
:206120002E09F101E0D009F100E0208609F116E0B90509F106E0204109F110E02B82400B35
:206140008E00800B8C00802BD2402B82C0B29BA1E9405608A59F06088F00089F0009F01169
:20616000E003AE0C3A8029B90E09F118E02C6963383DF2C22B82400B8E00800B8C00802B7D
:20618000D2402B82C0B90709F118E0B90109F112E0B98509F110E008AFD209B90E09F11895
:2061A000E02C1B5F09F010E003B8EC09F011E003BA0C09F010E003BD0303AC4F32B6B923A8
:2061C000F504E028302B91C9F3D801D6F3D23810A3A3D23088B01B9FF14083A3D1C089BAB
:2061E0001B90009F11BE0148709F0A4DBAF0080063A80582C6761289D203A7F58B90E09DC
:20620000F118E06F810081752C6761B90E09F118E009F8581063A803D2C67610975
:206220000F014E0240109F013E01F5080063A7F0E2C7D621A5009F119DCD009F118DC08A2E1
:206240009F06088F00089F0028340482063A80102C696375E91B08AFD2F9289D206F8100E1
:20626000810C38818014E9B399208628D8422C2B6309F0DDD803AAF63A801114EA207F288C
:206280005C6409F0E4DBC909F1E4DB80032C6663B90409F106E0208609F116E0B90109F1A5
:2062A00012E02B82400B8E00800B8C00802BD2402B82C01C2E09F101E0D009F100E0B90598
:2062C00009F106E0204109F110E008AFD2032C1B5F09F011E003B81609F010E003B8EB080F
:2062E000A2E90E3AF00128B96082DF2C70632CAE5F08A49B032C856309F010E0AF00810386
:206300002C536109F0DED8C109F1E4DB267F09F0DDD803AA11387F80208628D842B39909EF
:20632000F0DDD803B94ABA012800116F2D008133B90409F106E0202D09F112E0208609F1F8
:2063400016E0B90509F106E0204109F110E02B82400B8E00800B8C00802BD2402B82C0B2E5
:206360009BA1E92C1760387F80208628D842B399759906207C281C2056739B015609F043DF
:20638000E003ABF956287C643A800314E36000001A2E09F101E009F108E009F105E009F126
:2063A00013DC09F10CE0D009F100E009F107E009F0ECDB240109F0EDDB09F104E009F10BF4
:2063C000E009F112DC24C809F0E6DB24E109F0E7DB24F16000000DFC010069F00005EF388B
:2063E000FC8A5609F08DDA240109F08CDA2D0600242809F103E009F10AE009F1E7DBD00908
:20640000F102E009F109E009F1E6DB3835F0B900052A240A2E010009F14FE0D009F14EE048
:20642000561C242F000081302E01001D363C38FE8201476FFF008107413A801D2C5B641A15
:206440003E38FE403C3EF23840F5283298830C09F0A2D7AF02408003283698563501247131
:2064600009F002DC240109F003DC24E8D751240F09F103DCD009F102DC340156B90009F122
:2064800010E0B90C09F10DE0B90809F10DE009F010E009F011E0A29B560000000000000052
:2064A00000000000000000000000000000000000000000000000000000000000000000DC
:2064C00000000000000000000000000000000000000000000000000000000000000000BC
:2064E0000000000000000000000000000000000000000000000000000000000000000009C
:20650000000000000000000000000000000000000000000000000000000000000000007B
:20652000000000000000000000000000000000000000000000000000000000000000005B
:20654000000000000000000000000000000000000000000000000000000000000000003B
:20656000000000000000000000000000000000000000000000000000000000000000001B
:2065800000000000000000000000000000000000000000000000000000000000000000FB
:2065A00000000000000000000000000000000000000000000000000000000000000000DB
:2065C00000000000000000000000000000000000000000000000000000000000000000BB
:2065E0000000000000000000000000000000000000000000000000000000000000000009B
:20660000412880128216483670F240000815C3A410109F0F3D803A80F719B0C2852202662
:206620008F08A09A032CD86808A69903280D20289A2028040428074B09F0F3D870840B0329
:20664000A908719B0528FC4C140F1C243835F2BB00052A3CF22638F0283C262A38282C0997
:20666000F0DDD803AC02B5412C2667142F282164832A0F240000800C09F0A2D7AF02801CFA
:2066800000C2401003A412928E36308A69903280D2028074B280404288D6314AE560F24000B
:2066A000081F93A4101140C0F240000081EE3A412928E36309F0C0DA240109F0BFDA1A4E5E
:2066C00009F1D4DBD009F1D3DB09F0C1DA228509F1D5DB09F0C2DA2286B09B09F09EDA9F1C
:2066E0008507FD043A803E560F4EFDFF870F09F09DDA240109F09CDA1F4E07FB043A803F60
:20670000563A3D233F424E83033A3D1C383D8E7A868E7F863D07FD043A80475608A6990325
:206720002800202C946608A29B032C90692CE368719BF308A39B0A2CA967759903281C20FA
```

```
:20674000567599147F8D87820C202B9E2C80D77F902A07FDD1281C20B9003887F03835F2FB
:20676000051A1F2407FC033824F038F0886F880081B4B91809F144E0B90109F15EE0B918D7
:2067800009F146E0208809F150E009F15AE0B93509F10EE0B99809F146E020883835F00582
:2067A000087AF087B39B2C266709F043E0AC0C81032C2C686750E05D165F80FB3888F2AC7F
:2067C0007FC18A2107FC0F2035050A7AF0297AF288BB003EF224B9003887F03835F2051ADC
:2067E0006FF00081C124301C243888F4BD008A0C81B4AF0080078F3007FC022430B9010917
:20680000F151E06750E05D03AF0A09F043E0AC0C801A14EF5D165F80FB881309F150E078AB
:20682000F3882035050B7AF0872C2667A39B3888F0203505087AF0293888F0B9003EF02430
:206840003A880009F043E003BA4109F045E003AF0A28162009F045E003BFF60F240000819A
:206860006AB9003887F03835F2051A6FF00081032C266709F016D903BF0E08A6990AB80269
:206880002813208303280D202C266709F049E003B81103B91303BB1503BC1703BD193A8010
:2068A0004C14173A801814123A8048140D3A804A14083A804B14033A802909F046E0039F66
:2068C00009F146E008A29B05287C64140A75E90708AFD2F9289D205609F043E0AC0C81F8B9
:2068E0002C436808A5E92708A79A26A79A09F0D5DB9F8509F0D3DB240109F0D4DB80041F70
:206900004E810E1A4E09F0D5DB22852C0D6B2C1B6B388A8B7A298B388B2D7F8E2D07FC03E1
:20692000388E2D202C9E2B80097F2A2D07FC03382A2D6F2D0081561C4E09F113E0D009F1C7
:2069400014E0208509F115E0208609F116E0202D09F112E0B90609F106E01C2E09F101E01C
:20696000D009F100E0B90709F106E0204109F110E02B82400B8E007D0B8C007D2BD2402B03
:2069800082C07A2D8EB29B719B03782D292C306709F010E003B8032C616A08AFD2032C112C
:2069A0006A202B9E2C80087F2D2A80032C546A388A8B7A298B388BF07F8EF007FC03388E96
:2069C000F06F2C008019382AF4382BF5382DF2BB008A4A6FF50080078F0407FC0224046FE5
:2069E000F0008170B90009F140E0B90109F11CE06712E05D03BF2D09F010E003B809B90721
:206A0000009F140E02C616A08AFD2E5B90709F140E008A79F06088F00089F00287C643A7FCA
:206A20004D2C876B165F80C8AC7F81C4243109F010E003A8C9D3881009F112F0B90009F102
:206A40001CE0B90709F140E078F02D7AF08E719B0378F02909F011E003B80F28DB6E2C30B2
:206A600067A29B09F011E003A81308A69F06088F00089F00287C643A7F632C876B28DB6E86
:206A800009F010E0AF0081062C2A6B729B0F202A9E2B9E2C800A08A19F032C3A672C3067BC
:206AA0006F8E0081032CE36808A09B36268509F09EDA9F8507FD233A850007E84E774F0F2D
:206AC0009F09DDA240109F09CDA1F4E07FC383A3D233F424E83033A3D1C3A8600383D8EC5
:206AE000142B088EE22BE0412B680620CA1214280F4B0CECCCFE3AE1063AEE062BE0312BF0
:206B0000C4522B688614063A803F2CC46E729B172804046F8100810F2CC46E08AFD20828EA
:206B20009D206F810080F12C2667202B9E2C80097F902A07FD032C526E08A59F06088F00CB
:206B400089F0009F011E003AE063A80292C486E03AA032CBD6C09F010E003AA053A7F12BD
:206B6000142509F011E003AC053A7F0C141909F011E003AB053A7F5D140D09F010E003A9E3
:206B800032C0A6C3A7F3909F0E4DBC909F1E4DB8006387F802C8F6C208609F116E0B901F0
:206BA0009F112E0204E09F114E0204F09F113E0208509F115E02B82400B8E007D0B8C0003
:206BC0007D2BD2402B82C0B90609F106E01C2E09F101E0D009F100E0B90709F106E020411F
:206BE0009F110E008AFD2032C116A09F011E003B81509F010E003B8EB09F010E0AF008017
:206C0000032CC76D2C2A6B2C6A6A09F0DDD803AC032C8B6A3A7F0809F0DDD803A808B9FFF5
:206C200009F1EADA141228001909F0EADAAFFF810709F0DDD803BB0E09F0E4DBC909F1E463
:206C4000DB811C2C986B65E2DA67DCDABA0635C2152434C28104152014DE3A7F15143A0998
:206C6000F0EADAAFFF81053A7F14142D3A800809F015D903AC1909F0DDD803AE12719B0F21
:206C8000B90109F114DC202F240120862826432086 28D842B3992C726E28844F09F0DDD8BC
:206CA000719B0303BE032CC96DB90009F114DC202F2401208628264383D52CC96D383DF230
:206CC000C22B82400B8E007D0B8C007D2BD2402B82C0B90709F118E0B90109F112E0B9859B
:206CE0009F110E008AFD209B90E09F118E02C116A09F010E003B8EC09F011E003BA0C096C
:206D0000F010E003BD0303AC4F32B6B9230B504E028302B91C9F3D801D6F3D23810A3A3DBB
:206D200023088B01B9FF14083A3D1C089B01B90009F11BE0148709F0A4DBAF0080063A80E1
:206D4000582C486E289D203A7F58B90E09F118E06F81080EC2C876BB90E09F118E009F01E
:206D600015E09F8581063A803F2C486E09F014E0240109F013E01F5080063A7F0E2C876BC2
:206D80001A5009F119DCD009F118DC08A29F06088F00089F0028340482063A80102C486EBB
:206DA00075E91808AFD2F9289D206F810080EE1407B399208628D8422CE96D09F0DDD80316
:206DC000AAF63A801114EA267F09F0DDD803AA14387F80208628D842B39909F0DDD803A971
:206DE00032C726EBA0128EA6E6F2D00815709F0DED8C109F1E4DB202D09F112E0204E09FC
:206E0000F114E0204F09F113E0208509F115E0208609F116E0B90609F106E01C2E09F10123
:206E2000E0D009F100E0B90709F106E0204109F110E02B82400B8E007D0B8C007D2BD24089
:206E40002B82C0B29B2C8B6A208628D842B39928FE6E0C2A00003A2C00B90E09F118E0B585
:206E60000833887F0B9003835F2051A8E1081552C8B6A09F0DDD803BD0214D4BA0128EA6E81
:206E80003835F224323887F0B900051A24038A02051B38F32A3A2B003A2C00272D202B9E86
:206EA0002C80097F2A2D07FC03382A2D3887F0C8B9003835F2051AC02088881022243A255F
:206EC00002CE96D759904281C205608A39B0B719B0809F043E0AC0C81F8566712E05D1690
:206EE0005F80FB382DF2AC7F8A21BB0078F2873EF22A6B2C007AF22D78F2862C1111B9005E
:206F00003887F03835F2051A7888F0A9003FF02407FC021A2456B19B2C046600000000 00DD
:206F2000000000000000000000000000000000000000000000000000000000000000000051
:206F4000000000000000000000000000000000000000000000000000000000000000000031
:206F6000000000000000000000000000000000000000000000000000000000000000000011
:206F80000000000000000000000000000000000000000000000000000000000000000000F1
:206FA00000000000000000000000000000000000000000000000000000000000000000 00D1
```

```
:206FC00000000000000000000000000000000000000000000000000000000000000000B1
:206FE00000000000000000000000000000000000000000000000000000000000000000091
:20700000004138801B67BC47BD57BFC7B067C107C1A7C5551EC7B2E7C3A7C897E8C7C057DF7
:207020000967D1F7EC4283070FB290D2A942A48702C2D6A2EB42BD12B132C452C5D2C6B2CA7
:207040000752FD82F4B30F130852EDB56752FD82F4B30F130DE704A70C47BD57BFC7B067C2E
:20706000107C1A7C5551EC7B2E7C3A7C897E8C7C057D967D1F7EFB290D2A4F2BDE70487065
:2070800002C2DDE7048705356EC7B7856A256B756ED70DE709070D57B5551EC7B4A516C702F
:2070A000897E8C7C057D967D1F7EC428B670FB290D2A942A4870B42BD12B132C452C5D2C98
:2070C0006B2C752FD82F4B30F130DE7048705551FB290D2A942A48708A2BDE7048700D206D
:2070E00002001820240107E82018201A20560E00030100006000133D1000D5E01AC010024
:2071000004000233030000D5E01A0010000000620322102201000010101020220303030394
:207120000304040405050506060607070708080909090A0A0A0A0B0B0B0C0C0C0D0D0D43
:207140000E0E0E0E0F0F0F1010101111111212121213131313141414151515151616161717E6
:2071600017181818181919191A1A1A1A1B1B1B1C1C1C1C1D1D1D1E1E1E1E1F1F1F1F202099
:207180002021212121222222222323232324242424252525262626262727272828282864
:2071A000292929292A2A2A2A2B2B2B2B2C2C2C2C2D2D2D2D2E2E2E2E2F2F2F2F303047
:2071C00030303031313131323232323333333333343434343535353536363636363647
:2071E000373737373838383838393939393A3A3A3A3B3B3B3B3B3C3C3C3C3C5E
:207200003D3D3D3D3D3D3E3E3E3E3E3E3F3F3F3F3F3F404040403E5D7D9CBBDAFAFF4A4244
:207220005A4C504A2A722A72F67200004010498040301020406040904A603110117049939
:2072400006A0313011303140114041501150316011601110118031905104A1B031C059B95
:2072600059C0520052105220524052505260049D0629062A049E0331043204400B4004419D
:207280000442044304440445049F0B470B4804A00380038104820483048404850486018 6AE
:2072A0000488048904A058A058B058C058D068E02B002B102B20332058F049004910492B0
:2072C00004930494039501950496019604870 4A1040204A203A304A405A50310011004A77D
:2072E0001A804A903AA01AB0580019804AC04AD0397019705AE0000040104000403010268
:207300004060409040003110117040006000313011303140114041501150316011601155
:20732000118031905 1A041B031C050005000520052105220524052505260400 0629062A5E
:207340004000331043204400B4004410442044304440445040 00B470B480400030003001A
:207360004000400040004000400010004000400040005000500050004 000600020402 04C7
:207380002040332050004000400040004000400030001000400 010004000400040204007E
:2073A000300040005000310011004000100040 003000100580010004000400030001 00FE
:2073C00005AE00000008000 0000000000200018002000008106000 80B00000000820A0047
:2073E0000000000000000000000 000B70E03040110000000000000000000000B80E5C10007E
:207400000300000000000000000000B90600000000000001200C3030303030303030CD
:2074200003030300220010001301441505040 4C4520434F4D50555445522C20494E432000838A
:207440001600060001000000000002000001000700 0F8000000000841200034203000098
:207460000000024E000000000000000FFAB00000008000000000000E0001800210000069
:2074800081067FFF0F00000000820AFFFF0000000000000000B70E3F1FFFFF00000002D
:2074A00000000000000000B80E00000000000000000000000000000000B906FBCF0000000 07D
:2074C00001200C00000000000000000000 0022001010130140000000 00000000000000 16
:2074E00000000 00000000000000831601FF0000000000000000000 01000000000F2
:207500000000000008412000000000003FF00000000000000000000FF82000001017D00D3
:207520000000005155414E54554D20503430533203934302D34302D393458585634 F44434 FA3
:207540004452052455644525620534552204E554D2000000000000000000 00000006F
:2075600000000000000000000000000000000000000000000000000000000047454E45EC
:207580005249432020202020202020202020202020202020202020202020360000 01B6
:2075A0000131000000 5155414E54554D20503430533203934302D34302D3934585856 434FC7
:2075C0004000000D9B027340104B3011807 00A00000FF7900000101740000 005155414EE8
:2075E00054554D205034305320393430 2D34302D3934585856434F44434F4452052 455682
:207600004452056 20534552204E 554D200000000000000 0000000000000000000044
:2076200000000000 000000000000000000000000002863292 0436F707972696900
:20764000676874 2057414E4720313 9383800000 5155414E54554D20202020202020 55
:207660000503430532039 34302D34302D3934585856434F44420 20202044525620534552 20A9
:207680004E55 4D202020 202020202020 2020204745 4E45524943 2020 2020202020 203D
:2076A0002020202020202020202020202 00342030001FF02FE03FD04FC05FB06FA82
:2076C0000 07F9 08000705 0F0D00000000000000000000000000000 00000000000 07A
:2076E0000000000A2D701A3D702A5D710B5D710C5D708CDD718E5D72005D80207D8010869
:20770000D81018D80119D8041DD8010D000000000000000000000000000000000098
:20772000000000000000000000000000000000000000000000000000000000000049
:2077400000000000000000000000000000000000000000000000000000000000000029
:2077600000000000000000000000000000000000000000000000000000000000000009
:2077800000000000000000000000000000000000000000000000000000000000000 0E9
:2077A0000000000000000000000000000000000000000000000000000000000000 00C9
:2077C00000000000000000000000000000000000000000000000000000000000000 0A9
:2077E000000000000000000000000000000000000000000000000000000000000000 89
:207800000000000000000000000000000000000000000000000000000000000000 0068
:20782000000000000000000000000000000000000000000000000000000000000000 048
```

```
:207840000000000000000000000000000000000000000000000000000000000000000028
:207860000000000000000000000000000000000000000000000000000000000000000008
:2078800000000000000000000000000000000000000000000000000000000000000000E8
:2078A00000000000000000000000000000000000000000000000000000000000000000C8
:2078C0000000000000000000000000000000000000000000000000000000000000000 0A8
:2078E000000000000000000000000000000000p0000000000000000000000000000000088
:207900000000000000000000000000000000000000000000000000000000000000000067
:207920000000000000000000000000000000000000000000000000000000000000000047
:207940000000000000000000000000000000000000000000000000000000000000000027
:207960000000000000000000000000000000000000000000000000000000000000000007
:2079800000000000000000000000000000000000000000000000000000000000000000E7
:2079A00000000000000000000000000000000000000000000000000000000000000000C7
:2079C00000000000000000000000000000000000000000000000000000000000000000A7
:2079E000000000000000000000000000000000000000000000000000000000000000000 87
:207A0000032088012B20182B21002B00032B01E02B33BF2B66222B601E0B1480000B168018
:207A200000B900BACC6520FE15000C20047028BA5981040C2090706500C020FC5020FD50E5
:207A40000FFC00E080F46500C05C24010600018F0D80440DFC02000FFC00E080ECB9FFBBE5
:207A6000406500C0BA801500CB80F9BB406500C0BA8015048021CB80F7B900BB406500C0DF
:207A8000BA801500CB80F9BB406500C0BA8015048005CB80F7140B3A8154B2EB0C20907022
:207AA00014040BFC00E0B9E009F106E0B9C009F10EE0B90C09F10DE0B90809F10DE0B900E0
:207AC00009F110E009F011E009F010E06518E067EE7009F0F47024211520B90E09F10FE040
:207AE000B80A65F570671EE0621000D309F119E05855161F800B5855163F8005C332EC1474
:207B00000AC880DE3A81370C209070650000BC0328A020B95509F117E0B9AA09F117E06553
:207B20000080BC0128A02009F017E00009F017E0240109F017E02F55AA800D30CD82E33AD4
:207B400081280C209070140E31CD4E240D09F1EDBD009F1ECDB09F048E0AC0722790A10D5
:207B6000A620227809F15BE028D39B089FC828569C28B09C285699B9FF09F100C06000D024
:207B800009F1F3DBD009F1F2DB2B80002B68002BE0402BCE400B8A12000B8812002B480005
:207BA0002BDA432BDE030CB4841FB5E92BC80428917E4B2C658009F048E003BB040D2002D4
:207BC00000B5EB56089E00089F01B4EBA5EBB7EB0D200200563A4A05088EE0089F6808896C
:207BE0000 02B14C00898000D2002005608AFE2FC274A80040D200200089FE256BBFF28984F
:207C0000580D20020056BBFF28B6580D20020056BB002898580D20020056BB0028B6580DBC
:207C200 0200200560C2090703A8128B2EB560C4A0AFF0D200200089FE25608BFE23928A3B0
:207C40005008A2EB0D088F0128C2562B8000089FE25676EB32111C2EEE7F2DA4002DB7FEC2
:207C60000832508AE0321274A80D0B0EB2B80000D200200089FE256089FE2274B8008B2EB4D
:207C80003A812228C256563A4A0A14AE284920283153836B2B14803CC0C26000001AC41A21
:207CA000E20CC880001CCC8801B900A9002DBAFF2D8BFE82093A8136B2EB28C256561CC292
:207CC0002D8000AC011AC228912072EB25283153832D20CFAFE007FD1DAF2083190C4A0750
:207CE0001E60070009F1A1DBD009F1A0DB0D2002005628C256563A8156B2EB28C25656B233
:207D0000EB3A8162563A55800C563800B99209F19EDBB90409F19FDB287751833672EB72F5
:207D20003B4A2F3A850028A508101624012B1600BA28A0E908A0E9FC32F820CE09F19DDBED
:207D400024101216BA06A0E908A0E9FC32F80D20020056274B813660F9FF09F1A1DBD00972
:207D6000F1A0DBB99209F19EDBB90409F19FDB3CC0C20CC4000028775160070009F1A1DB4D
:207D8000D009F1A0DB3CC0C20CC40000563A813BB2EB28C256563A4A262B72082B7A080B8A
:207DA0001C00000B1E00002B70112B72882B7A8860050009F1A1DBD009F1A0DB111C011D15
:207DC0001E801E60010009F19FDBD009F19EDB28775172EB083B4AE4B2EB3A813528C25644
:207DE000560DC240006CC30128912072EBEF0B1C00000B1E000060660009F19FDBD009F175
:207E00009EDB28775172EBD5089F72089F7A111C2F020080C3011F1E80BE0D200200566487
:207E2000808066808 03A4A6660050009F1A1DBD009F1A0DB1CCC8F05830224508F0407FDC6
:207E40000224408F17830224718F1607FD02246160010009F19FDBD009F19EDB2877517252
:207E6000EB243B4ACFD588143009229C09F198DBD788163009229D09F19ADB28912072EBB8
:207E800050D200200562CDD7D28917E0D200200566080801A9C1ACA3A60800CC880003A74
:207EA000E0053AE9222BC0420CC200000C5E00000C5638003A61FF3A62203A63182BE24140
:207EC0002B46030CD4251A0CE4041A0CDC0822B7EA3A976E3A98283A96173A933C3A940651
:207EE000C4C60EA3A9504B93B09F1A8DBB93409F1A7DBB91809F1A6DBB90509F1A9DB3A71
:207F00008505283D533B85FA283D5308A7EB0328212B560000000000000000000000000046
:207F2000000000000000000000000000000000000000000000000000000000000000000041
:207F4000000000000000000000000000000000000000000000000000000000000000000021
:207F6000000000000000000000000000000000000000000000000000000000000000000001
:207F80000000000000000000000000000000000000000000000000000000000000000000E1
:207FA00000000000000000000000000000000000000000000000000000000000000000 00C1
:207FC0000000000000000000000000000000000000000000000000000000000000000000A1
:207FE00000000000000000000000000000000000000000000000000000000003228801D3
:00000001FF
```

Having thus described an embodiment of the invention, it will now be appreciated that the objects of the invention have been fully achieved, and it will be understood by those skilled in the art that many changes in construction and widely differing embodiments and applications of the invention will suggest themselves without departing the from spirit and scope of the invention. The disclosure and the description herein are purely illustrative and are not intended to be in any sense limiting.

What is claimed is:

1. A disk drive subsystem including integral data block sequencer means, cache memory means and interface means for direct memory access interface with a host computing machine and further including a disk forming data storage surfaces, the disk being mounted to a spindle journalled to a base, an electromechanical head transducer actuator structure mounted to the base for moving a plurality of data transducer heads among a multiplicity of concentric data tracks formed on each data storage surface of the disk, the subsystem further comprising:

single, time divided multi-tasked digital supervisor means programmed for supervising track seeking, micro-stepping and following servo control operations of the actuator structure during a servo control phase of a two-phase operational cycle being a supervision phase devoted to supervision of data block handling functions of disk drive data block sequencer means, cache memory means and interface means, the digital supervisor means being programmed so that during track seeking and micro-stepping settle operational modes of the subsystem each said two-phase operational cycle of the supervisor means is of shorter time duration than the duration of a said two-phase operational cycle of the supervisor means during track following operational modes.

2. The disk drive subsystem as set forth in claim 1 wherein said digital supervisor is programmed so that during track seeking operations within a said two-phase operational cycle each servo control phase is approximately 60 microseconds in duration and each supervision phase is approximately 30 microseconds in duration, so that during track settling operations within a said two-phase operational cycle each servo control phase is approximately 80 microseconds in duration and each supervision phase is approximately 40 microseconds in duration, and so that during track following operations within a said two-phase operational cycle each servo control phase is approximately 75 microseconds in duration and each supervision phase is approximately 105 microseconds in duration.

3. The disk drive subsystem set forth in claim 1 wherein the supervisor means is programmed to perform the other supervision phase within a main loop.

4. The disk drive subsystem set forth in claim 1 wherein the single, time divided multi-tasked digital supervisor means comprises a microprocessor means including an internal readonly program memory means for storing first predetermined portions of a control program executed by the microprocessor means, and further comprising an external read-only program memory means for storing second predetermined portions of the control program executed by the microprocessor means.

5. The disk drive subsystem set forth in claim 4 wherein the first predetermined portions of the control program stored in the internal read-only program memory means include access-time-critical service routines, and wherein the second predetermined portions of the control program include non-timecritical service routines.

6. The disk drive subsystem set forth in claim 1 wherein the electromechanical head transducer actuator structure comprises a mass balanced, substantially in-line rotary actuator head positioner and further comprising a polyphase-providing position encoder coupled between the head positioner and the base for generating polyphase position information indicative of the position of the head positioner as it rotates relative to the base.

7. The disk drive subsystem set forth in claim 6 wherein the polyphase-providing position encoder comprises a optical transducer means having a moving scale attached to the head positioner and having light source means and a reticle-masked photodetector array means formed as a single module adjustably secured to the base, the optical transducer means for putting out plural phases relatively indicative of track position and direction of movement of the actuator structure.

8. The disk drive subsystem set forth in claim 7 wherein the moving scale and base and head positioner are comprised of materials having coefficients of thermal expansion which differ linearly over temperature change.

9. The disk drive subsystem set forth in claim 6 further comprising prerecorded data track centerline information in plural track locations on at least one said data storage surface.

10. The disk drive subsystem set forth in claim 9 wherein the digital supervisor means is programmed to calibrate the position encoder by reference to the prerecorded data track centerline information during a recurrent calibration service routine.

11. The disk drive subsystem set forth in claim 10 wherein the prerecorded data track centerline information is recorded in plural track locations at a radially outermost region and at plural track locations at a radially innermost region of each data surface, the centerline information being readable by the data transducer head positioned for reading data from that particular surface, and wherein the digital supervisor means includes analog to digital converter means and is connected to receive and process the position information from the position encoder during one phase of the two-phase operational cycle and wherein the digital supervisor means obtains and processes the centerline information from the disk surfaces read by the data transducer during the calibration service routine.

12. The disk drive subsystem set forth in claim 11 wherein each said track location corresponds to a said phase of the polyphase encoder thereby enabling separate calibration of each phase over the range of head positioner movement between the outer region and the inner region during a said calibration service routine.

13. The disk drive subsystem set forth in claim 12 wherein the digital supervisor means is programmed to calibrate during the calibration service routine the position information from the position encoder to centerlines of the data tracks by automatically commanding the actuator structure to seek to the outermost region and to store centerline information read form each track location for each encoder phase and for each data surface, to seek to the innermost region and to store centerline information read therefrom for each encoder phase and for each data surface, and to calculate and store from recorded inner and outer servo information for each encoder phase and for each surface a reference offset value and an angular slope value indicative of the difference in offset between the polyphase information and data track centerline servo information from the outermost region and the innermost region, and, during track following operations to follow the centerline of a data track located between the outermost and innermost regions by causing track following current to be supplied to the rotary actuator structure in response to the polyphase information as corrected by a particular track offset correction value derived from the stored reference offset value and the angular slope value.

14. The disk drive subsystem set forth in claim 13 wherein the data track centerline correction servo information comprises for a track within each region of each surface a single servo sector containing sequentially circumferential bursts including a first burst and a second burst, one of the bursts being offset radially in one direction of disk radius from the centerline of the track by a predetermined amount and the other of the bursts being offset radially in the other direction of disk radius from the centerline and further comprising peak detection circuitry connectable to the digital supervisor means so that the relative magnitudes of each of the bursts may be converted to digital values and stored for further processing by the supervisor means.

15. The disk drive subsystem set forth in claim 14 wherein each servo sector of a track location on a surface is circumferentially displaced from every other servo sector of the other surfaces at the same track location so that all sectors for all surfaces may be read and processed by the supervisor means during a single rotation of the disks.

16. The disk drive subsystem set forth in claim 14 wherein the digital supervisor means is programmed to determine during the calibration service routine and to store a read channel automatic gain compensation value by averaging burst servo amplitudes of all heads as read from the outermost region while following track centerline and averaging burst servo amplitudes of all heads as read from the innermost region and by storing an ACG reference and slope value to compute therefrom an AGC value for a particular cylinder location.

17. The disk drive subsystem set forth in claim 10 wherein the digital supervisor means is programmed to determine and record seek direction hysteresis error values for the head positioner during long seeks during the recurrent calibration service routine.

18. The disk drive subsystem set forth in claim 10 further comprising a temperature sensor for sensing temperature of the base at the vicinity of the position encoder.

19. The disk drive subsystem set forth in claim 18 wherein the supervisor means is programmed to scan periodically the temperature sensor and to store sensed temperature, and automatically to repeat the calibration service routine upon detection of a change of predetermined magnitude of sensed temperature of the base above a threshold value.

20. The disk drive subsystem set forth in claim 1 wherein the digital supervisor means is programmed to determine and store a head gain coefficient which is related to the width of each data transducer head by commanding the actuator structure to shift a predetermined distance from track centerline of each track containing a predetermined pattern of radially offset servo bursts therein and thereupon to read and record the amplitude of each said burst and thereupon calculate an average value of burst amplitude centerline information read from an outermost track region while following track centerline and while offset therefrom and then to repeat this foregoing determination at the innermost track region in order to obtain and record a slope value for each head and thereupon calculate a head gain value for each head to determine for each head the positional compensation required in order to move the particular head into precise centerline alignment with each track to be followed thereby.

21. The disk drive subsystem including integral data block sequencer state machine means, cache memory means and interface state machine means for direct memory access interface with a host computing machine and further including a at least one data storage disk forming data storage surfaces, the disk being mounted to a spindle journalled to a base, an electromechanical head transducer actuator structure mounted to the base for moving a plurality of data transducer heads among a multiplicity of concentric data tracks formed on each data storage surface of disk, the subsystem further comprising:

single, time divided multi-tasked digital supervisor means programmed for supervising track seeking, micro-stepping and track following servo control operations of the actuator structure during a first, servo control phase of a twophase operational cycle, another phase of each said two-phase operational cycle being devoted to supervision of data block handling functions of disk drive data block sequencer state machine means and interface state machine means, the data block sequencer state machine means having sequencer loop counter means and the interface state machine means having interface loop counter means directly accessible by the digital supervisor means during the other phase of said two-phase operational cycle so that counts contained in said counter means may be updated during said another phase, thereby enabling each of said data block sequencer state machine means and interface state machine means to continue to loop through the states thereof while said digital supervisor means performs servo control operations during said first, servo control phase.

22. The disk drive subsystem set forth in claim 21 wherein said data block sequencer state machine means and said interface state machine means communicate block transfer status of, and storage availability within, said cache memory means via hot sector and sector to go registers within said digital supervisor means.

* * * * *